United States Patent
Jung et al.

(10) Patent No.: US 12,227,965 B2
(45) Date of Patent: Feb. 18, 2025

(54) ELECTRIC VEHICLE CHARGING SYSTEM USING VEHICLE ELEVATOR DEVICE FOR VERTICAL PARKING OF INDIVIDUAL HOUSEHOLDS IN COLLECTIVE BUILDING, TEMPORARY PARKING SYSTEM USING THE SAME, AND ELECTRIC VEHICLE CHARGING SYSTEM

(71) Applicants: Seong In Jung, Namyangju-si (KR); Jong Hee You, Seongnam-si (KR); Kyung Taik Lee, Seoul (KR); Yung Ju Go, Seoul (KR); Myung Jin Kim, Seoul (KR)

(72) Inventors: Seong In Jung, Namyangju-si (KR); Jong Hee You, Seongnam-si (KR); Kyung Taik Lee, Seoul (KR); Yung Ju Go, Seoul (KR); Myung Jin Kim, Seoul (KR)

( * ) Notice: Subject to any disclaimer, the term of this patent is extended or adjusted under 35 U.S.C. 154(b) by 0 days.

(21) Appl. No.: 18/030,774

(22) PCT Filed: Oct. 8, 2021

(86) PCT No.: PCT/KR2021/013922
§ 371 (c)(1),
(2) Date: Apr. 7, 2023

(87) PCT Pub. No.: WO2022/075812
PCT Pub. Date: Apr. 14, 2022

(65) Prior Publication Data
US 2023/0374809 A1 Nov. 23, 2023

(30) Foreign Application Priority Data
Oct. 8, 2020 (KR) .................. 10-2020-0129876

(51) Int. Cl.
*E04H 6/42* (2006.01)
*B60L 53/12* (2019.01)
(Continued)

(52) U.S. Cl.
CPC .............. *E04H 6/424* (2013.01); *B60L 53/12* (2019.02); *B60L 53/62* (2019.02); *B60L 53/65* (2019.02);
(Continued)

(58) Field of Classification Search
CPC .......... E04H 6/424; E04H 6/22; G06Q 10/02; B66B 9/003; B66B 1/3453; B66B 1/2416;
(Continued)

(56) References Cited

U.S. PATENT DOCUMENTS 3,896,955 A * 7/1975 Collins ................... E04H 6/186
414/256
4,265,581 A * 5/1981 Ives ........................ E04H 6/287
414/254
(Continued)

FOREIGN PATENT DOCUMENTS

CN 201773497 U * 3/2011
CN 103548068 A * 1/2014 ........... G05B 19/048
(Continued)

OTHER PUBLICATIONS

Guangmei Wu, "considering the influence of queue length on performance improvement for a new compact robotic automated parking system", published by Elsevier on Jun. 6, 2019, all pages (Year: 2019).*

(Continued)

*Primary Examiner* — Omar Zeroual
(74) *Attorney, Agent, or Firm* — Revolution IP, PLLC

(57) ABSTRACT

A vehicle elevator device for vertical parking for individual households of collective building includes, a private parking (Continued)

lot attached to an individual private space; a vehicle elevator unit that transports vehicles between a waiting vehicle space and the private parking lot; a sliding moving means for horizontally transferring the vehicle between the private parking lot and the inside of the vehicle elevator; a control unit specifying vehicles that needs to be entered or by managing the reservation of enter and exit, controlling the operation of the elevator unit and sliding moving means.

2 Claims, 51 Drawing Sheets

(51) Int. Cl.
| | |
|---|---|
| B60L 53/62 | (2019.01) |
| B60L 53/65 | (2019.01) |
| B60L 53/66 | (2019.01) |
| B66B 1/24 | (2006.01) |
| B66B 1/34 | (2006.01) |
| B66B 9/00 | (2006.01) |
| E04H 6/22 | (2006.01) |
| G06Q 10/02 | (2012.01) |

(52) U.S. Cl.
CPC .......... *B60L 53/665* (2019.02); *B66B 1/2416* (2013.01); *B66B 1/3453* (2013.01); *B66B 9/003* (2013.01); *E04H 6/22* (2013.01); *G06Q 10/02* (2013.01)

(58) Field of Classification Search
CPC ........ B60L 53/65; B60L 53/665; B60L 53/62; B60L 53/12
See application file for complete search history.

(56) References Cited

U.S. PATENT DOCUMENTS

| | | | | | |
|---|---|---|---|---|---|
| 4,776,746 | A | * | 10/1988 | Peng | E04H 6/183 414/253 |
| 4,971,506 | A | * | 11/1990 | Givati | E04H 6/182 414/256 |
| 4,986,714 | A | * | 1/1991 | Fernstrom | E04H 6/182 414/241 |
| 5,018,926 | A | * | 5/1991 | Sternad | E04H 6/245 414/253 |
| 5,049,022 | A | * | 9/1991 | Wilson | E04H 6/186 414/253 |
| 5,108,254 | A | * | 4/1992 | Go | E04H 6/287 414/807 |
| 5,203,660 | A | * | 4/1993 | Takahiro | E04H 6/20 414/253 |
| 5,238,348 | A | * | 8/1993 | Reimer | E04H 6/186 414/281 |
| 5,243,796 | A | * | 9/1993 | Casini | E04H 6/225 414/256 |
| 5,304,026 | A | * | 4/1994 | Liaw | E04H 6/245 414/253 |
| 5,331,781 | A | * | 7/1994 | Gilbert | E04H 6/225 414/253 |
| 5,425,612 | A | * | 6/1995 | Ebstein | E04H 6/186 414/254 |
| 5,478,182 | A | * | 12/1995 | Hildebrand | E04H 6/282 414/257 |
| 5,669,753 | A | * | 9/1997 | Schween | E04H 6/287 414/800 |
| 5,893,696 | A | * | 4/1999 | Belinsky | E04H 6/225 414/253 |
| 5,980,185 | A | * | 11/1999 | Vita | E04H 6/422 414/256 |
| 6,004,091 | A | * | 12/1999 | Roth | E04H 6/282 414/253 |
| 6,077,017 | A | * | 6/2000 | Durant | E04H 6/186 414/254 |
| 6,332,743 | B1 | * | 12/2001 | Park | E04H 6/186 414/254 |
| 6,955,245 | B2 | * | 10/2005 | Dunser | B66B 9/00 187/382 |
| 9,056,553 | B2 | * | 6/2015 | Cun | B60L 3/04 |
| 10,392,825 | B2 | * | 8/2019 | Scherer | G05D 1/0282 |
| 10,875,420 | B2 | * | 12/2020 | Grimm | B60L 53/65 |
| 11,142,924 | B1 | * | 10/2021 | Cha | E04H 6/42 |
| 11,214,975 | B2 | * | 1/2022 | Kappe | E04H 6/186 |
| 11,477,647 | B1 | * | 10/2022 | Srinath Bharadwaj | H04L 9/0894 |
| 2002/0018704 | A1 | * | 2/2002 | Haag | E04H 6/422 414/227 |
| 2002/0039526 | A1 | * | 4/2002 | Jokinen | E04H 6/22 414/234 |
| 2002/0164234 | A1 | * | 11/2002 | Haag | E04H 6/422 414/277 |
| 2004/0037678 | A1 | * | 2/2004 | Bonin | E04H 6/183 414/234 |
| 2005/0144194 | A1 | * | 6/2005 | Lopez | E04H 6/285 |
| 2005/0207876 | A1 | * | 9/2005 | Springwater | E04H 6/24 414/231 |
| 2005/0220594 | A1 | * | 10/2005 | Haag | E04H 6/245 414/529 |
| 2007/0031218 | A1 | * | 2/2007 | Haag | E04H 6/422 414/227 |
| 2007/0098528 | A1 | * | 5/2007 | Perry | E04H 6/225 414/234 |
| 2008/0051951 | A1 | * | 2/2008 | Camacho | E04H 6/422 701/23 |
| 2009/0053025 | A1 | * | 2/2009 | Venkatraman | E04H 6/24 414/229 |
| 2009/0148259 | A1 | * | 6/2009 | Shani | E04H 6/183 414/757 |
| 2010/0014950 | A1 | * | 1/2010 | Blackmore | E04H 6/065 414/229 |
| 2010/0086385 | A1 | * | 4/2010 | Shani | E04H 6/245 414/800 |
| 2010/0183409 | A1 | * | 7/2010 | Checketts | E04H 6/245 414/281 |
| 2011/0010281 | A1 | * | 1/2011 | Wass | B60L 53/305 705/34 |
| 2011/0140658 | A1 | * | 6/2011 | Outwater | B60L 53/35 320/109 |
| 2011/0274523 | A1 | * | 11/2011 | Petalas | E04H 6/285 414/231 |
| 2011/0320035 | A1 | * | 12/2011 | Kharkover | E04H 6/22 700/218 |
| 2012/0039693 | A1 | * | 2/2012 | Benedict | E04H 6/225 414/807 |
| 2012/0251276 | A1 | * | 10/2012 | Rathbun | E04H 6/22 414/800 |
| 2013/0311247 | A1 | * | 11/2013 | Wass | G06Q 30/04 705/40 |
| 2014/0186146 | A1 | * | 7/2014 | Alan | E04H 6/422 414/231 |
| 2014/0219751 | A1 | * | 8/2014 | Segal | E04H 6/24 414/800 |
| 2014/0278839 | A1 | * | 9/2014 | Lynam | G06Q 20/127 705/40 |
| 2014/0294543 | A1 | * | 10/2014 | Jarvinen | E04H 6/22 414/800 |
| 2015/0167339 | A1 | * | 6/2015 | Wastel | E04H 6/22 414/239 |
| 2015/0175354 | A1 | * | 6/2015 | Kharkover | E04H 6/225 414/807 |
| 2016/0117657 | A1 | * | 4/2016 | Forbes, Jr. | G06Q 20/145 705/7.31 |
| 2016/0352113 | A1 | * | 12/2016 | Zhao | B60L 53/14 |
| 2017/0089088 | A1 | * | 3/2017 | Lee | E04H 6/22 |
| 2018/0009636 | A1 | * | 1/2018 | Jedryczka | B66B 11/0407 |
| 2018/0170200 | A1 | * | 6/2018 | Brown | B60L 53/124 |
| 2018/0258663 | A1 | * | 9/2018 | Maier | E04H 6/422 |
| 2019/0047523 | A1 | * | 2/2019 | Lee | E04H 6/22 |

(56) References Cited

U.S. PATENT DOCUMENTS

| | | | |
|---|---|---|---|
| 2019/0226225 A1 | 7/2019 | Tang et al. | |
| 2020/0279196 A1* | 9/2020 | Karaburun | G06Q 10/02 |
| 2020/0339108 A1* | 10/2020 | Takemura | G05D 1/0088 |
| 2020/0346553 A1* | 11/2020 | Grimm | B60L 53/65 |
| 2022/0170284 A1 | 6/2022 | Zhang | E04H 6/424 |
| 2023/0004876 A1* | 1/2023 | You | B60L 58/12 |
| 2023/0220697 A1* | 7/2023 | Monteverdi | A47L 23/205 |
| | | | 701/25 |
| 2023/0243173 A1* | 8/2023 | Agrikli | E04H 6/22 |
| | | | 414/232 |

FOREIGN PATENT DOCUMENTS

| | | | | |
|---|---|---|---|---|
| CN | 106058978 A | * | 10/2016 | |
| CN | 106760812 A | * | 5/2017 | |
| CN | 106696747 B | * | 11/2019 | |
| CN | 111636734 A | * | 9/2020 | |
| CN | 107795175 B | * | 4/2023 | ............... E04H 6/22 |
| CN | 107842234 B | * | 6/2023 | ............... E04H 6/22 |
| CN | 117513845 A | * | 2/2024 | |
| JP | 2018-172964 A | | 11/2018 | |
| KR | 10-2006-0107134 A | | 10/2006 | |
| KR | 10-2010-0082098 A | | 7/2010 | |
| KR | 10-2013-0028236 A | | 3/2013 | |
| KR | 10-2020-0080878 A | | 7/2020 | |
| KR | 10-2160717 B1 | | 9/2020 | |
| WO | WO-2008135614 A1 | * | 11/2008 | ............. E04H 6/183 |
| WO | WO-2009039599 A2 | * | 4/2009 | ............... E04H 1/04 |
| WO | WO-2013034406 A1 | * | 3/2013 | ............. G06Q 10/02 |
| WO | WO-2019210744 A1 | * | 11/2019 | ............... B25J 11/00 |

OTHER PUBLICATIONS

International Search Report for PCT/KR2021/013922 mailed Feb. 9, 2022 from Korean Intellectual Property Office.

* cited by examiner

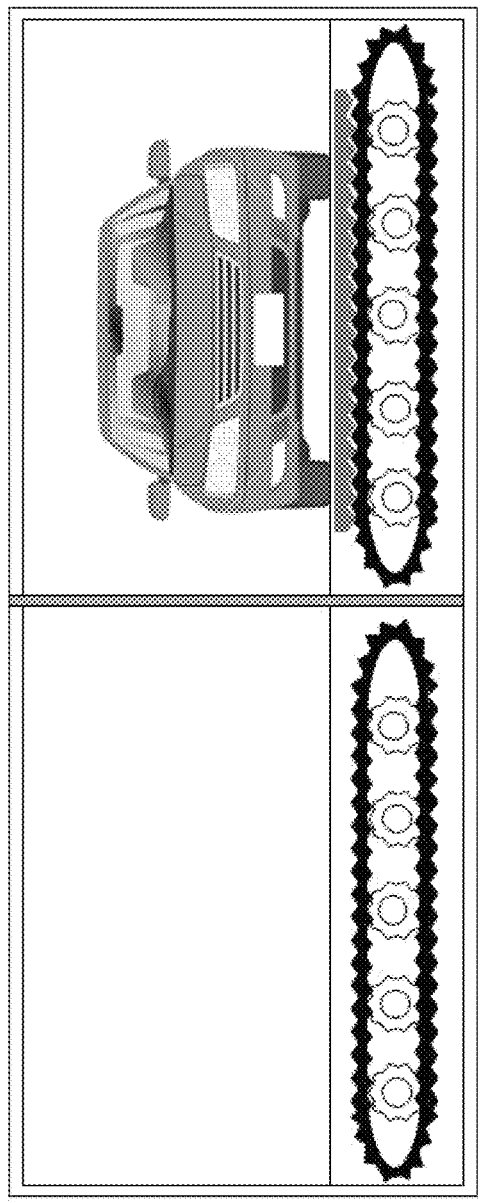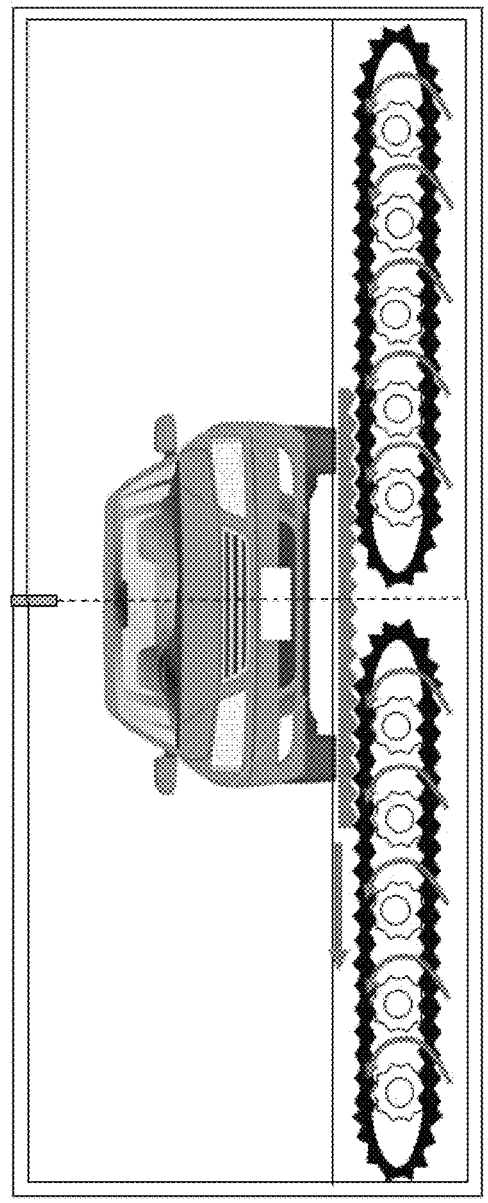
FIG.14

(b) The moving lifter transfers the vehicle from the vehicle elevator to the private parking lot

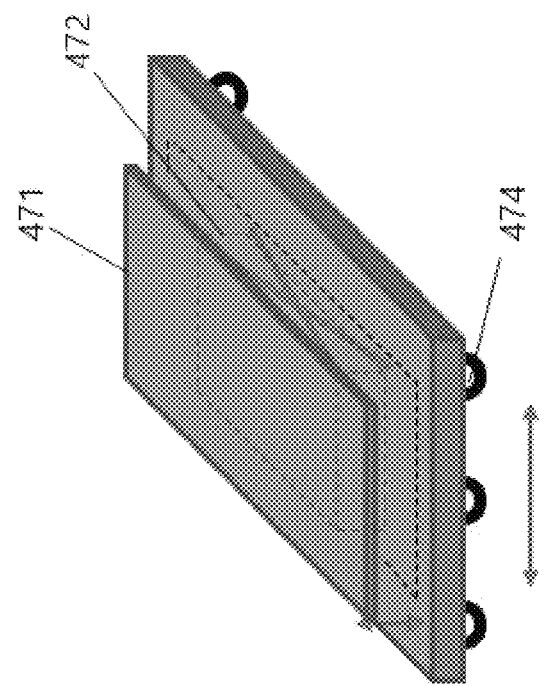
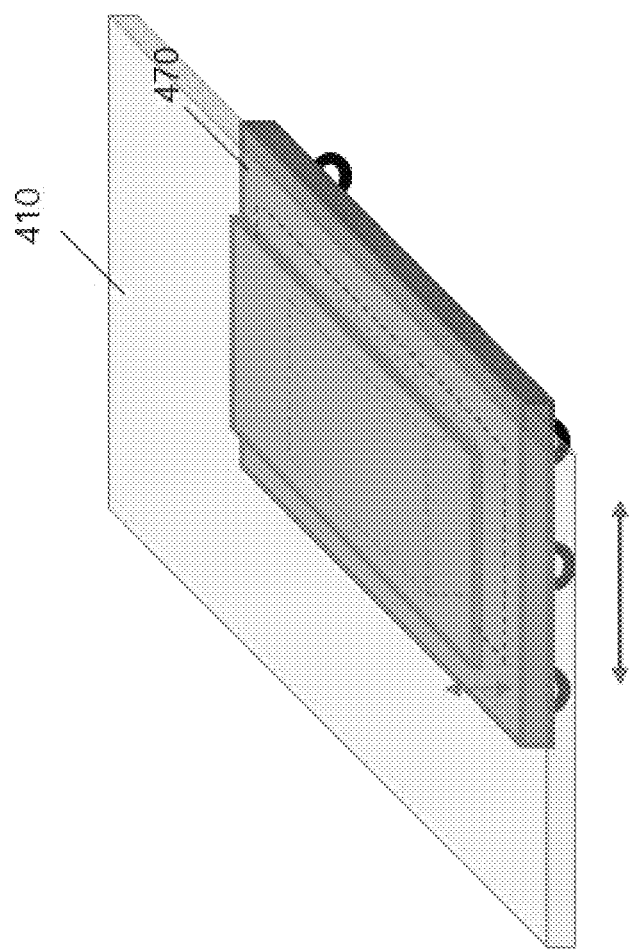
FIG. 35

ELECTRIC VEHICLE CHARGING SYSTEM USING VEHICLE ELEVATOR DEVICE FOR VERTICAL PARKING OF INDIVIDUAL HOUSEHOLDS IN COLLECTIVE BUILDING, TEMPORARY PARKING SYSTEM USING THE SAME, AND ELECTRIC VEHICLE CHARGING SYSTEM

TECHNICAL FIELD

The present invention relates to a vehicle elevator device for a collective building, a temporary parking system using the same, and an electric vehicle charging system. More specifically, a vehicle elevator device for vertical parking of individual households in a collective building is provided with a parking space as a common space near the individual exclusive space of the collective building, and can move and park the vehicle in the parking space. In addition, it provides a temporary parking system that can minimize the waiting time for entering (parking) or exiting a vehicle by proceeding with the parking or exiting the vehicle according to the reservation of the user during the time zone when the demand for parking or exiting a vehicle is high, such as commuting time. In addition, it provides an electric vehicle charging system that can charge electric vehicles using the parking spaces of individual households.

BACKGROUND ART

Conventional collective buildings tend to place parking lots on the ground or underground as a common space, and in particular, parking lots are arranged underground for complete separation of pedestrians and vehicles due to the design for a pleasant environment.

Therefore, the parking lot is arranged in an underground space as a common space and is used in a manner in which occupants jointly use the parking space. Therefore, since the common space is shared by the occupants, the parking location is not constant, and there is a problem that conflicts such as contact accidents and door-to-door accidents are likely to occur in the process of parking.

In addition, as parking standards are gradually strengthened, the number of parking spaces per household is increasing. And the parking area requires a floor area of 3.3 m² per car. Therefore, there was a problem in that space and construction restrictions occurred to accommodate the increasing parking space only in the underground space.

And since the parking lot area is large, there is a problem in that the traffic line for moving the occupants to each household after parking is long. In addition, there was a problem that violent crimes such as theft and kidnapping frequently occurred in the parking lot.

In addition, cars of the future may be recognized as a part of housing. In particular, since electric vehicles require a charging system for each household, the need to allocate individual parking spaces near each household is increasing.

Therefore, a vertical parking lot and a vehicle elevator device for vertical parking capable of parking vehicles in individual households of a collective building have been developed.

However, the vehicle elevator device for vertical parking of individual households in the collective building requires the elevator to move between the exits of the basement or ground floor and the parking lot for each household for entering or exiting. Therefore, a lot of time is required for entering and exiting the vehicle. In addition, when the demand for entering or exiting a vehicle is concentrated at once, such as during rush hour, there is a problem in that the waiting time for entering or exiting the vehicle is excessively long.

In addition, in the case of an electric vehicle, although a charging space is provided in a public parking lot, there is a problem in that the space that can be charged is limited in that it is a public parking lot.

DISCLOSURE

Technical Problem

As derived to solve the above problems, the present invention provides a parking space as a common space near individual households of a collective building. And it provides a vehicle elevator device for vertical parking of individual households in the collective building that can move and park a vehicle in the parking space.

In addition, the present invention provides a temporary parking system capable of minimizing waiting time due to entering (parking) and exiting by proceeding with entering and exiting according to a user's reservation in a time zone when demand for entering and exiting is concentrated, such as commuting time.

In addition, the present invention provides an electric vehicle charging system capable of charging an electric vehicle using the parking space of an individual household.

Technical Solution

In order to achieve the above object, a temporary parking system using a vehicle elevator device for vertical parking of individual households in a collective building according to the present invention includes a temporary parking unit formed at the entrance and exit of the vehicle elevator; an private parking lot attached to an individual private space; a vehicle elevator unit for transporting a vehicle between the temporary parking unit and the private parking lot; a sliding moving means for horizontally moving the vehicle between the private parking lot and the inside of the vehicle elevator unit; a control unit for managing the reservation of entering and exiting for vehicles, specifying vehicle entering at the temporary parking unit, and controlling the operation of the vehicle elevator unit and sliding moving means.

The temporary parking lot unit may be composed of a parking module capable of parking at least one vehicle. The parking module is composed of a space capable of parking a plurality of vehicles according to the number of vertical floors and the number of vehicles accommodated. And the parking module is characterized in that it can be used in combination for entering and exiting a vehicle, or can be separately configured for only entering and only exiting.

The control unit includes a call management unit that manages a user's call of the vehicle elevator unit; and a vehicle elevator control unit for controlling the transport of a vehicle between the private parking lot and the temporary parking lot by controlling the vertical movement of the vehicle elevator and the horizontal movement of the vehicle according to the call of the vehicle elevator unit.

The call management unit includes a user information management module and a schedule management module. The user information management module receives and registers user information of about a user of a private parking lot, compares it with registered user information when there is a call to the vehicle elevator unit, identifies the user, and identifies a location of user's private parking lot from the identified user information.

When the user's vehicle needs to wait for enter or exit after user identification is completed, the schedule management module determines and allocates an order for enter or exit of the user's vehicle in consideration of the call information of the previously called vehicle elevator unit. The elevator control unit includes a vertical movement control module for controlling vertical movement of the vehicle elevator unit; and a horizontal movement control module for controlling the vehicle to move horizontally by controlling the sliding moving means between the vehicle elevator unit and the private parking lot or between the vehicle elevator unit and the temporary parking lot.

When the user calls the vehicle elevator through the elevator application of the user terminal to request parking of a vehicle in its own private parking lot, the schedule management module of the control unit determines whether it is possible to enter the vehicle immediately or to wait for the vehicle to enter. In the case of a waiting situation, it designates the parking unit of the temporary parking lot and informs the user to park the vehicle in the parking unit of the designated temporary parking lot. And it controls to park the vehicle into the parking unit of the designated temporary parking lot when moving of the vehicle in the designated temporary parking lot becomes possible. And it controls to automatically transfer the vehicle parked in the parking unit of the temporary parking lot to the user's private parking lot according to the order of moving of the vehicle elevator unit when parking of the vehicle is completed in the parking unit of the temporary parking lot.

When a user calls a vehicle elevator to exit a vehicle parked in a private parking lot, and in a situation where it is necessary to wait for the vehicle to exit, the schedule management module notifies the user that it is necessary to wait for the vehicle to exit, and notifies the user of the order of exiting and the expected time of exiting the vehicle. And it receives the information of the user according to the order of calling and designates the order of exiting according to the order of calling. And when the vehicle elevator unit arrives at the floor of the private parking lot according to the order of exiting, it controls to transfer the vehicle parked in the private parking lot into the vehicle elevator unit. And after moving vertically to the floor where the temporary parking lot is located, when the vehicle is horizontally transferred to the designated parking unit of the temporary parking lot, it notifies the user terminal that the vehicle is parked in the designated parking unit. Thus, the user of the vehicle can go to the designated parking unit and drive the vehicle out of the parking unit.

On the other hand, the electric vehicle wireless charging system using the vehicle elevator device for vertical parking of individual households in the collective building is characterized by including a vehicle elevator unit, a private parking lot, a sliding moving means, an electric vehicle charging device, and a control unit.

The vehicle elevator unit moves up or down to move a vehicle in or from a private parking lot to a specific floor desired by a user when entering or exiting an electric vehicle. The private parking lot is attached to an individual private space adjacent to at least one of the right side or the left side of the vehicle elevator unit and is partitioned to be transferred and parked in a transverse, direction perpendicular to the direction of movement of the electric vehicle. The sliding moving means horizontally moves the electric vehicle between the private parking lot and the inside of the vehicle elevator. The electric vehicle charging device detects when the electric vehicle is parked in the private parking lot by the sliding moving means and proceeds with charging according to a charging command of the control unit. The control unit controls the operation of the vehicle elevator unit and sliding moving means, and transmits a charging command to the electric vehicle charging device to control charging.

The electric vehicle charging device includes a detection module for detecting that an electric vehicle is parked in a private parking lot; a wireless power receiving module formed in the electric vehicle to receive power; a wireless power transmission module formed on the main plate to transmit power; a charging controller installed in the private parking lot to supply power transmitted through the wireless power receiving module for the identified electric vehicle; a switch that is electrically connected when the main plate is parked in the private parking lot.

The charging controller includes an information transmission module for transmitting pre-stored user identification information to the control unit when the detection module detects that the electric vehicle is parked; a charging state management module for checking the state of charge of the parked electric vehicle; and a charging management module that receives a charging command from the control unit, controls charging of the electric vehicle, and transmits charging information to the control unit when charging is completed.

The control unit includes a charging management unit that controls charging of electric vehicles. The charging management unit includes a user battery management module that senses that an electric vehicle is parked in a private parking lot, receives identification request of a user and a battery state through the charging controller, identifies the user, and manages the battery state; a charging control module that provides battery state information to the identified user and transmits a charging command to the charging controller when there is a charging request from the user; and a charging data management module for receiving and managing charging data from a charging controller when charging is completed and transmitting charging information to a user.

The user battery management module registers and manages identification information of private parking lots and user information in association with each other, and when receiving the identification information of a private parking lot, it extracts identification information matching the identification information of the private parking lot. Therefore, it can specify the location (number of corresponding households) of the user, electric vehicle, and private parking lot from the extracted identification information. When the user is specified, the charging control module transmits charging state information of the identified electric vehicle through an elevator application of the user's portable terminal, and transmits a charging command to the charging controller of the identified dedicated parking lot when a charging request is received from the user. When charging is completed, the charging data management module transmits charging information including charging amount and billing information to the user, maps the charging information to the user information, and registers and manages the charging information.

Advantageous Effects

A vehicle elevator device for vertical parking of individual households in a collective building according to the present invention includes a parking space serving as a common area next to an individual private space and a vehicle elevator for moving vehicles to the parking space. In addition, the parking space and the vehicle elevator may be placed adjacent to each other, and the vehicle may be parked by transferring the vehicle in a horizontal direction from the vehicle elevator. Therefore, the present invention has an excellent effect of being able to park in a personalized parking lot next to a household instead of a common parking lot.

In addition, by parking and exiting the vehicle according to the user's reservation at a time when parking and exiting demand is high, such as commuting time, an excellent effect of minimizing waiting time for parking and exiting occurs.

In addition, the present invention can provide an electric vehicle charging infrastructure for an electric vehicle parked at the personalized parking lot.

DESCRIPTION OF DRAWINGS

FIGS. 14 and 15 schematically show transverse transfer from an elevator to a private parking lot when the sliding movement means according to a preferred embodiment of the present invention is configured in a conveyor belt manner.

FIGS. 35 to 39 schematically show a horizontally moving lifter capable of autonomous driving according to a preferred embodiment of the present invention.

FIG. 48 is a block diagram of the electric vehicle charging system.

BEST MODE

A vehicle elevator device for a collective building according to the present invention includes a vehicle elevator unit, a private parking lot, and a control unit. The vehicle elevator unit moves a vehicle to a floor desired by a user or moves a vehicle parked in a private parking lot of a specific floor to an exit floor. The private parking lot is attached to an individual private space adjacent to at least one direction of the right or left side of the vehicle elevator unit. And the control unit controls the operation of the vehicle elevator.

Modes of the Invention

Hereinafter, a specific embodiment of the present invention is described in detail with reference to the drawings.

Figure 1:
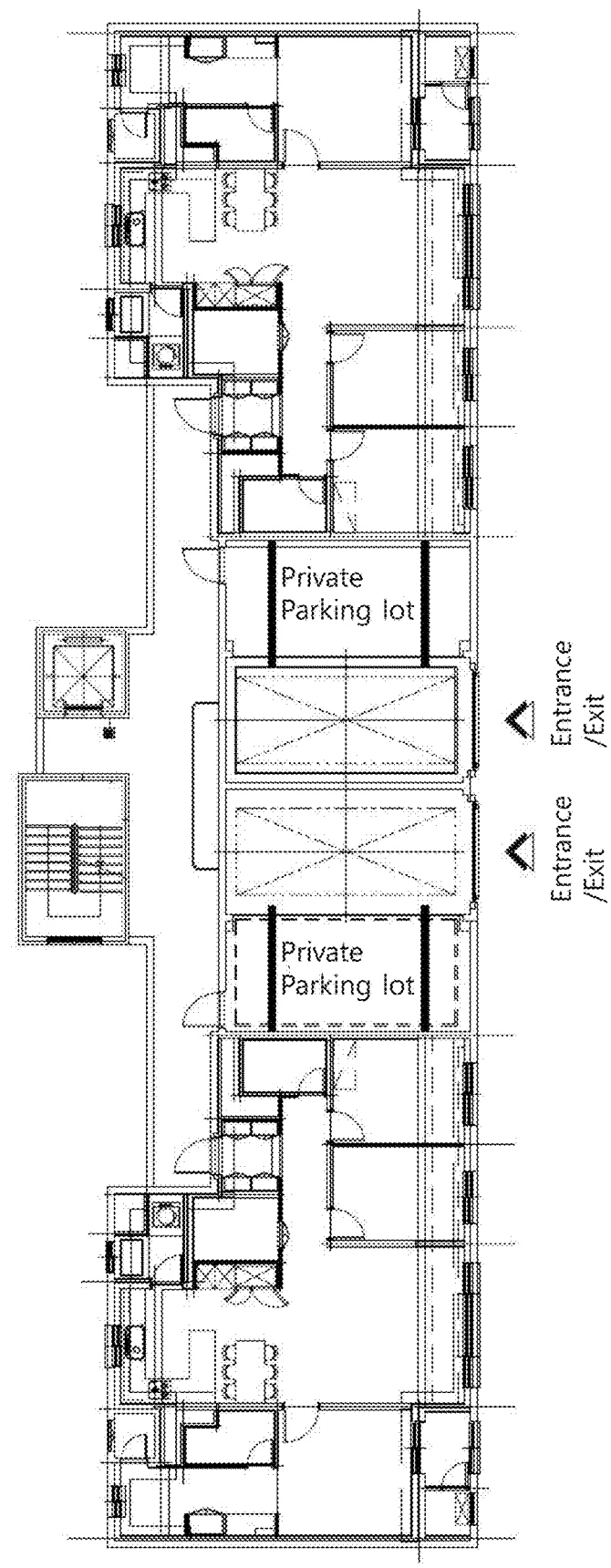
FIGS. 1 and 2 schematically show a plan view and a cross-sectional view of an aggregate building equipped with a vehicle elevator device for a collective building according to a preferred embodiment of the present invention.
Figure 2:
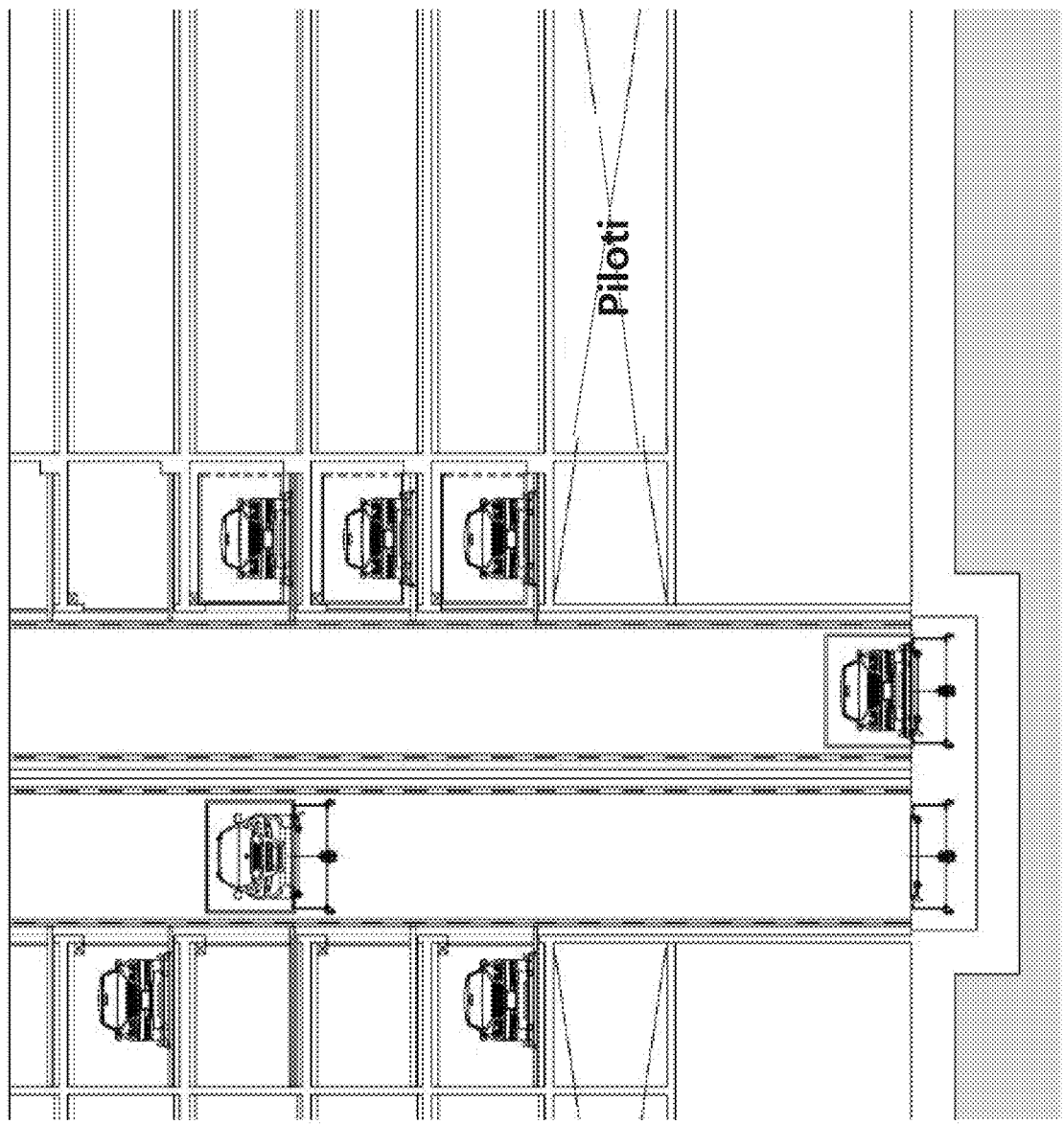

FIGS. 1 and 2 schematically show a plan view and a cross-sectional view of an aggregate building equipped with a vehicle elevator device for a collective building according to a preferred embodiment of the present invention.

The vehicle elevator device for collective buildings according to the present invention may constitute a service core including a person-only elevator and a corridor space.

FIGS. 1 and 2 are for a one-way elevator method in which two vehicle elevators are disposed adjacent to each other and each vehicle elevator moves a vehicle in only one direction, left and right, respectively. However, as shown in FIG. 2, one vehicle elevator may be configured as a two-way elevator method that moves vehicles in both left and right directions for each floor.

However, in the case of a two-way elevator method, it is suitable for low-rise buildings because it may take an excessively long time to load or unload a vehicle in an elevator due to congestion caused by a large number of households in a high-rise building.

Figure 3:
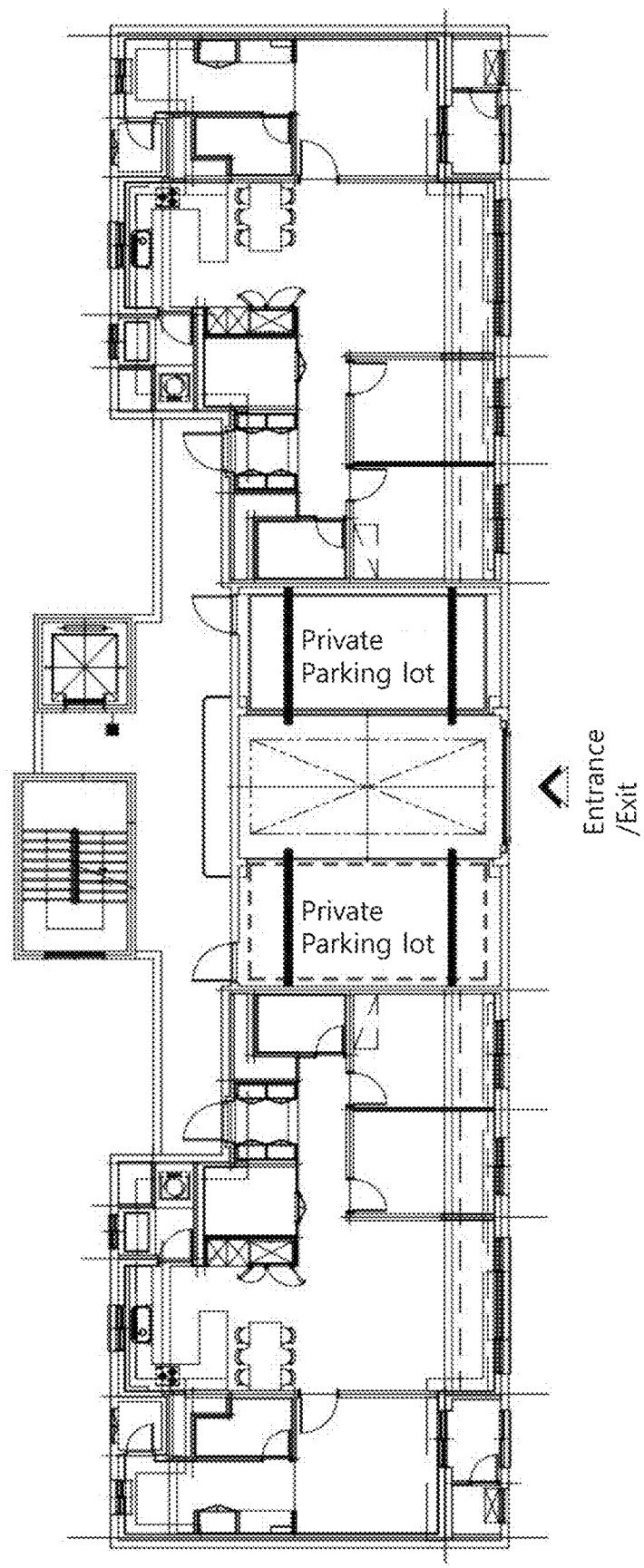
FIG. 3 schematically shows a bidirectional elevator method in which one vehicle elevator moves a vehicle in both left and right directions for each floor according to a preferred embodiment of the present invention.
Figure 4:
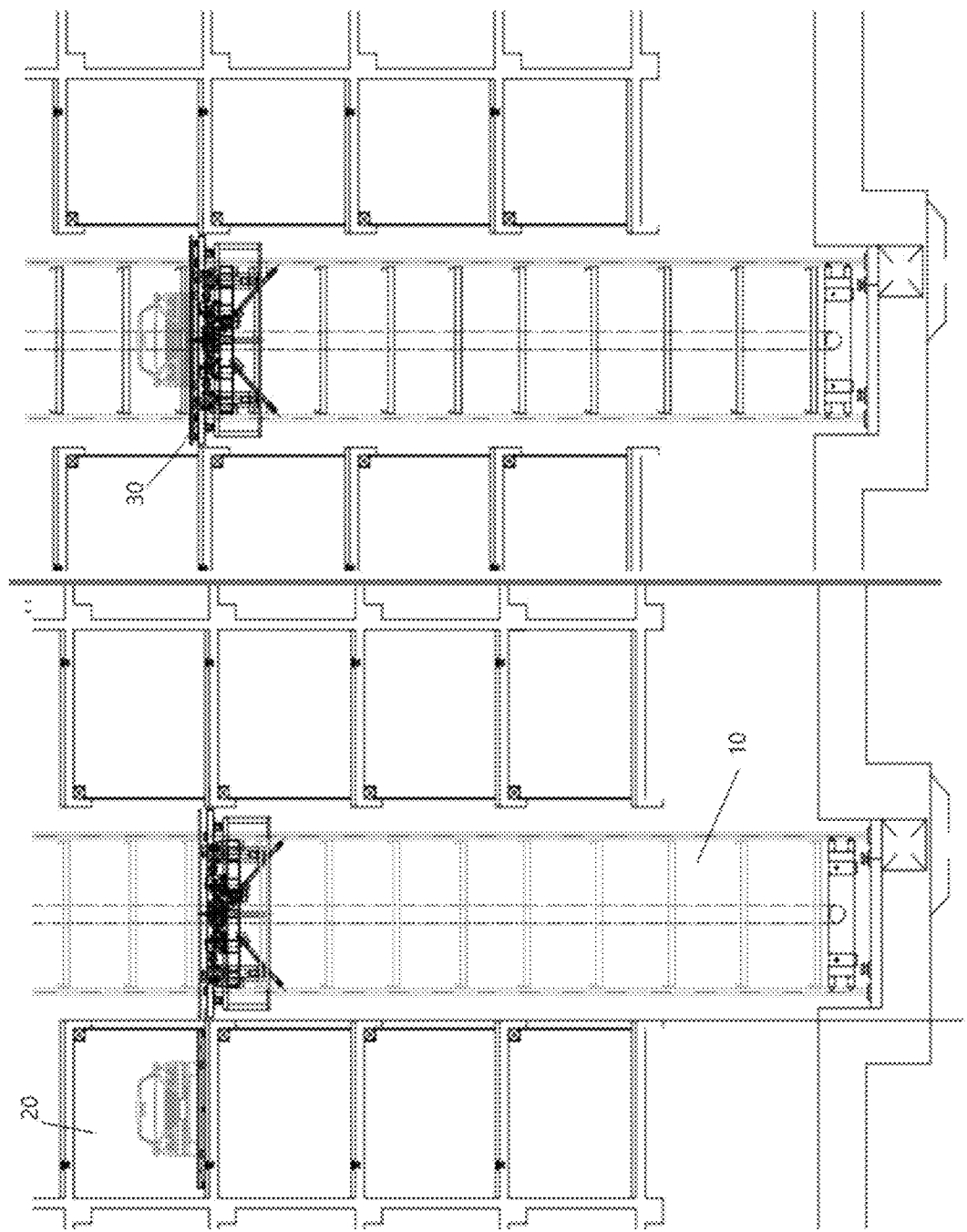
FIG. 4 schematically shows the configuration of a vehicle elevator device for a collective building according to a preferred embodiment of the present invention.
Figure 5:
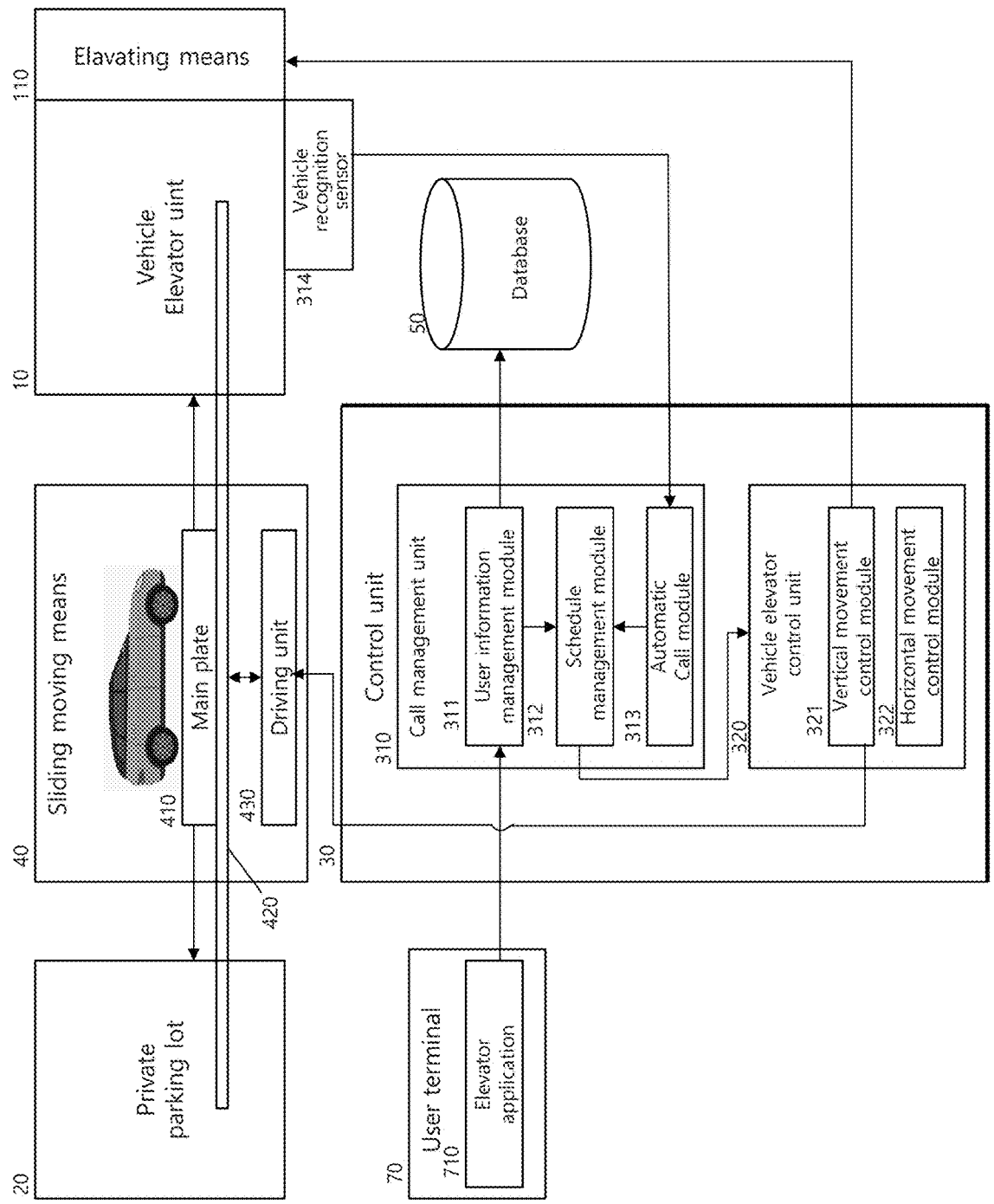
FIG. 5 is a block diagram for controlling the device of FIG. 3.

FIG. 4 schematically shows the configuration of a vehicle elevator device for a collective building according to a preferred embodiment of the present invention, FIG. 5 is a block diagram for controlling the device of FIG. 3.

Referring to FIGS. 4 and 5, a vehicle elevator device for a collective building according to the present invention includes a vehicle elevator unit, a private parking lot, and a control unit. The vehicle elevator unit moves a vehicle to a floor desired by a user or moves a vehicle parked in a private parking lot of a specific floor to an exit floor. The private parking lot is attached to an individual private space adjacent to at least one direction of the right or left side of the vehicle elevator unit. And the control unit controls the operation of the vehicle elevator.

The private parking lot 20 is a dedicated space allocated to each household and can be used exclusively for purposes such as warehouses when there is no vehicle, and a charger (not shown) for charging an electric vehicle can be installed individually.

The vehicle elevator unit 10 includes an elevating means 110 for vertically moving the elevator up and down, and may be connected to the highest floor in a ground or underground parking lot. The role of the vehicle elevator unit is as follows. When entering, the vehicle is loaded onto the vehicle elevator on the ground or basement floor and vertically moved to the specific floor desired by the driver. And when arriving at the specific floor, the vehicle is transferred and parked in the lateral direction where the private parking lot is located. When there is an exit call from a private parking lot on a specific floor for exit, the vehicle moves vertically to the specific floor, transports the vehicle parked in the private parking lot to the inside of the elevator unit in the lateral direction, and then vertically moves to the ground or basement floor to exit the vehicle.

Here, the elevating means 110 is a self-evident configuration generally applied to a typical elevator structure, and since it is a part away from the core of the present invention, a detailed description thereof will be omitted.

In addition, the present invention may be configured to automatically transfer a vehicle to a dedicated parking lot on a specific floor in a state where the driver is on board as well as in a state where the driver is not present (in a state where the driver is not on board).

Here, the vehicle elevator device should move the vehicle in a transverse direction, not in a forward-backward direction. Therefore, since it is impossible to move through driving a vehicle, it may be configured to include a sliding movement means 30 for horizontally moving the vehicle in the lateral direction between the dedicated parking lot and the vehicle elevator unit.

Figure 6:
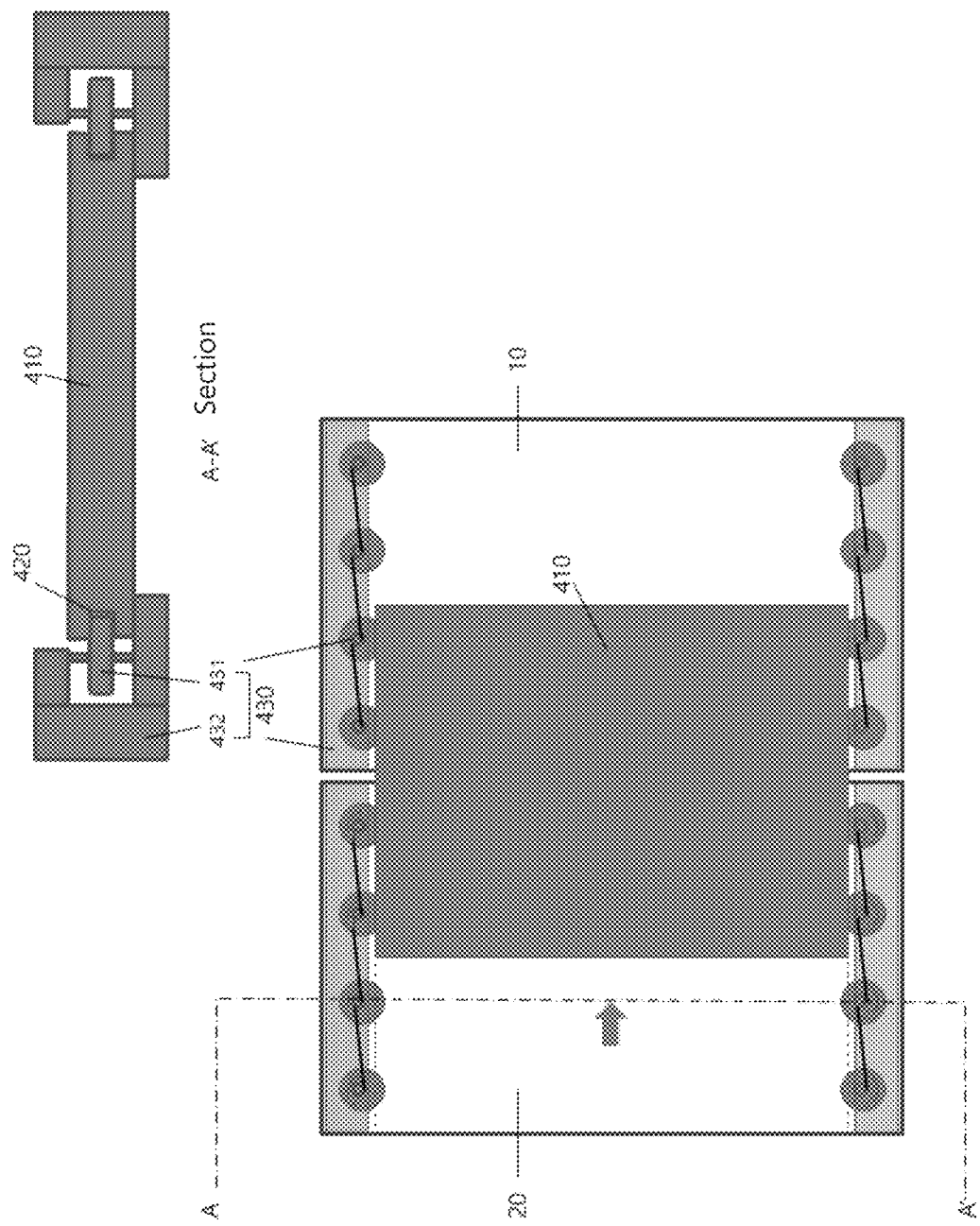
FIGS. 6 and 7 schematically show the horizontal movement of the vehicle through the main plate according to a preferred embodiment of the present invention.
Figure 7:
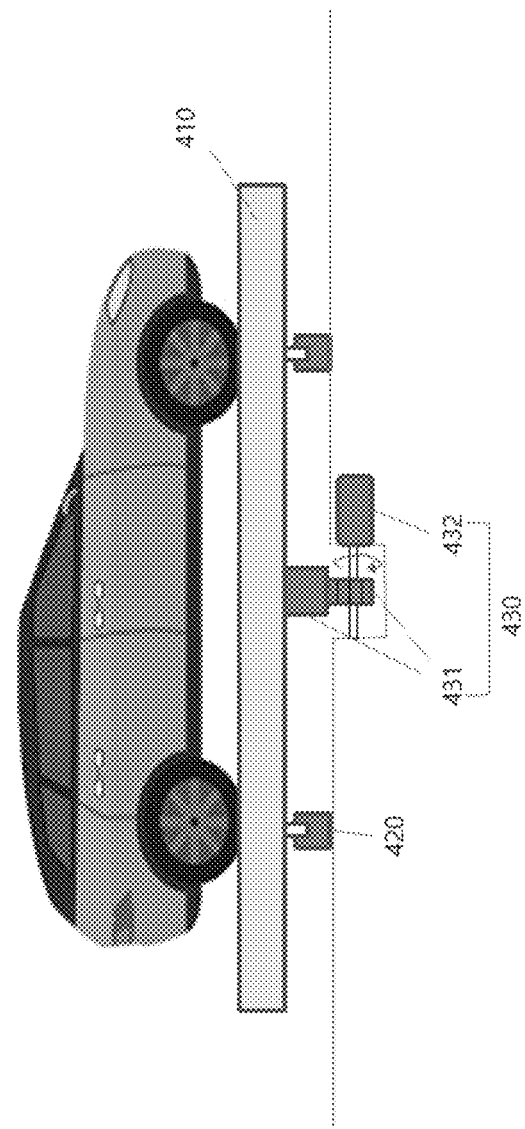

FIGS. 6 and 7 schematically show the horizontal movement of the vehicle through the main plate according to a preferred embodiment of the present invention.

The sliding movement means 40 includes a main plate 410 on which a vehicle is loaded to enter or exit a vehicle elevator, a rail 420 formed on the side or bottom of the main plate, and a driving unit 430. The driving unit 430 includes a rotating member 431 seated on the rail and providing a rotational force to horizontally move the rail in a lateral direction, and a driving motor 432 providing a driving force.

Here, the main plate 410 may be installed on the floor of a private parking lot and allocated as a dedicated main plate. When there is a call from the user to enter, the vehicle elevator unit loads the main plate in the user's private parking lot and vertically moves to the ground or basement floor. After that, the vehicle is loaded on the main plate and moved vertically to the floor of the private parking lot. After that, the vehicle can be parked by sliding it.

Therefore, the sliding moving means 40 serves to slide and move the main plate 410 disposed for each private parking lot on each floor. When the vehicle elevator arrives at a specific floor, it horizontally moves the main plate 410 into the vehicle elevator through sliding movement control. Or, conversely, it can horizontally move the main plate 410 inside the vehicle elevator to the private parking lot 20.

The rotating member 431 may be configured in the form of a pulley such as a wheel or a roller. In a state in which the rotating member is engaged with a rail formed on a side surface or a bottom of the main plate, the main plate may move horizontally according to a rotational force of the rotating member. Here, the main plate 410 may be horizontally reciprocated according to forward and reverse rotation of the rotating member.

In addition, the rail 420 and the rotating member 431 may be composed of a gear assembly combining gears such as rack gears.

The driving motor 432 provides a rotational force to the rotating member so that the main plate can slide in the lateral direction. It may consist of a stepper motor or an electric vehicle.

The position of the driving unit 430 may be formed on the side or bottom surface according to the position of the rail formed on the main plate.

FIG. 6 is a structure in which rails are integrally formed on the side of the main plate. The drive unit may be formed on the side of the private parking lot and the vehicle elevator so that the rotating member can be seated on the rail.

Figure 8:
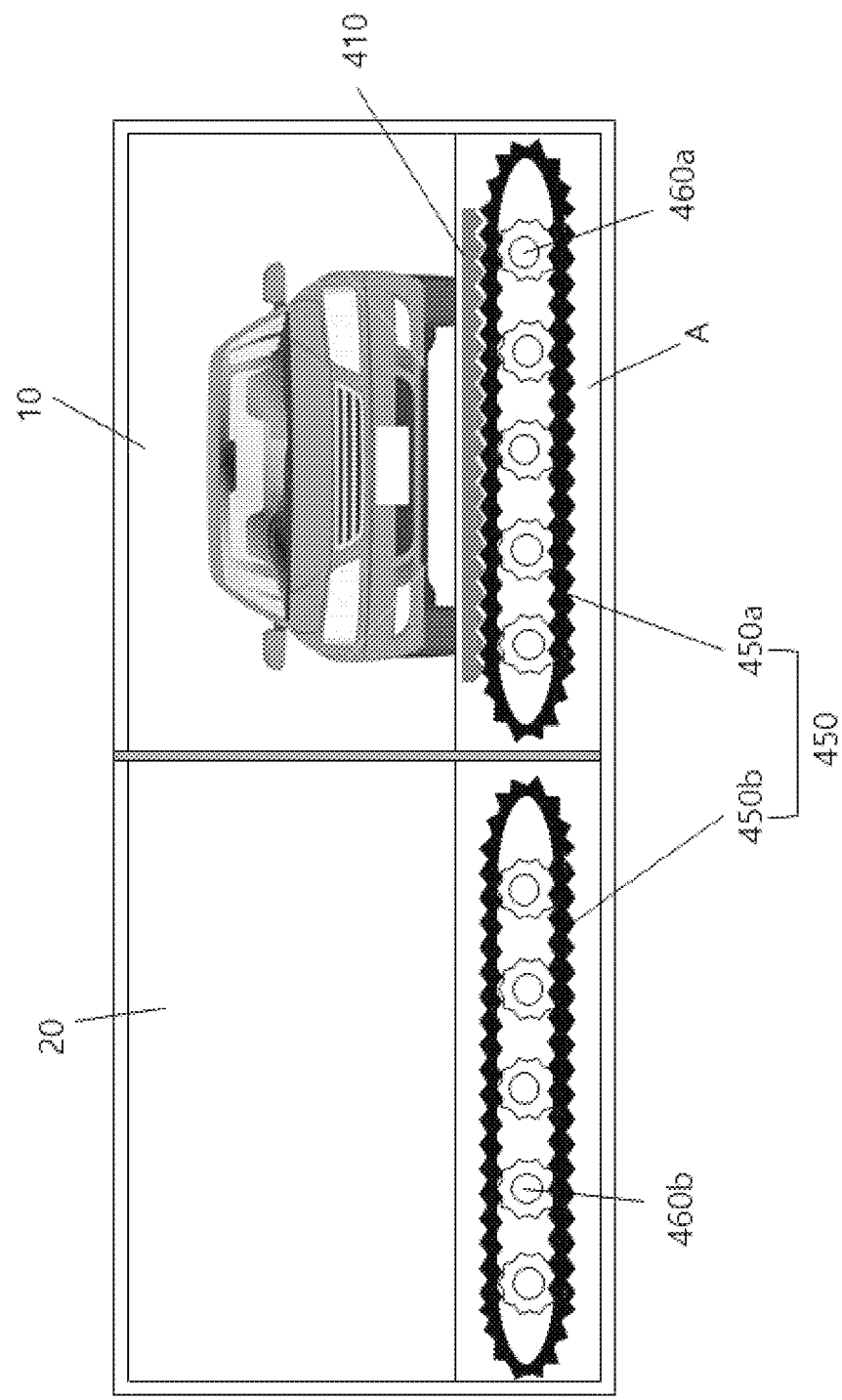
FIG. 8 schematically shows a sliding movement means according to another embodiment of the present invention.

FIG. 8 schematically shows a sliding movement means according to another embodiment of the present invention.

Referring to FIG. 8, the sliding moving means 40 according to the present invention may be configured in a conveyor belt method.

More specifically, the sliding movement means 40 is configured to include a main plate 410 on which a vehicle is loaded to move a vehicle in and out of a vehicle elevator and a conveyor belt 450 formed below the main plate and a conveyor drive unit 460 coupled to the conveyor belt to provide a driving force to the conveyor belt.

The main plate 410 is installed to be at the same level as the floor of a private parking lot or elevator. A conveyor belt 450 and a conveyor driving unit 460 may be formed in the conveyor belt accommodating portion A under the main plate.

The conveyor belt 450 may be configured to be supported on an inner sidewall of the conveyor belt accommodating portion A or a separate frame.

Here, the main plate 410 may be composed of a single plate covering the entire lower part of the vehicle, but may be composed of two-unit plates formed only in contact with the wheels of the vehicle.

Figure 9:
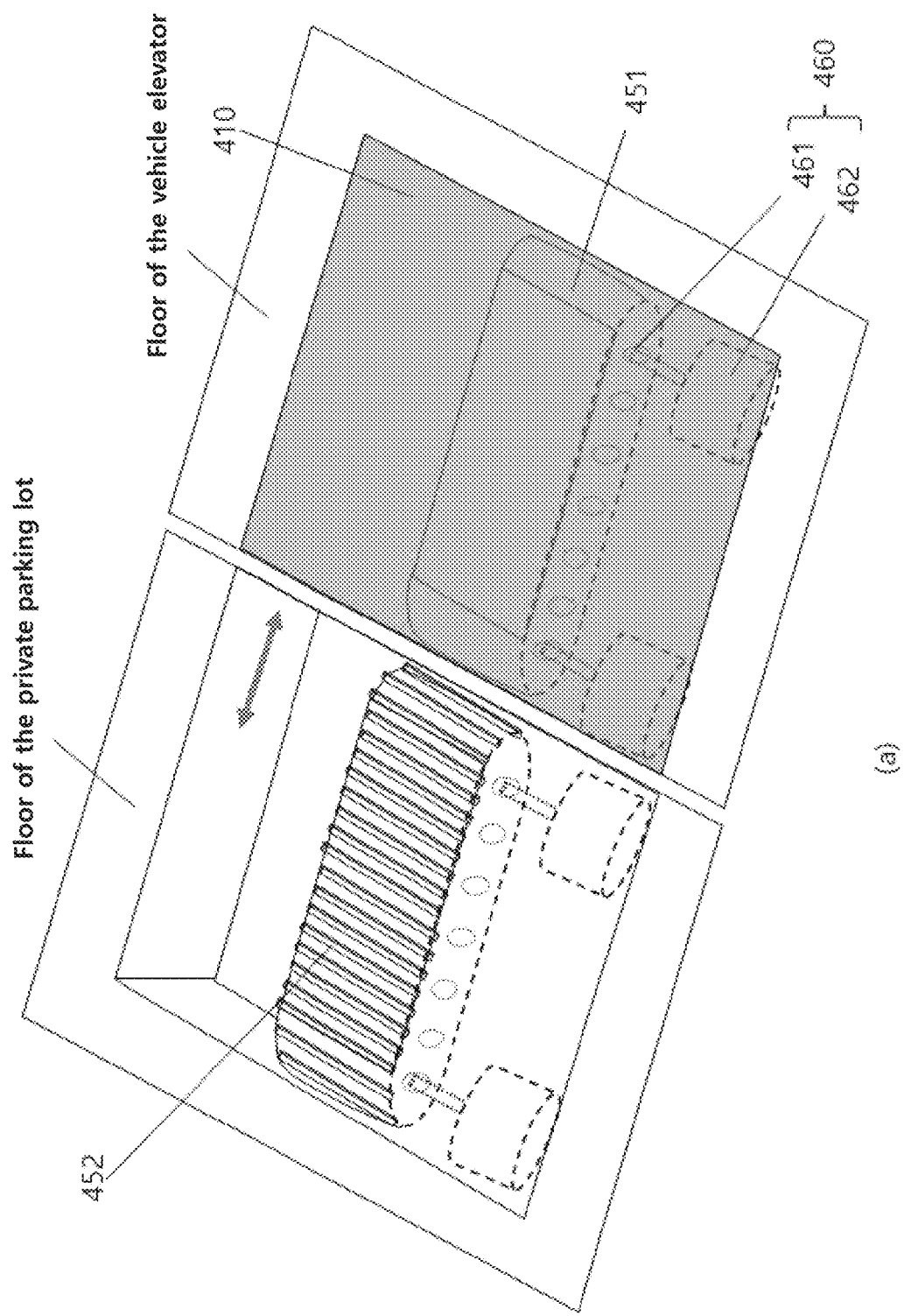
FIGS. 9 and 10 show the configuration of a conveyor belt according to a main plate according to a preferred embodiment of the present invention.
Figure 10:
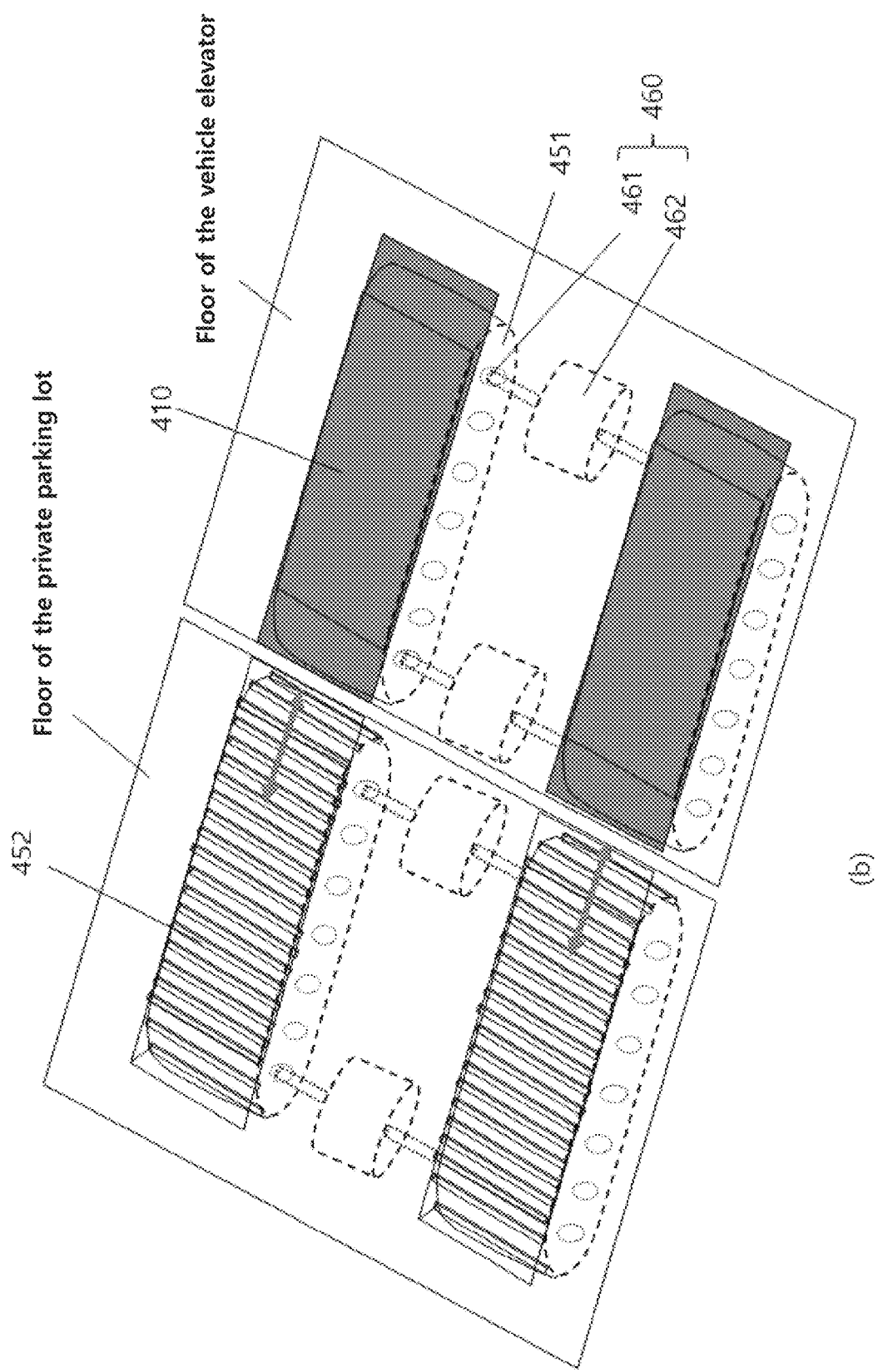
Figure 11:
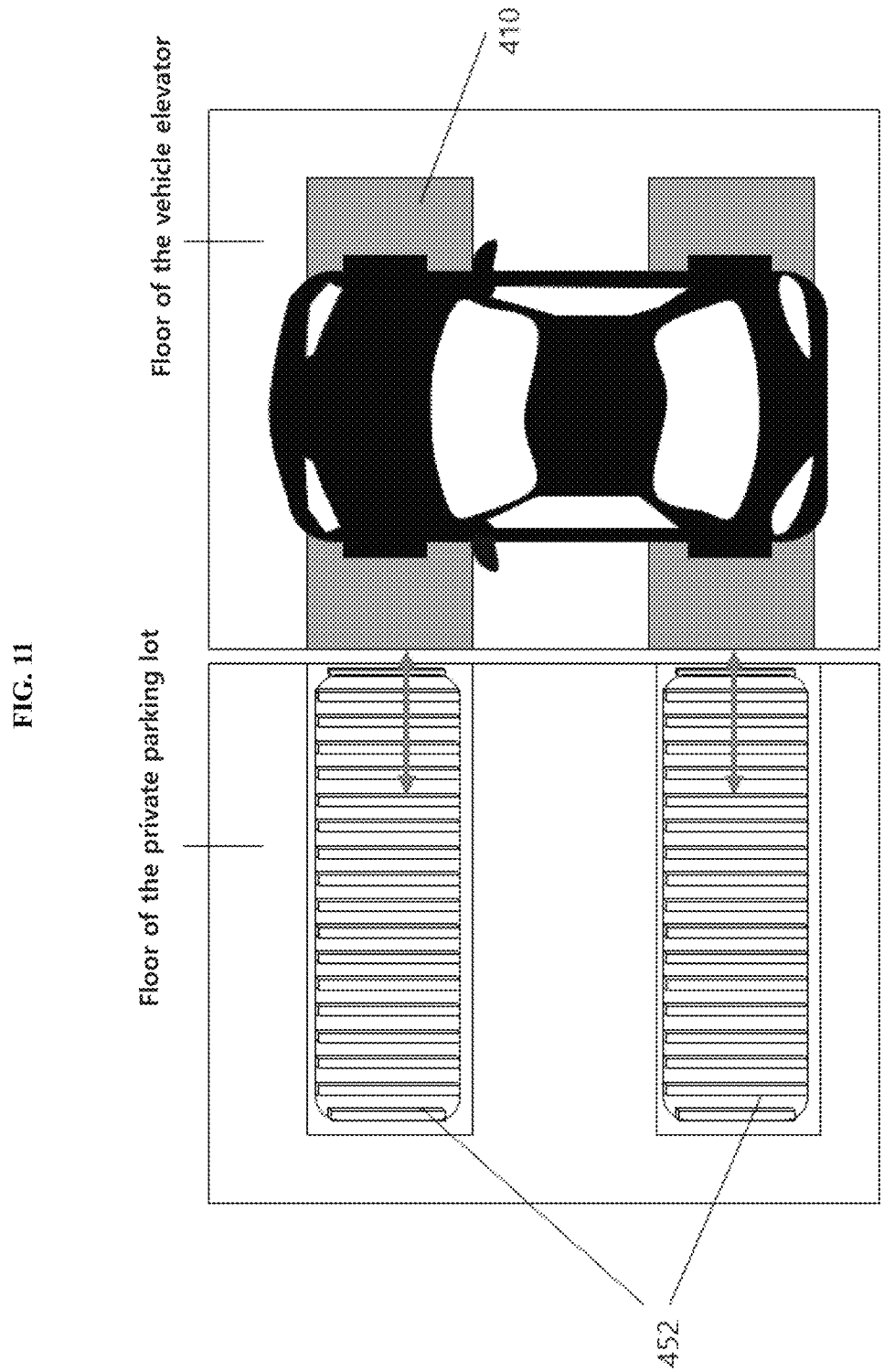
FIGS. 11, 12 and 13 show that a vehicle is loaded on the main plate.
Figure 12:
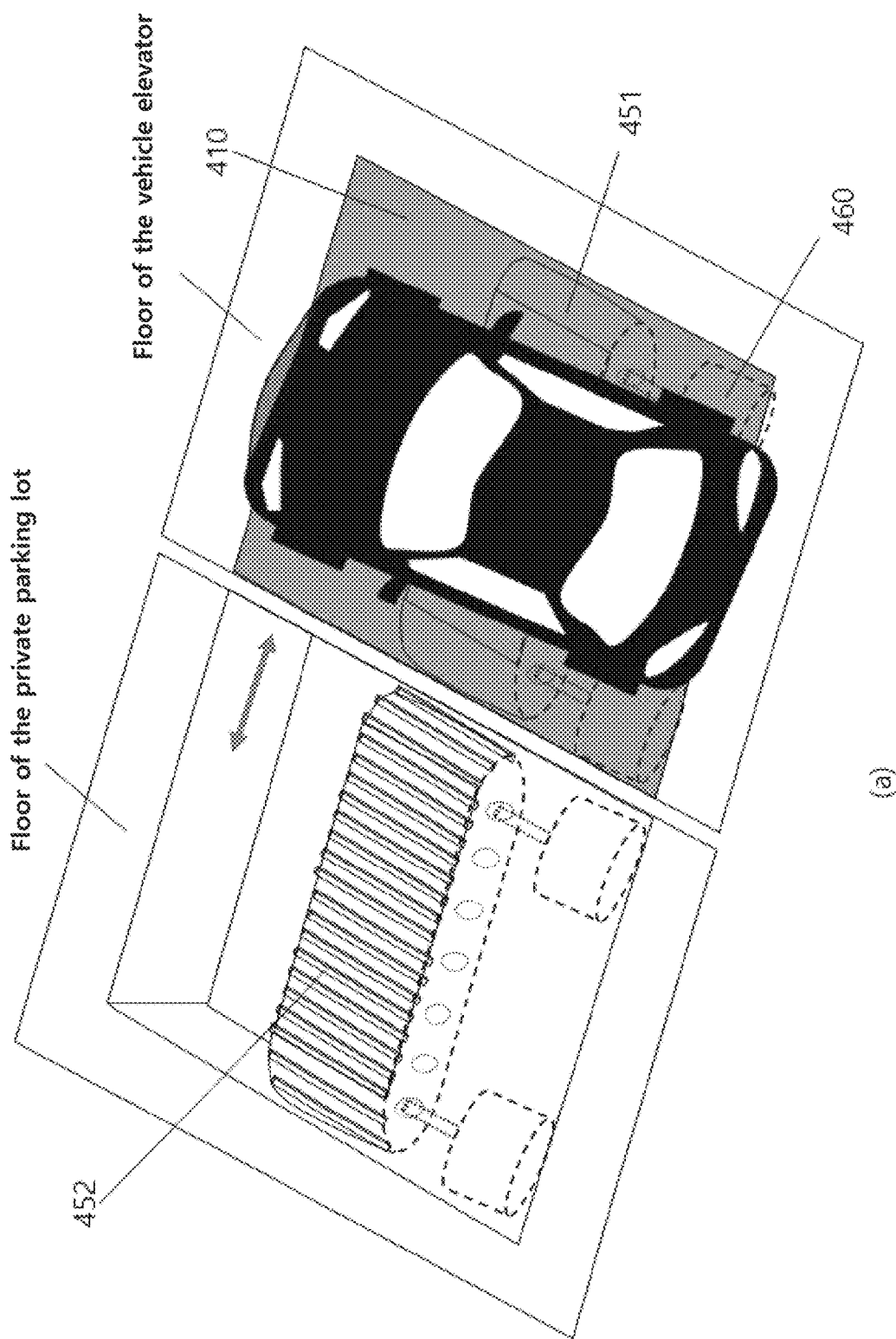
Figure 13:
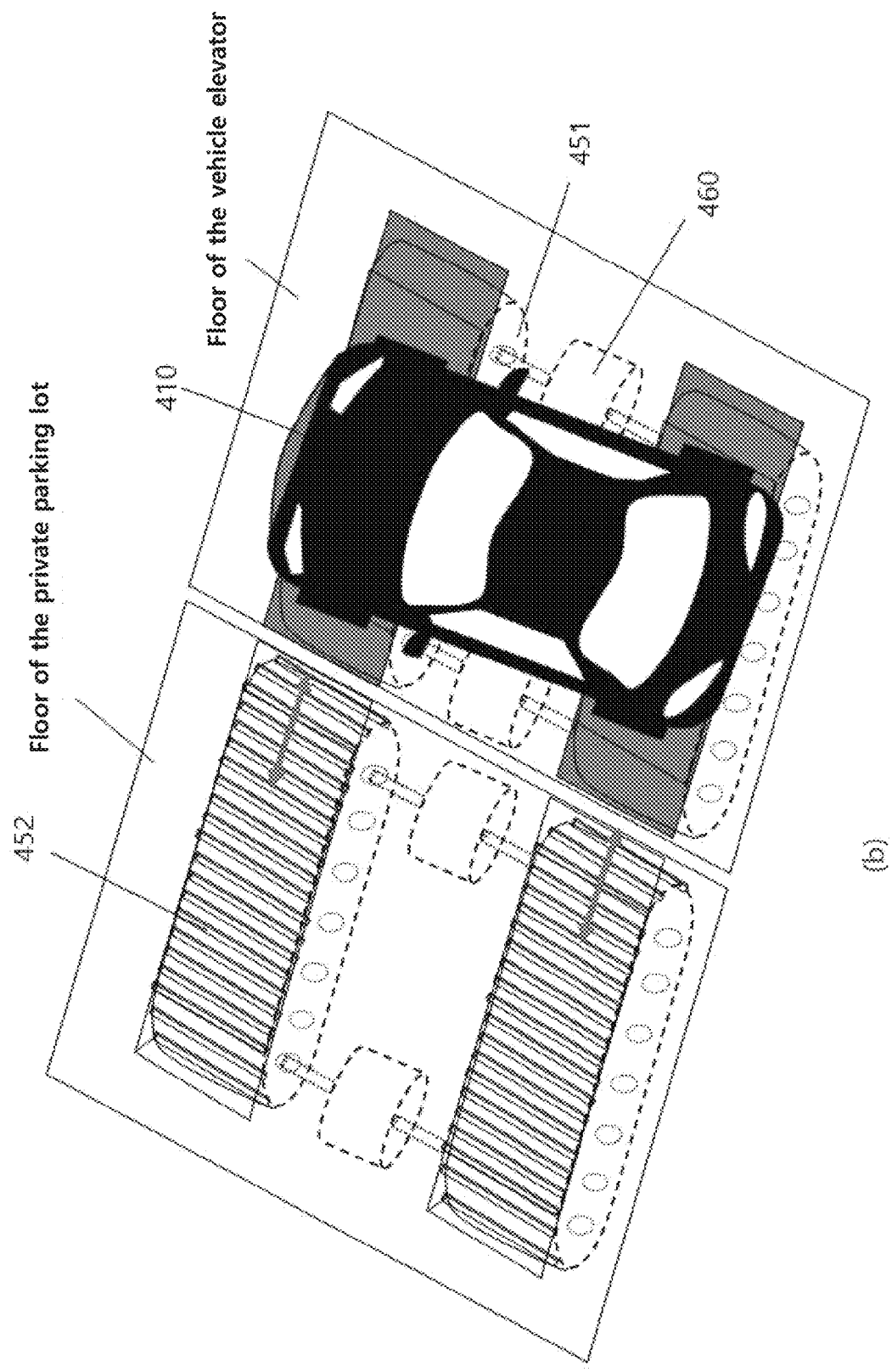

FIGS. 9 and 10 show the configuration of a conveyor belt according to a main plate according to a preferred embodiment of the present invention, and FIGS. 11, 12 and 13 show that a vehicle is loaded on the main plate.

Referring to FIGS. 9 to 13, when the main plate 410 is composed of a single plate as shown in FIG. 9, the conveyor belt may be composed of a single plate. And when it is composed of two-unit plates as shown in FIG. 10, it may be composed of two conveyor belts.

When the main plate 410 is composed of two-unit plates, as shown in FIG. 8B, they may be respectively formed at the loading parts of the front and rear wheels of the vehicle.

The conveyor belt 450 serves to move the main plate in the lateral direction below the main plate 410.

The conveyor belt 450 may be composed of a first conveyor belt 450a formed on the floor of a vehicle elevator and a second conveyor belt 450b formed on the floor of a private parking lot.

The driving unit 460 also provides a first conveyor driving unit 460a that provides a driving force to the first conveyor belt 450a and a second conveyor drive unit 460b that provides a driving force to the second conveyor belt 450b.

Basically, the vehicle elevator unit 10 serves to move vertically so that vehicles can be horizontally entered and exited from the private parking lot on each floor. Since a door is formed between the vehicle elevator and the private parking lot, the conveyor belt must be configured separately.

Even if the conveyor belts are separated, the main plate 410 can be stably transferred in the lateral direction because the distance between the conveyor belts is not wide.

Between the conveyor belt and the main plate 410, teeth may be formed to engage with each other in order to prevent the main plate from being separated during lateral movement.

And the conveyor driving unit 460 for driving and controlling the conveyor belt 450 may be configured to include a wheel 461 formed inside the conveyor belt, a motor 462 providing driving force to the wheel and a controller (not shown) for controlling driving of the motor.

A plurality of wheels 461 may be formed inside the conveyor belt, and a plurality of motors 462 may also be formed according to driving force.

And, as shown in FIG. 7b, when the first conveyor belt and the second conveyor belt each consist of two-conveyor belts, the wheels are connected to the two-conveyor belts by an axis, and the two-conveyor belts can operate in synchronization.

The controller serves to control the main plate 410 to be transferred in the transverse direction through the operation of the motor under the control of the control unit 30.

Figure 15:
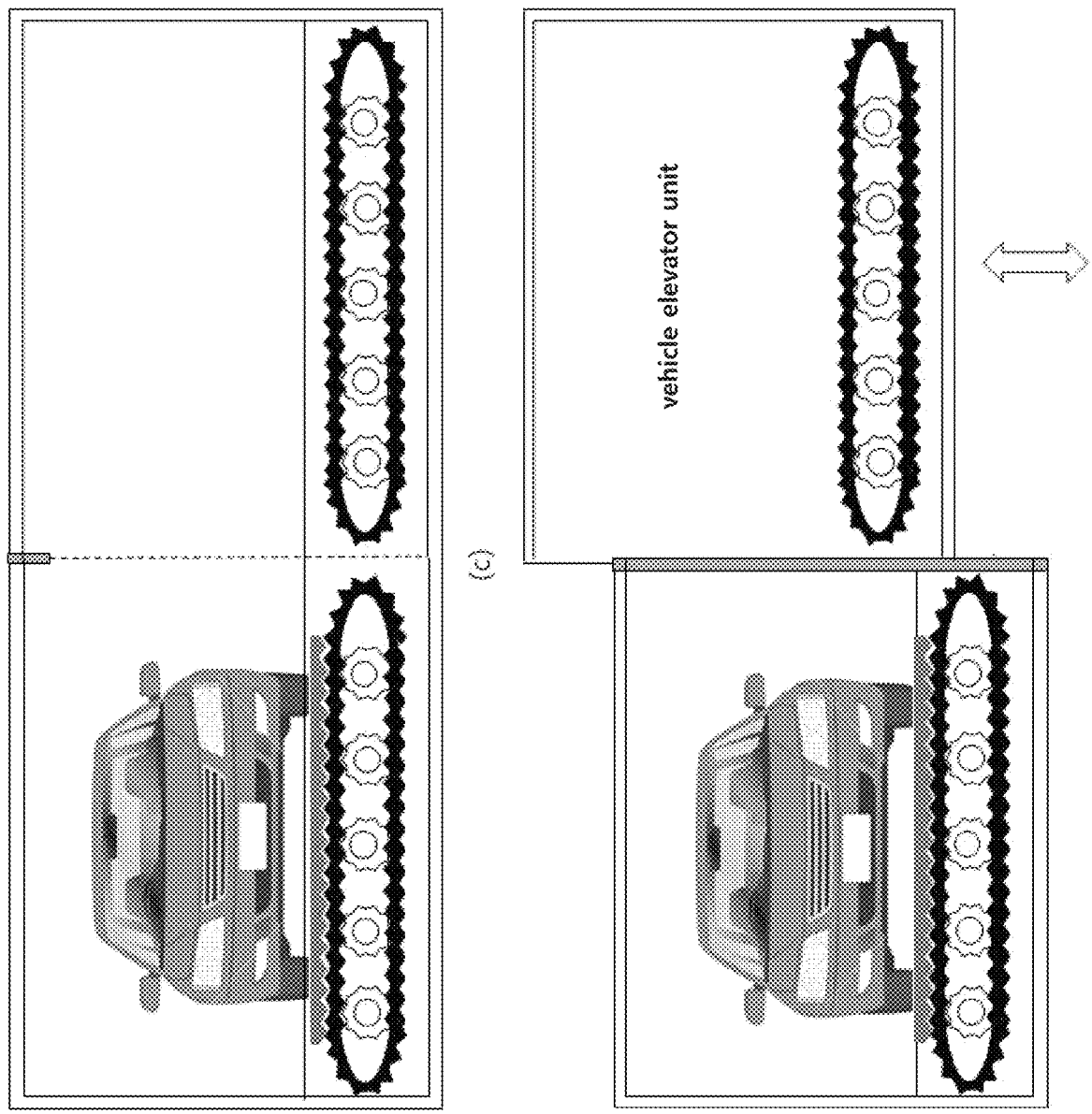

FIGS. 14 and 15 schematically show transverse transfer from an elevator to a private parking lot when the sliding movement means according to a preferred embodiment of the present invention is configured in a conveyor belt manner.

When the vehicle loaded on the main plate 410 moves vertically through the vehicle elevator unit 10 to the floor of the vehicle owner's household, the drive unit 461 in the elevator operates. Accordingly, the first conveyor belt 451 moves laterally in the direction of the private parking lot 20. And the driving unit 462 in the private parking lot 20 operates. Accordingly, the second conveyor belt 452 transports the vehicle into the private parking lot 20 while moving in the lateral direction.

As described above, when the vehicle is completely transferred into the private parking lot 20 and parked, the vehicle elevator unit 10 moves vertically to allow other vehicles to enter and exit.

Then, in the opposite order to the operation of moving in the lateral direction from the vehicle elevator unit 10 to the private parking lot 20, the vehicle parked in the private parking lot 20 is moved laterally to the vehicle elevator unit 10. Therefore, a detailed description will be omitted.

FIGS. 16 to 22 schematically show sliding movement means according to another embodiment of the present invention.

Referring to the FIGS. 16 to 22, the sliding movement means 40 according to the present invention may be composed of a moving lifter 45. The moving lifter moves horizontally in the lateral direction by lifting a vehicle parked in a private parking lot or loaded into a vehicle elevator unit.

Figure 16:
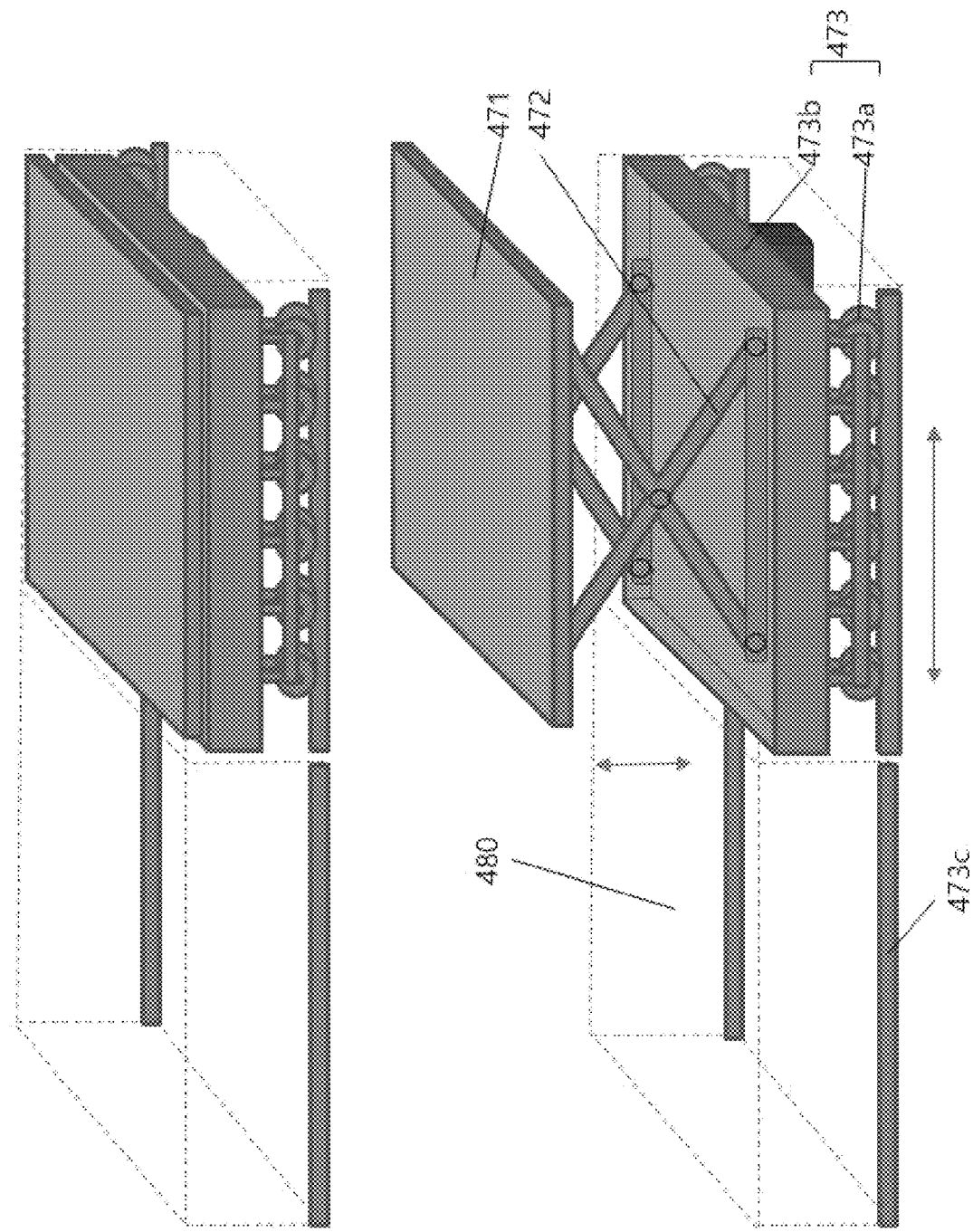
FIGS. 16 to 22 schematically show sliding movement means according to another embodiment of the present invention.
Figure 17:
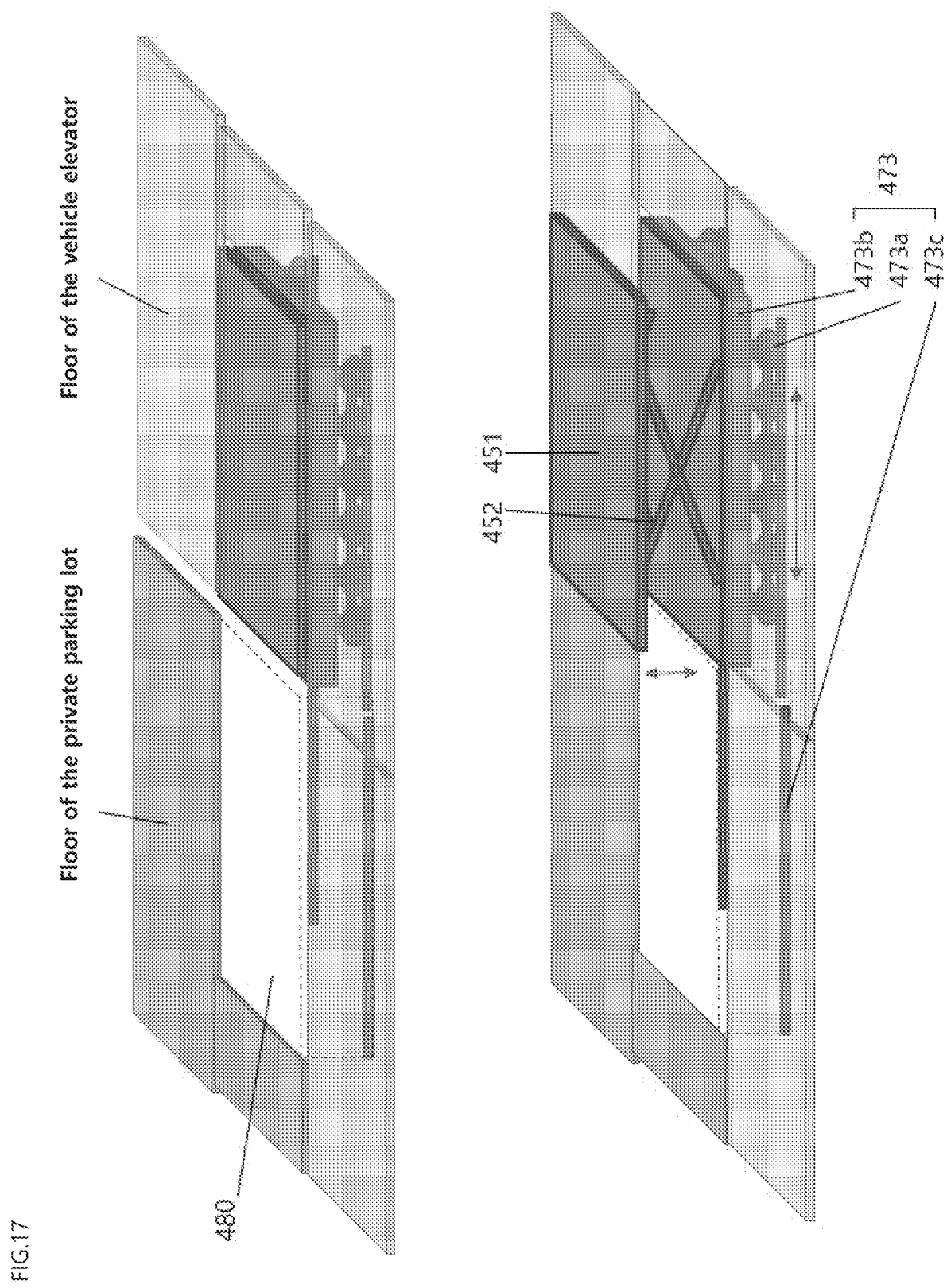
Figure 18:
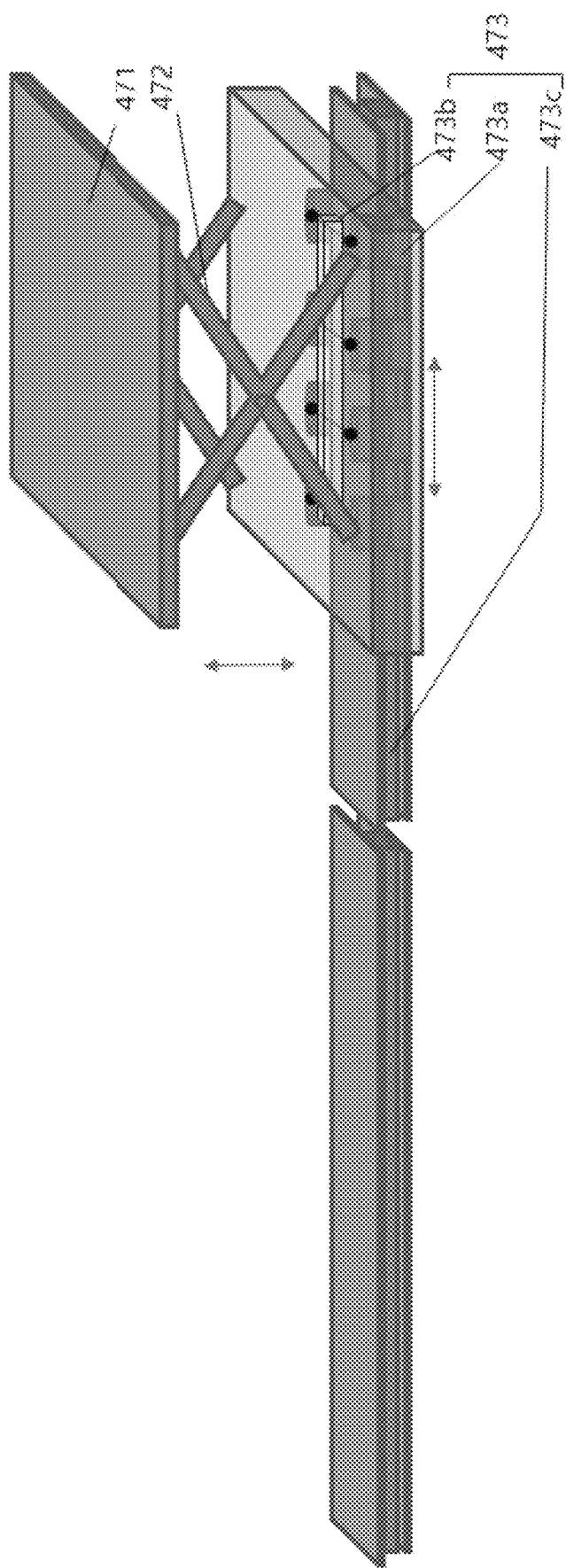

As shown in FIGS. 16 to 18, the moving lifter 45 may be configured in a way to directly load a vehicle without a main plate. And as shown in FIGS. 19 to 22, it can be configured in such a way that there is a main plate on which the vehicle is loaded.

First, in the method of directly loading a vehicle, a moving guide groove 480 is formed on a dedicated parking lot and an elevator floor for the movement of the moving lifter 470, respectively. Accordingly, the movement lifter may be configured to move horizontally through the bottom or side of the movement guide groove.

In the embodiments of FIGS. 16 to 18, it is possible to enter and exit a vehicle without a dedicated main plate. Therefore, since there is no need to bring the main plate from the private parking lot, there is an advantage in that the time required for vehicle movement can be shortened.

The moving lifter 470 is used when a vehicle parked in a private parking lot is moved into a vehicle elevator for exiting, or a vehicle loaded in a vehicle elevator is moved and parked to a private parking lot for entering. After it lifts the vehicle (Lift-up), it moves the vehicle horizontally in the lateral direction. And then it lifts the vehicle down to the floor (Lift-down). Accordingly, it can park a vehicle in a private parking lot or exit a vehicle parked in a private parking lot.

More specifically, the moving lifter 470 may be configured to include a lifting plate 471 located at the bottom between the wheels of a vehicle parked in a private parking lot or loaded in a vehicle elevator unit, a lifter 472 that lifts up the lifting plate and lifts the vehicle and a moving means 473 being coupled to the lower part of the lifter and horizontally moving the vehicle to a private parking lot or a vehicle elevator when the vehicle is lifted.

The lifting plate 471 has the same height as the floor in a lifted-down state, and in a lifted-up state, the vehicle is lifted as it comes into contact with the bottom surface between the wheels of the vehicle. Thus, it comes into direct contact with the underside of the vehicle. Therefore, in order to prevent damage to the vehicle during the lift-up process, it may be constructed by combining an elastic layer of a material having elasticity such as rubber or silicone on a base plate made of metal.

The lifter 472 serves to lift up or down the lifting plate. It may consist of a hydraulic cylinder type lifter. It raises and lowers the vehicle by the action of the cylinder pushing up the plunger by the pressure of the oil.

Here, since the configuration of the lifter is obvious to those skilled in the art, detailed configuration and description thereof will be omitted.

The lifter 472 may be lifted up by being exposed on the body of the moving means 473 or lifted down to be accommodated in the body.

On the other hand, the method of having a main plate for loading a vehicle as shown in FIGS. 19 to 22 may be configured by including the main plate 410 lifted up/down by the moving lifter 470, a movement guide groove 480 for a moving lifter formed on a private parking lot and an elevator floor, respectively, so that the moving lifter can slide and move and the plate fixing part 481 formed on the edge of the moving guide groove 480.

Here, the moving guide groove 480 provides a space in which the horizontal movement lifter can move after lifting the main plate 410. The plate fixing part 481 serves to fix the main plate 410. It may consist of a protrusion or a continuous jaw protruding from the bottom of the corner of the moving guide groove 480.

An upper portion of the plate fixing part 481 may further include a shock absorbing material capable of absorbing shock in order to prevent damage caused by impact during the loading process of the main plate 410. The cushioning material may be made of a material having elasticity such as rubber or silicone.

The height of the plate fixing part 481 is greater than the height of the moving lifter 450 when the lifting plate 451 of the moving lifter 470 is lifted-down. Through this, the moving lifter 470 can move through the moving guide groove 480 in a lift-down state while the main plate is placed. And, when the main plate 410 is placed on the plate fixing part 481, it may be configured the same as the bottom surface of the corresponding layer.

Figure 19:
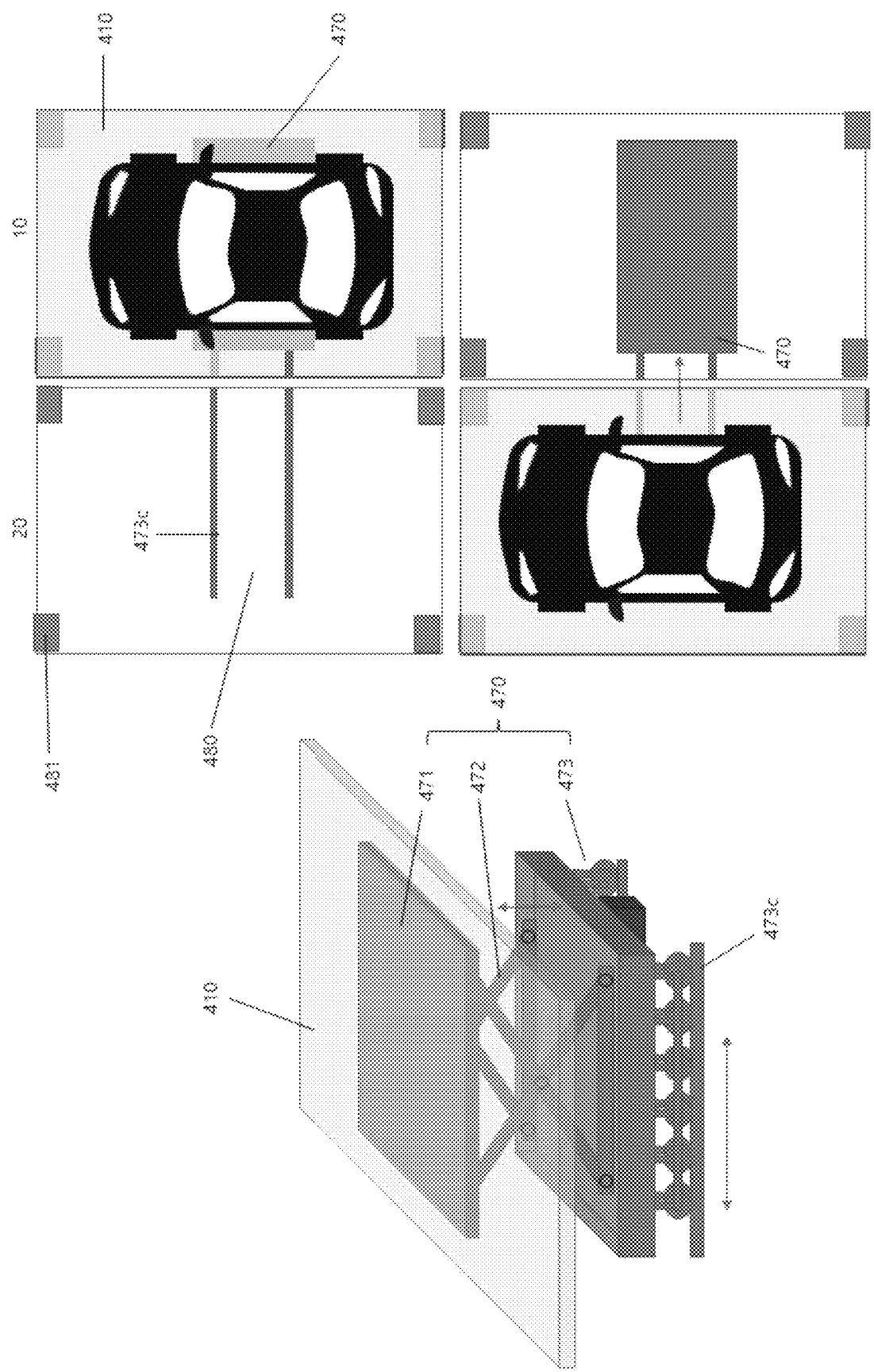
Figure 20:
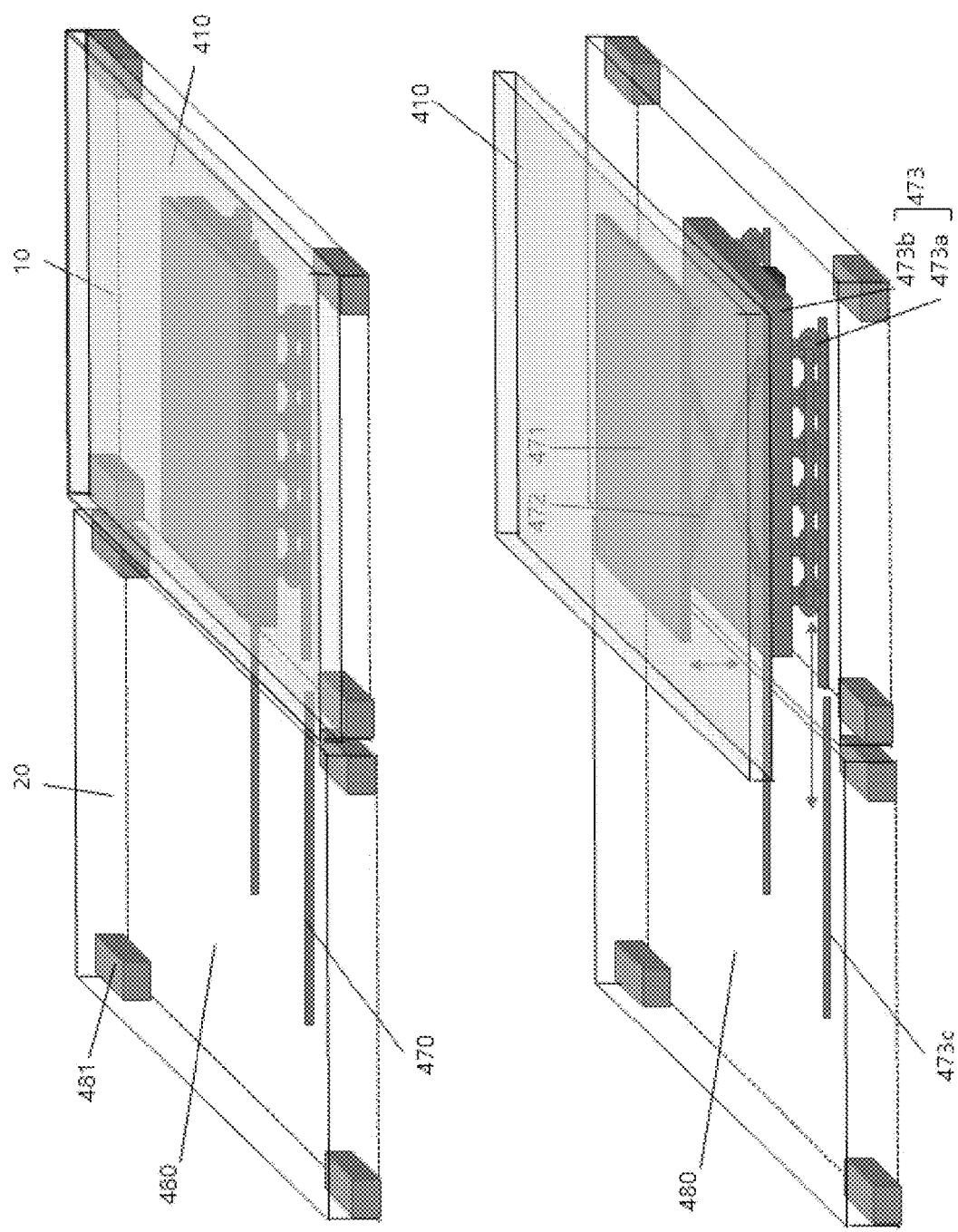
Figure 21:
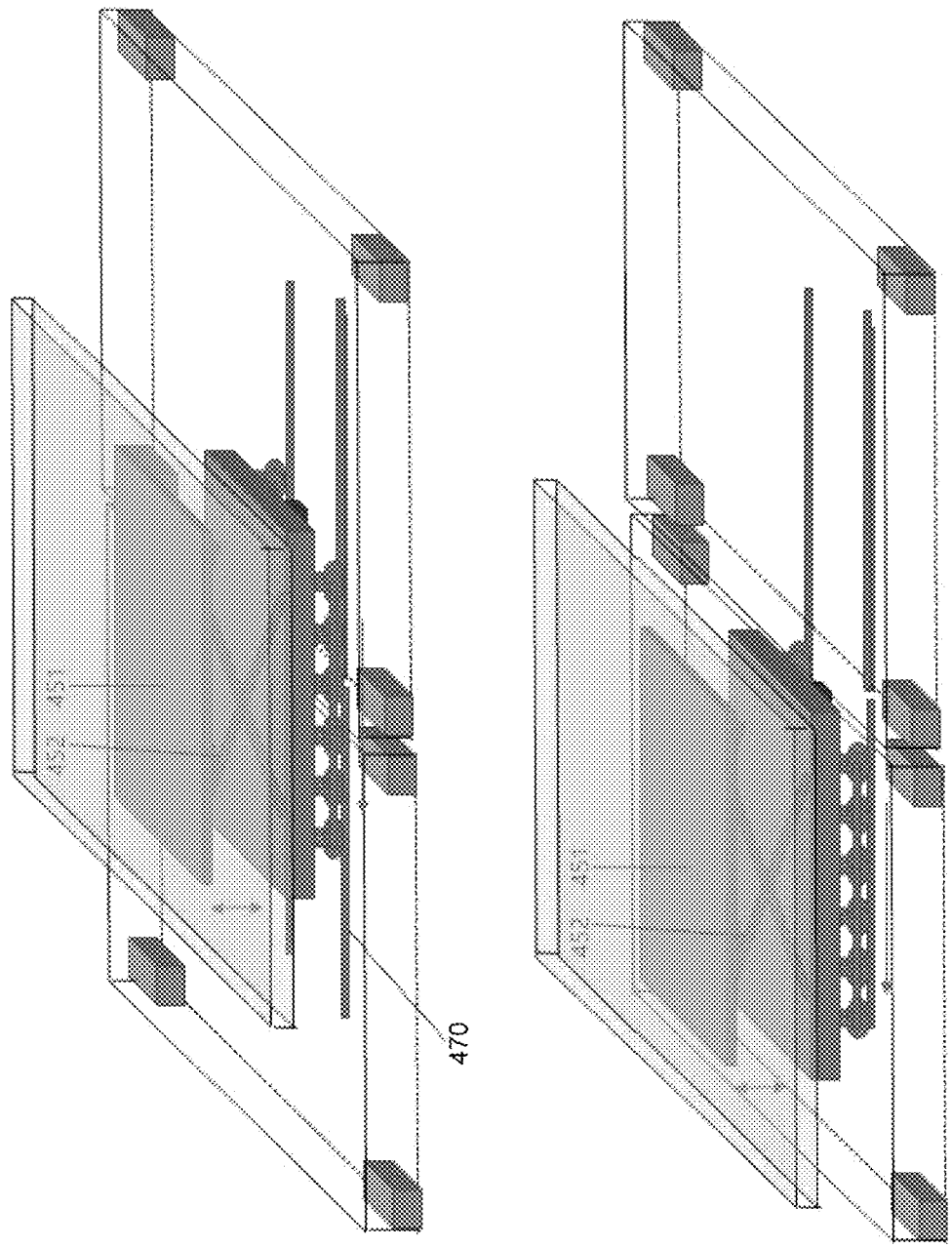
Figure 22:
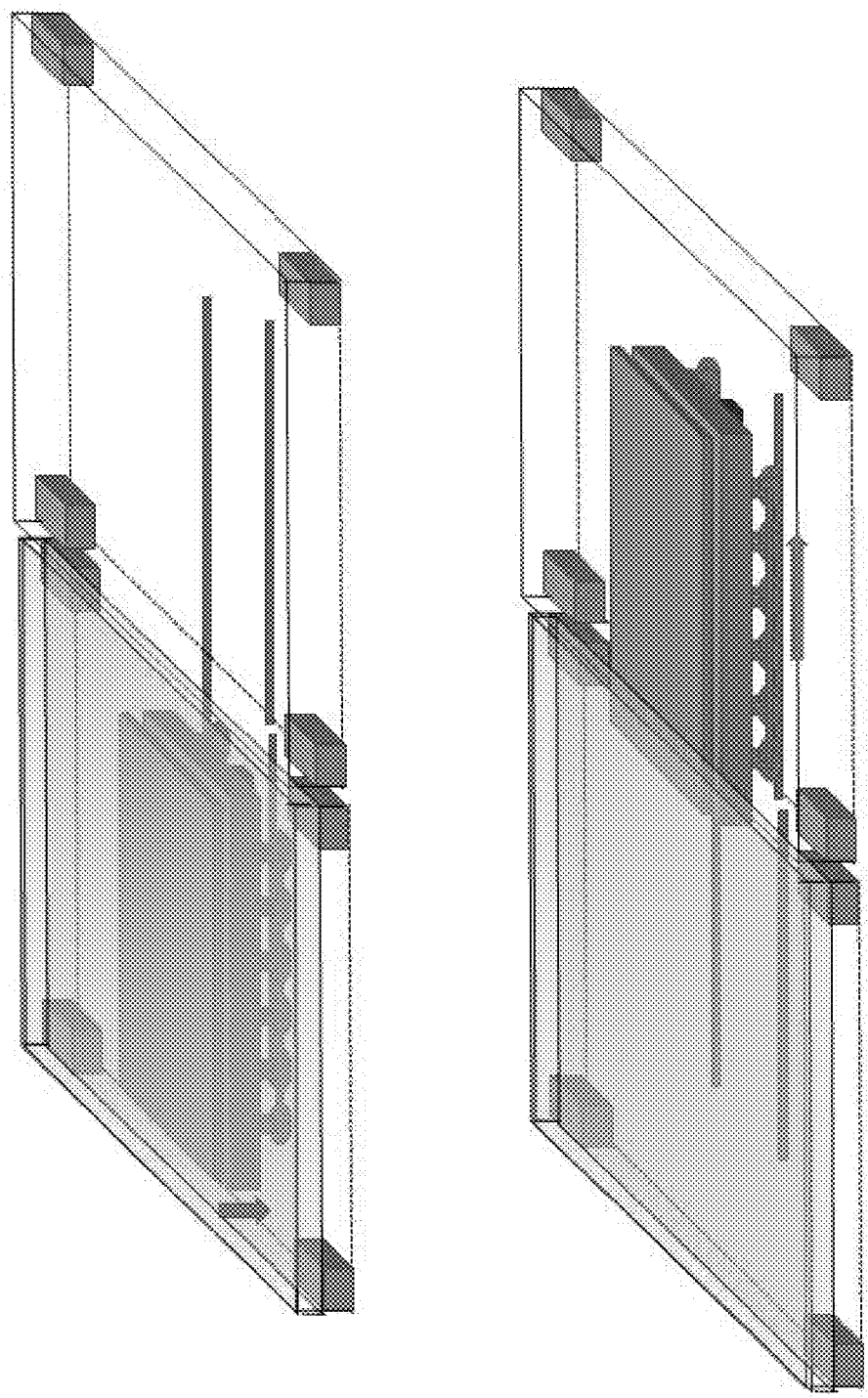

The moving means 473 of the moving lifter 470 may be configured as a rail type as shown in FIG. 19. It may be configured to include a moving member 473a coupled to a rail 473c formed on the bottom of the moving lifter and horizontally moving the transverse direction along the rail, and a driving motor 473b providing driving force to the moving member.

The moving member 473a is configured to linearly move in a transverse direction along a rail 473c formed on the bottom or side of the moving groove of the moving lifter. It may consist of a pulley such as a wheel or roller coupled to a rail or a shaft having a protrusion seated in a groove formed in the rail. In addition, the rail and the moving member may be configured in a gear assembly method such as a rack gear.

The driving motor 473b provides a driving force for sliding the moving member in the lateral direction. It can consist of a stepper motor or an electric motor.

On the other hand, the control unit 30 controls the operation of the vehicle elevator and the door of the individual private parking lot, and controls the movement of the vehicle entered into the vehicle elevator unit to the private parking lot of the floor desired by the driver.

In addition, the moving means 473 may be configured as a wheel type capable of autonomous driving instead of a rail type moving along a rail.

FIGS. 35 to 39 schematically show a horizontally moving lifter capable of autonomous driving according to a preferred embodiment of the present invention.

Referring to FIGS. 35 to 39, the horizontal movement lifter 470 may be configured in the form of a robot capable of autonomous driving.

In this case, the moving lifter 470 includes a wheel unit 474 capable of self-moving, and a controller unit 475 that controls the operation of the lifter and the wheel unit. It can be configured to lift up/down the main plate 410 and autonomously move along the moving guide groove 480.

The wheel unit 474 may include a wheel that autonomously moves along the bottom of the moving guide groove 480 and a wheel driving module.

Here, the height of the lifting plate 471 of the moving lifter 470 in a lifted-down state may be lower than the height of the lower surface of the vehicle. In this case, the moving lifter 470 can move on the floor of the private parking lot and on the floor of the elevator without a separate moving guide groove 480 formed lower than the floor level.

The controller 475 may include a wheel control module for controlling motion of the wheel for horizontal movement of the horizontal lifter 470 and a wireless control module that receives a wheel control command for autonomous movement of the wheel in real time through wireless communication and provides the wheel control command to the wheel control module.

The wireless control module receives the wheel control command from the control unit 30 that controls the vertical movement of the vehicle elevator unit 10 and the horizontal movement of the sliding moving means. And it can be provided to the wheel control module to control the moving lifter 470 to be able to move according to autonomous driving.

In addition, the wheel may be composed of a multi-axis moving wheel or an omni wheel capable of moving not only in one axis direction but also in two axes (X axis and Y axis). When the wheel is composed of a multi-axis moving wheel, the wheel is coupled to the rotating shaft. And it can be configured to enable two-axis movement by rotating the rotation shaft according to the direction of movement.

The controller 30 may be configured to include a call management unit 310 that manages a call of a vehicle elevator unit by a user and the vehicle elevator control unit 320 that controls the vertical movement of the vehicle elevator and the horizontal movement of the vehicle according to the vehicle elevator unit call.

When a call of the vehicle elevator unit is requested from the user to enter or exit the vehicle, the call management unit 310 authenticates and identifies the user according to the call, registers call information, and manages the schedule of the vehicle elevator unit.

More specifically, the call management unit 310 may include a user information management module 311 and a schedule management module 312. When there is a call to the vehicle elevator unit in a state in which user information about a user of a dedicated parking lot is pre-registered, the user information management module identifies the user from the registered user information, and identifies the location of the user's private parking lot from the identified user information. When the user identification is completed, the schedule management module determines and allocates an operation schedule for the vehicle elevator unit to the user in consideration of the call information of the vehicle elevator unit called first.

In the present invention, a call button is formed for each dedicated parking lot, such as an elevator used by a person, so that a vehicle elevator unit may be manually called. In addition, the present invention can be configured as an interface for calling a vehicle elevator through the elevator application by installing the elevator application 710 in the user's terminal 70.

The user information management module 311 provides an interface for performing user registration by verifying the user through authentication when the user inputs user information after installing the elevator application 710 on his/her terminal. In addition, it identifies the user when there is a call of a vehicle elevator from a registered user and confirms the location of the private parking lot 10 of the identified user.

Here, when user registration is performed, the user information management module 311 checks user information in conjunction with the database of the collective building manager server to confirm whether the user is the actual user registered in the management office of the collective building. Then it can perform user registration.

User information input at the time of user registration may basically include user identification information (ID/PW), name, phone number, household information (floor, room number), and vehicle number.

And the call management unit 310 may further comprises a vehicle recognition sensor 314 and an automatic call module 313 capable of automatically calling a vehicle elevator unit when the vehicle number is recognized from the vehicle recognition sensor. The vehicle recognition sensor is installed in a waiting position at the entrance of a vehicle elevator on the ground floor or basement floor and automatically recognizes the vehicle number when a vehicle enters.

Here, the vehicle recognition sensor 314 may be composed of a camera sensor capable of recognizing a license plate of a vehicle.

Unlike exiting, in the case of entering, the user drives the vehicle and stops it at the waiting position of the vehicle elevator unit. Therefore, the automatic call module 313 automatically recognizes the license plate of the vehicle, identifies a user from user information matching the recognized license plate, and automatically calls the identified user's private parking lot location.

Here, when there is a waiting vehicle when entering, a vehicle elevator may be directly called through the elevator application 710 of the user terminal.

Therefore, when the user registration is completed, the user information management module 311 can identify the user through the user's log-in process, and accordingly, the location of the user's dedicated parking lot and vehicle number can be confirmed.

The schedule management module 312 determines the order of operation by performing scheduling of the vehicle elevator unit in consideration of entry/exit status and previously called call information when there is a call from the user for the vehicle elevator unit. And it plays a role of providing schedule information to the user.

When the schedule management module 312 determines the order of operation according to a user call and generates schedule information, the schedule information is transmitted through the elevator application 710 of the calling user.

Here, the schedule information may include information such as the loading order of the vehicle and the time required until the vehicle is loaded into the elevator, and when exiting the vehicle, the user can accurately know the vehicle exit time through checking the schedule information. Therefore, waiting time for vehicle exit can be minimized.

In addition, the schedule management module 312 may transmit an alarm through the user's elevator application 610 to prevent a delay in exiting when the user's vehicle is in the order of loading into the vehicle elevator.

And the elevator control unit 320 can control to enter and exit the vehicle by operating the vehicle elevator according to the loading order determined by the call management unit 310.

More specifically, the elevator control unit 320 may be configured to include a vertical movement control module 321 for controlling the vertical movement of the vehicle elevator unit and the horizontal movement control module 322 for horizontally moving and parking the vehicle loaded in the vehicle elevator unit to a dedicated parking lot or moving it out of the vehicle elevator unit.

The vertical movement control module 321 is a configuration that controls the elevation movement means 110 for elevation control like a conventional elevator, and is obvious to those skilled in the art having the ordinary knowledge of the present invention with the same configuration as a conventional elevator. Therefore, a detailed description will be omitted.

The horizontal movement control module 322 controls to horizontally move the vehicle loaded into the vehicle elevator unit to the user's private parking lot when entering the vehicle, and horizontally moves the vehicle parked in the private parking lot into the vehicle elevator unit when exiting the vehicle.

1. A Method of Entering or Exiting a Vehicle Using the Main Plate

First, in the case of a method in which the user-only main plate disposed in each private parking lot moves, when the loading order comes when entering, the vehicle elevator moves to the floor of the private parking lot according to the user information of the recognized vehicle. After that, the main plate located in the private parking lot is horizontally moved into the vehicle elevator through the sliding moving means.

Subsequently, after descending to the entrance of the vehicle elevator, when the vehicle is moved inside the vehicle elevator, it vertically moves to the floor of the private parking lot according to the user information of the recognized vehicle.

When arriving at the private parking lot floor, the main plate inside the vehicle elevator is horizontally moved to the private parking lot through sliding movement means.

Through the above process, the vehicle is parked in the user's private parking lot in a state where the vehicle is placed on the main plate.

When the user calls the vehicle elevator in case of exit, the vehicle elevator arrives at the floor with the private parking lot according to the loading order. A vehicle is placed on the main plate of the private parking lot. Therefore, the sliding moving means horizontally moves the main plate on which the vehicle is placed into the vehicle elevator.

Then, after descending to the entrance of the vehicle elevator, when the vehicle is moved outside the vehicle elevator, the user moves the vehicle and exits the vehicle.

2. A Method of Entering or Exiting a Vehicle Using a Moving Lifter

Figure 23:
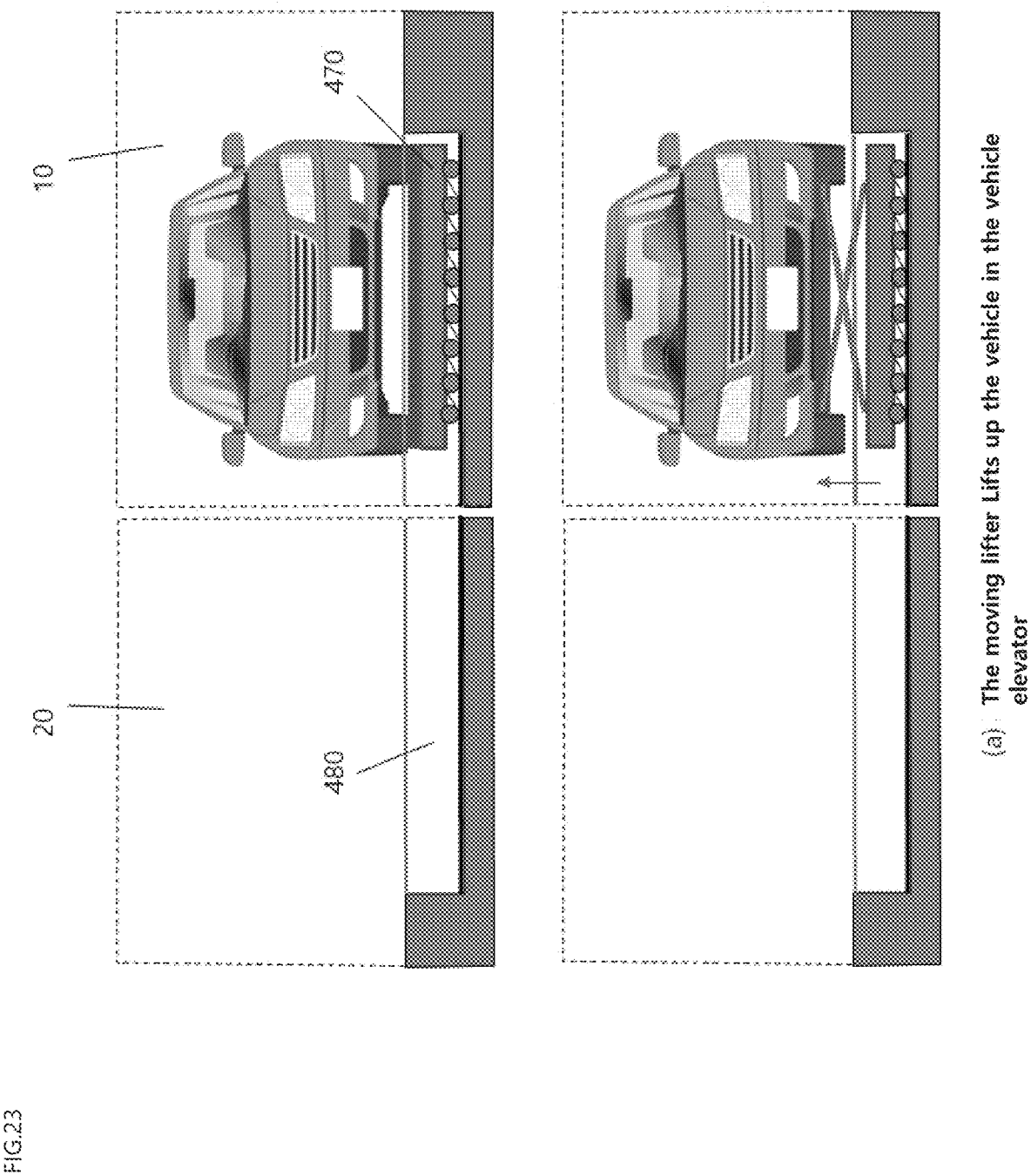
FIGS. 23 to 25 schematically show a sliding movement method through a moving lifter according to a preferred embodiment of the present invention.
Figure 24:
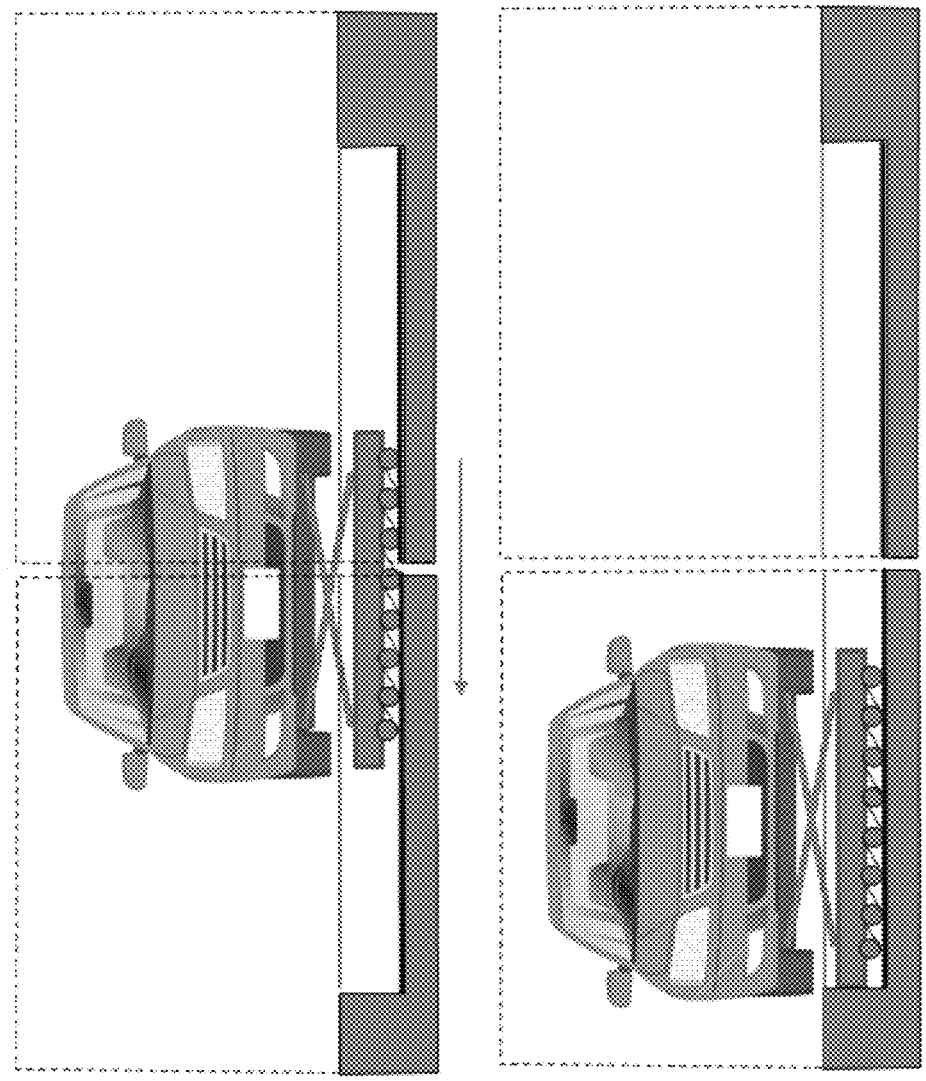
Figure 25:
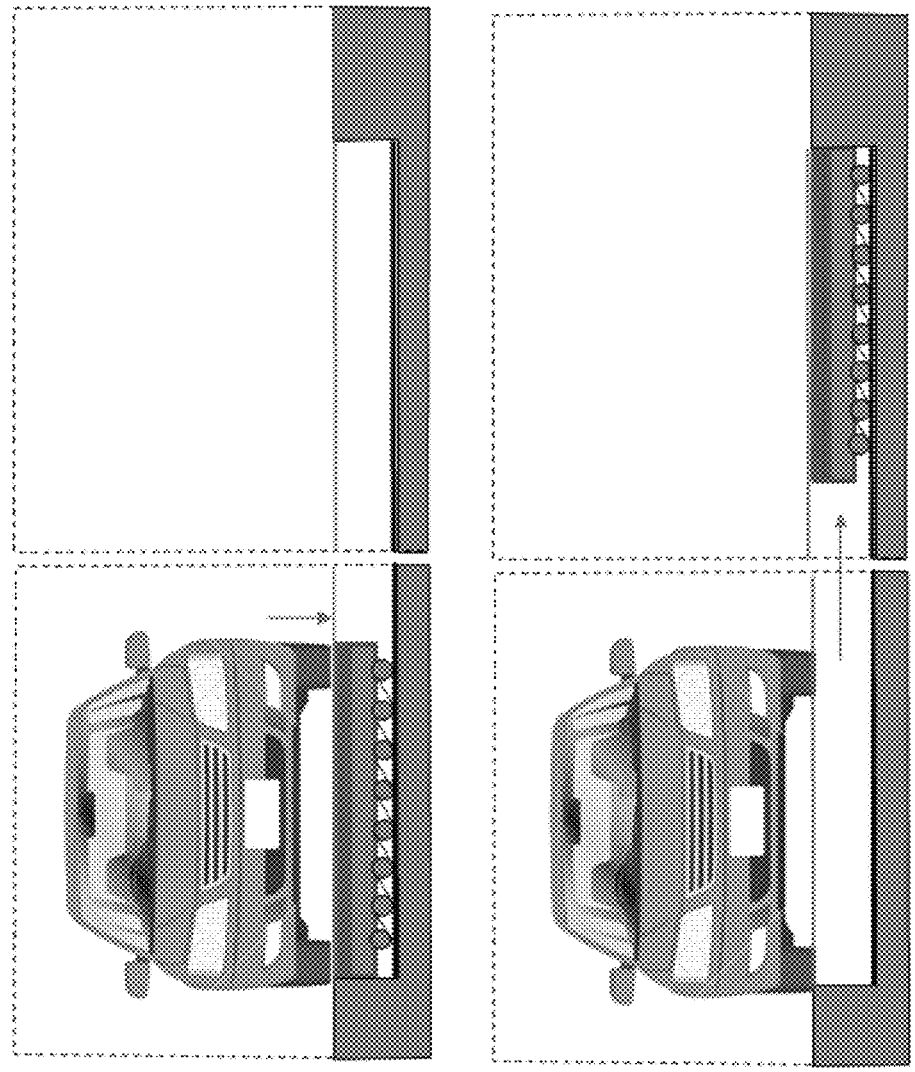

FIGS. 23 to 25 schematically show a sliding movement method through a moving lifter according to a preferred embodiment of the present invention.

The operation of moving the vehicle elevator unit up and down between the floor of the private parking lot and the entrance floor of the vehicle elevator is the same as in the above embodiment. Therefore, only the horizontal movement of the vehicle between the private parking lot and the inside of the vehicle elevator will be described.

Horizontal movement is divided into a case of moving from a private parking lot to the inside of a vehicle elevator and a case of moving from the inside of a vehicle elevator to the private parking lot, and the operation is the same except that they are moved in opposite directions. Therefore, hereinafter, only the case of horizontal movement from the inside of the vehicle elevator to the private parking lot will be described.

First, when the vehicle elevator arrives at the floor of the user's private parking lot, the lifter 472 of the moving lifter located in the moving guide groove 480 formed on the inner floor of the vehicle elevator lifts up the lifting plate 471. Accordingly, the vehicle is lifted up from the floor while the lifting plate comes into contact with the lower part between the wheels of the vehicle (FIG. 23).

In this state, the moving means 473 under the lifter 472 moves horizontally in the direction of the private parking lot. Here, since the vehicle is lifted from the floor by the lifter 472, the moving means 473 can move the vehicle horizontally. (FIG. 24)

When the moving means 473 moves horizontally to the end of the private parking lot, the vehicle is lifted down while the lifter 472 lifts down the lifting plate (471). Accordingly, the wheels of the vehicle come into contact with the floor of the private parking lot, and the vehicle is parked.

Then, the moving means 473 is moved into the vehicle elevator in the opposite direction, and the moving lifter 470 returns to the original position. (FIG. 25)

As described above, when the moving lifter 470 returns to the inside of the vehicle elevator, another vehicle is ready to enter and exit, and the next vehicle is entered and exited according to schedule information.

Hereinafter, a temporary parking system for entering and exiting a vehicle according to the present invention will be described.

Figure 26:
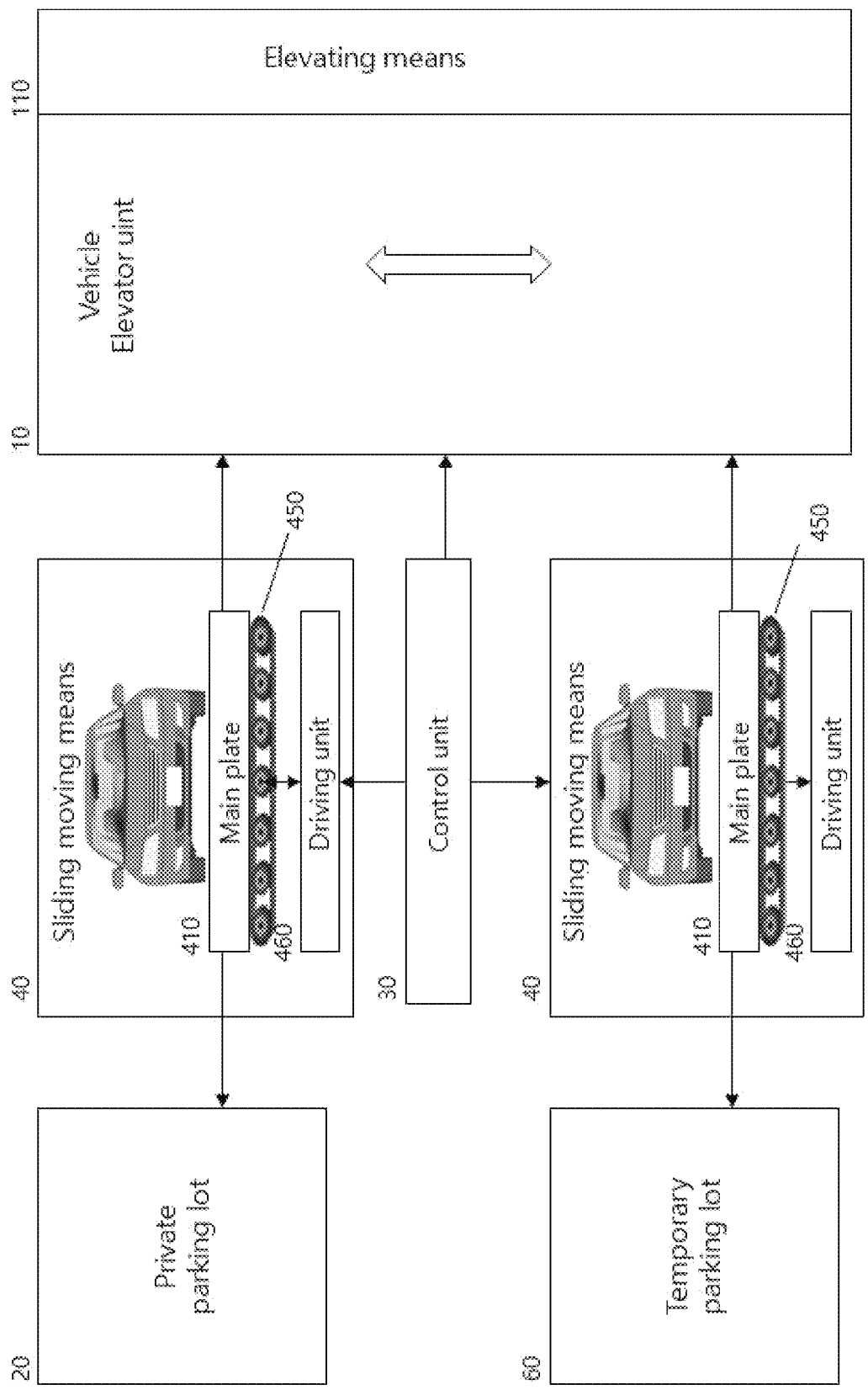
FIG. 26 is a system configuration diagram schematically showing a temporary parking system for entering and exiting according to a preferred embodiment of the present invention.
Figure 27:
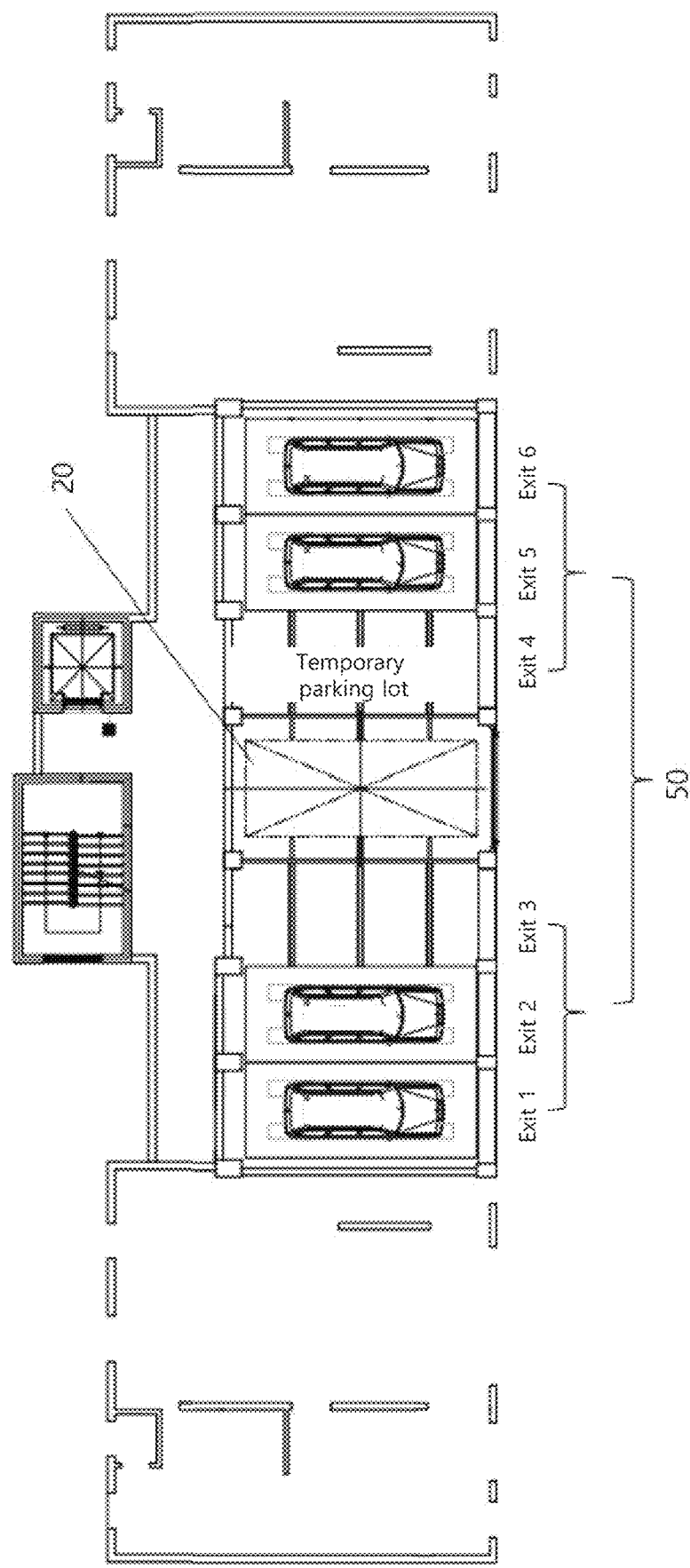
FIGS. 27 and 28 are plan views and cross-sectional views schematically showing temporary parking lots of the waiting system for entering and exiting.
Figure 28:
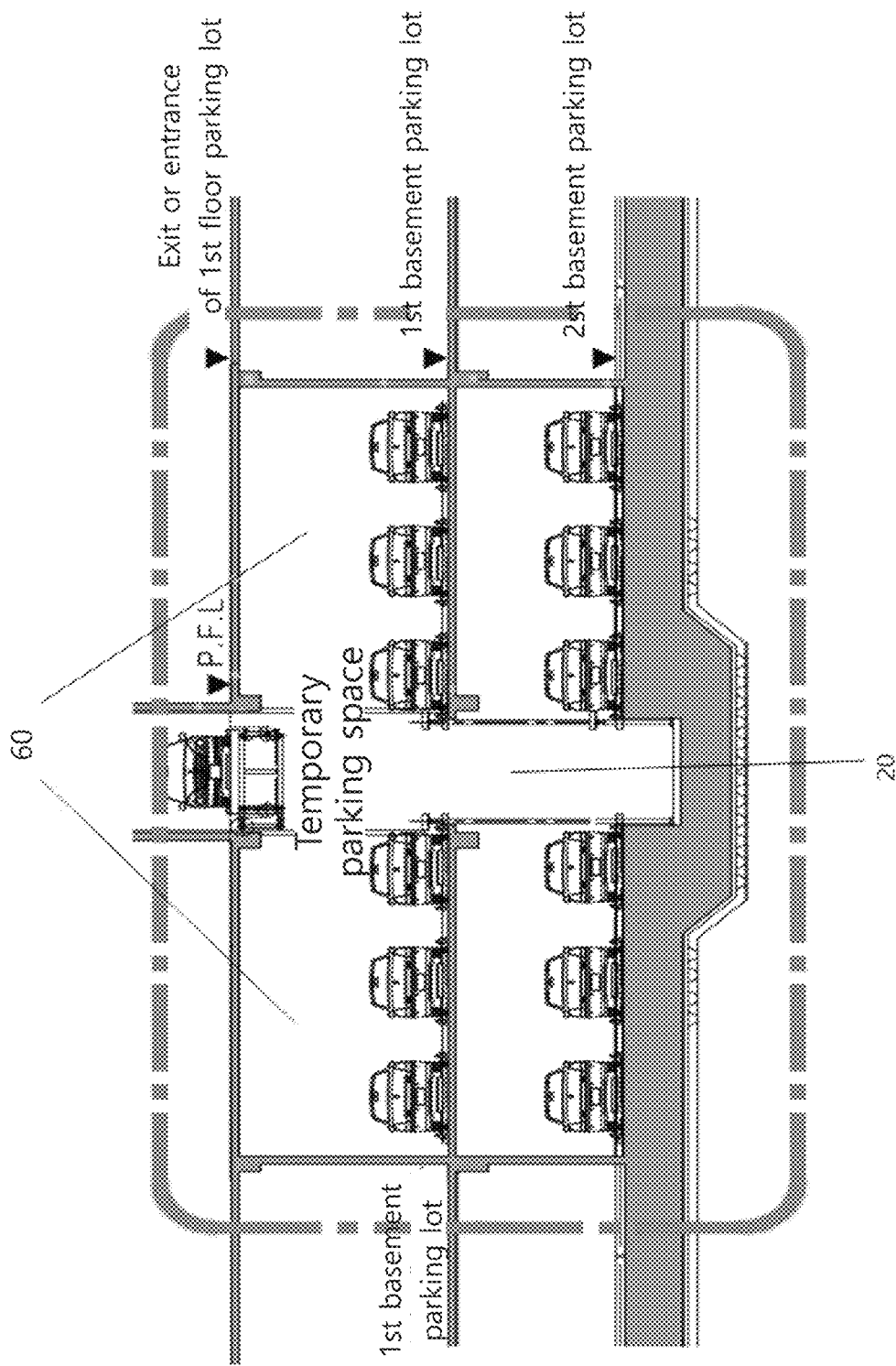

FIG. 26 is a system configuration diagram schematically showing a temporary parking system for entering and exiting according to a preferred embodiment of the present invention, and FIGS. 27 and 28 are plan views and cross-sectional views schematically showing temporary parking lots of the waiting system for entering and exiting.

The present invention relates to a device capable of vertically parking in individual households of a collective building, and when vehicles enter and exit at once, such as during commuting time, it may take an excessively long time to enter and exit.

Therefore, according to the present invention, it is possible to make a reservation in advance for a time zone in which parking congestion is expected. Therefore, the present invention can minimize the time required for entering and exiting a vehicle even at a time when the use of the vehicle elevator is concentrated.

Referring to the FIGS. 26 to 28, a temporary parking system according to the present invention includes a temporary parking unit 60 formed at the entrance and exit of the vehicle elevator; an private parking lot 10 attached to an individual private space; a vehicle elevator unit 20 for transporting vehicles between the temporary parking unit and the exclusive parking lot; a sliding moving means 40 for horizontally moving the vehicle in the transverse direction between the private parking lot and the inside of the vehicle elevator; a control unit 30 for managing the reservation of entering and exiting, specifying vehicle entering at the temporary parking unit, and controlling the operation of the vehicle elevator unit and sliding moving means.

The temporary parking unit 60 refers to a space that is transferred through a vehicle elevator unit and temporarily parked in order to park a vehicle in a vertical household or to exit a vehicle from each household. It may be formed in contact with at least one side of the entrance and exit of the vehicle elevator.

Therefore, when the vehicle elevator entrance and exit is formed on the first floor, the temporary parking unit 60 may be formed on the first floor, and when formed on the first basement floor, the temporary parking lot 60 may be formed on the first basement floor. when the entrance and exit are formed on a plurality of floors, such as the first basement floor and the second floor, the temporary parking lot may be formed in a plurality of spaces.

Figure 29:
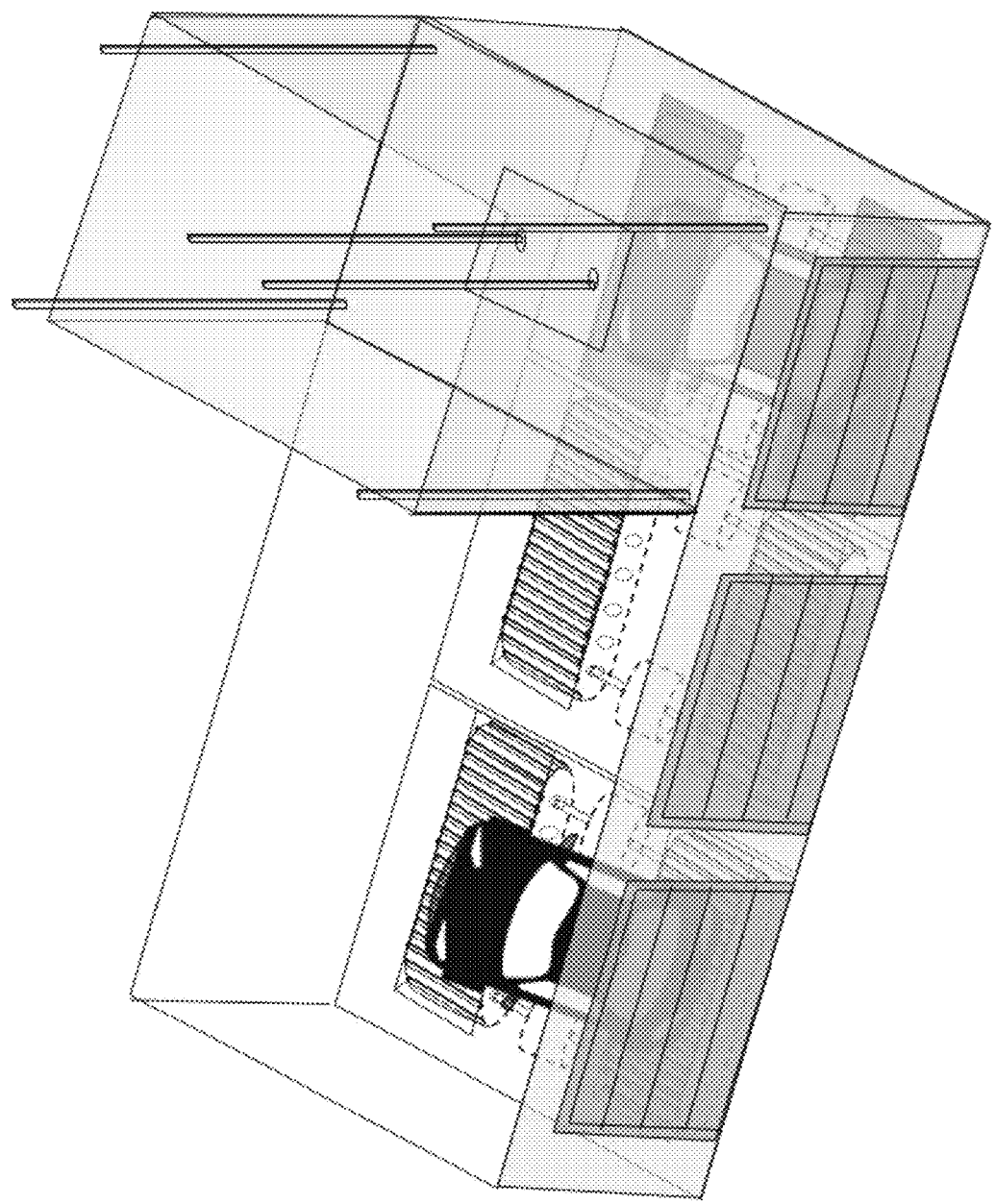
FIGS. 29 and 30 show that a temporary parking lot is configured in the form of a structure having an outer wall and a door according to a preferred embodiment of the present invention.
Figure 30:
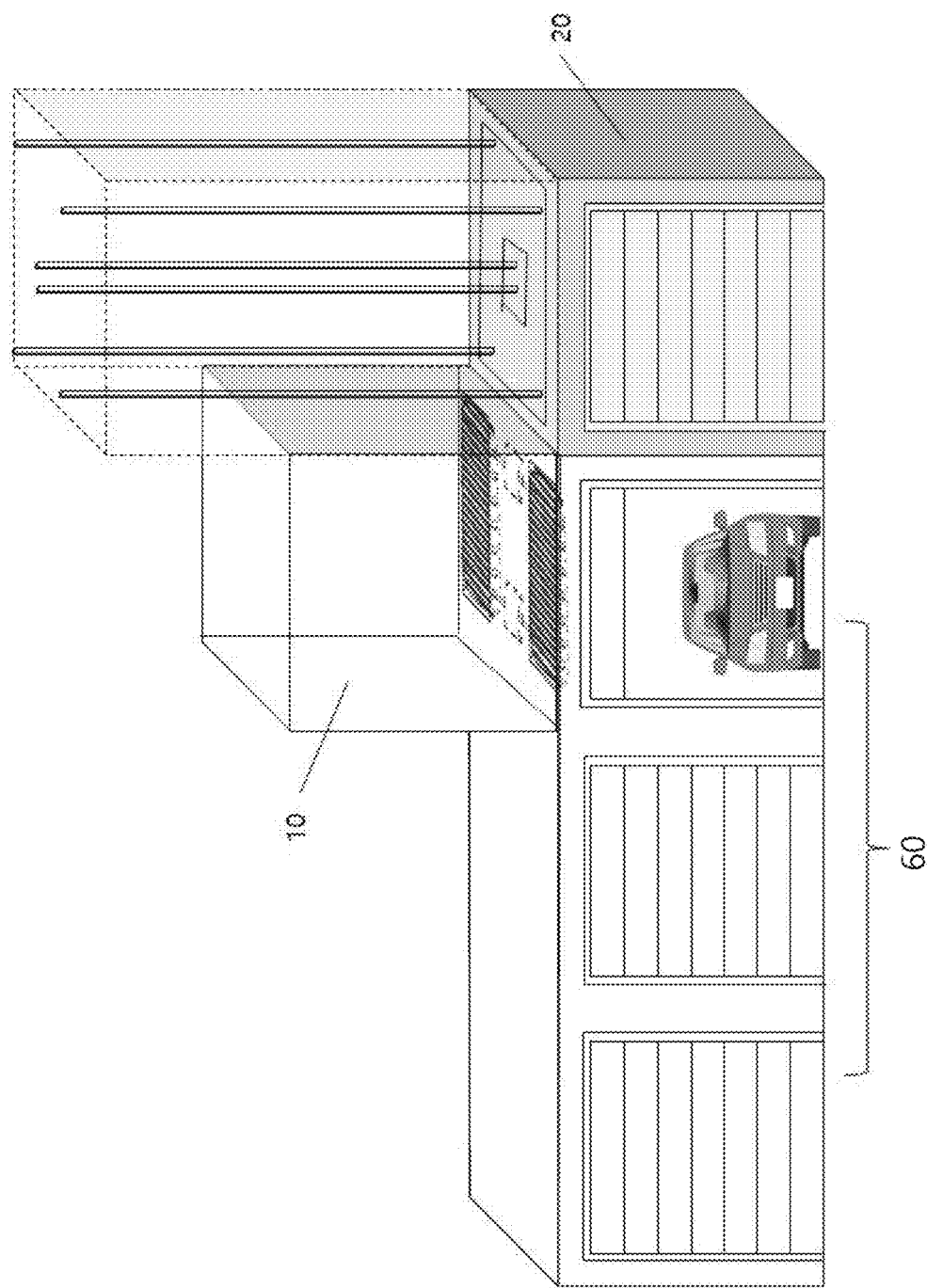

The temporary parking unit 60 may be configured as an open parking space, but may be configured in the form of a structure having an outer wall and a door, such as a vehicle elevator device, as shown in FIGS. 29 and 30 for pedestrian safety.

The temporary parking unit 60 may be composed of a parking module capable of parking at least one vehicle. It can be configured with a space that can park a plurality of vehicles, by considering the number of vertical floors and the total number of vehicles.

The vehicle elevator unit 20 and the sliding moving means 40 may be configured in the same form as those of FIGS. 5 to 11.

That is, the sliding movement means 40 may be configured in a rail movement method (FIG. 5) in which the main plate loaded with the vehicle is transferred or in a conveyor belt moving method (FIG. 6-9) or in a lift method (FIGS. 10-11) in which only the vehicle is transferred without the main plate.

Figure 31:
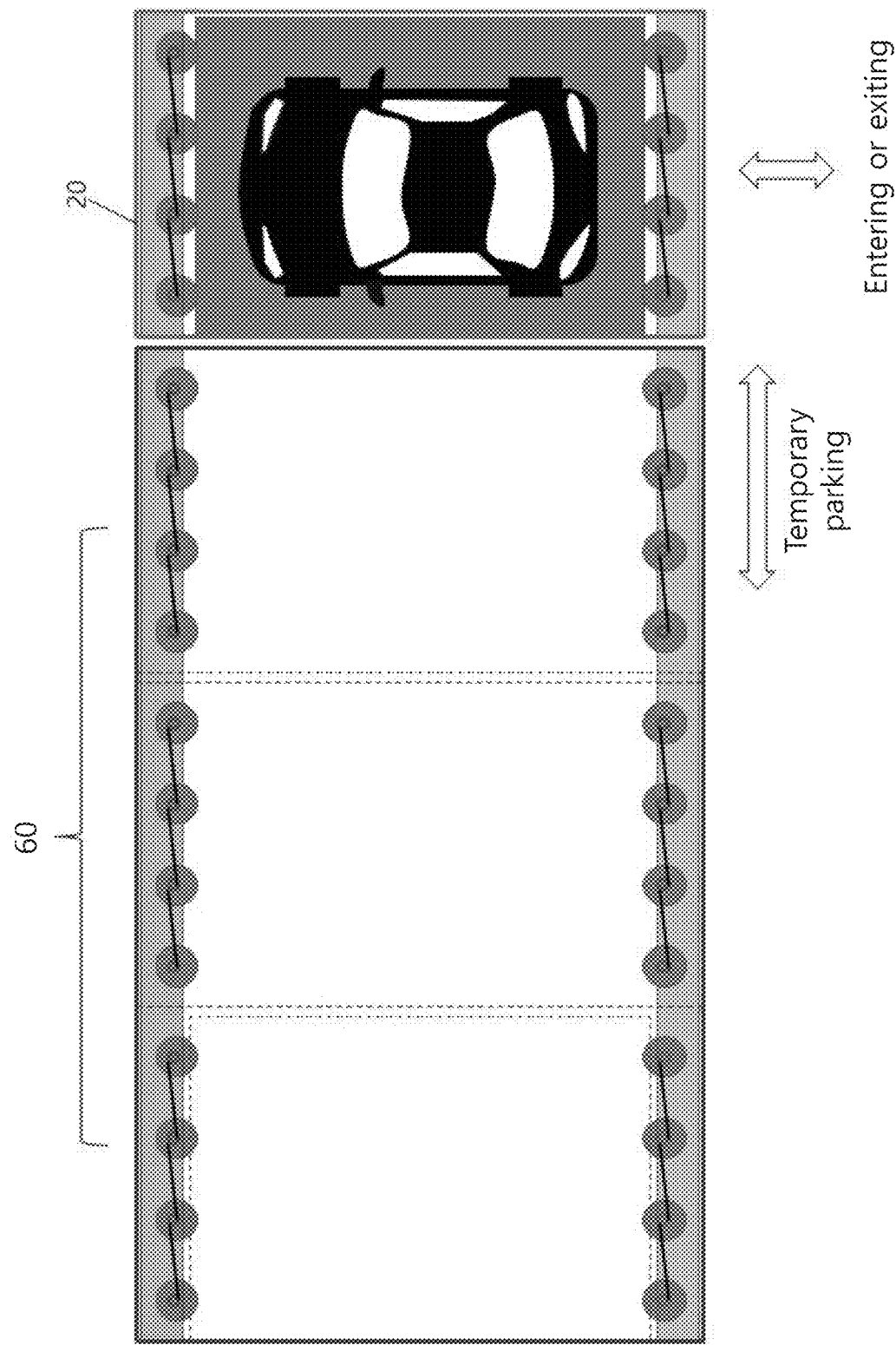
FIG. 31 shows a rail movement method in which a main plate loaded with a vehicle is transferred.
Figure 32:
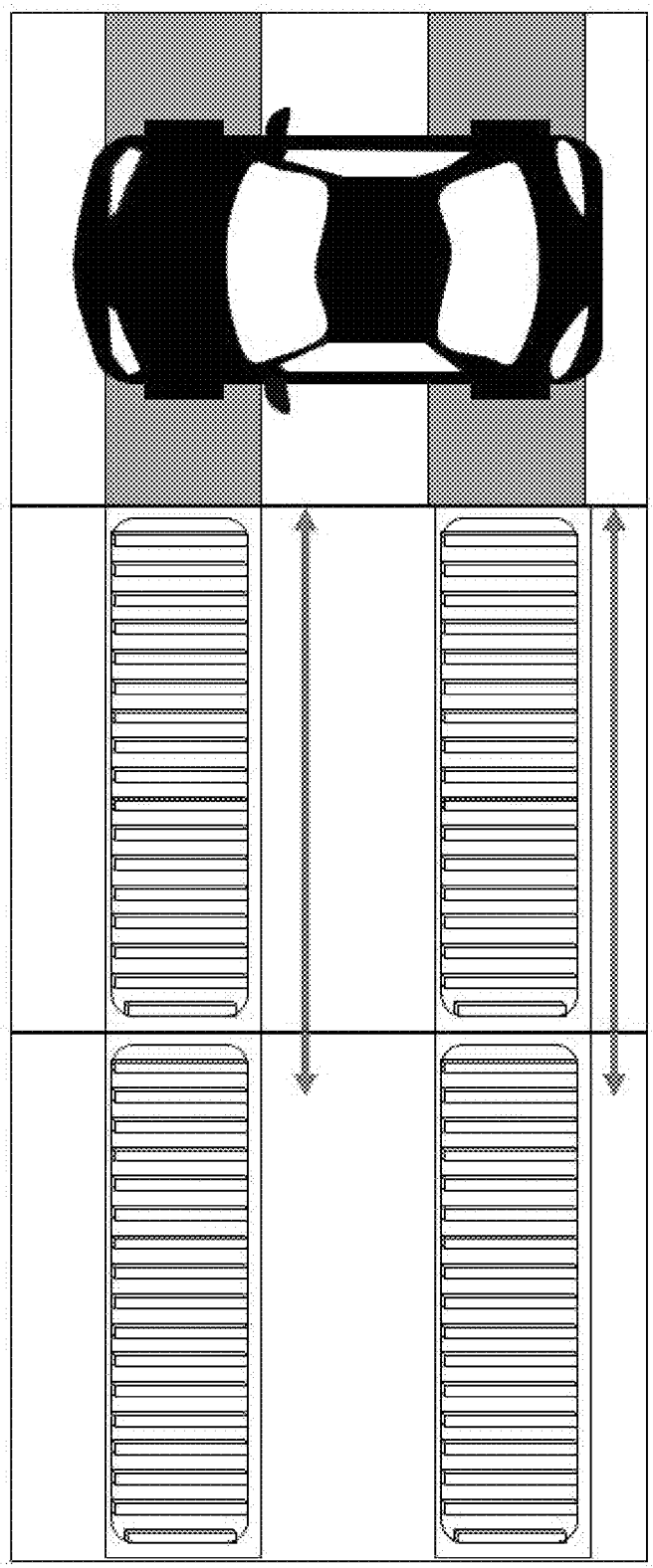
FIG. 32 shows a conveyor belt movement method.
Figure 33:
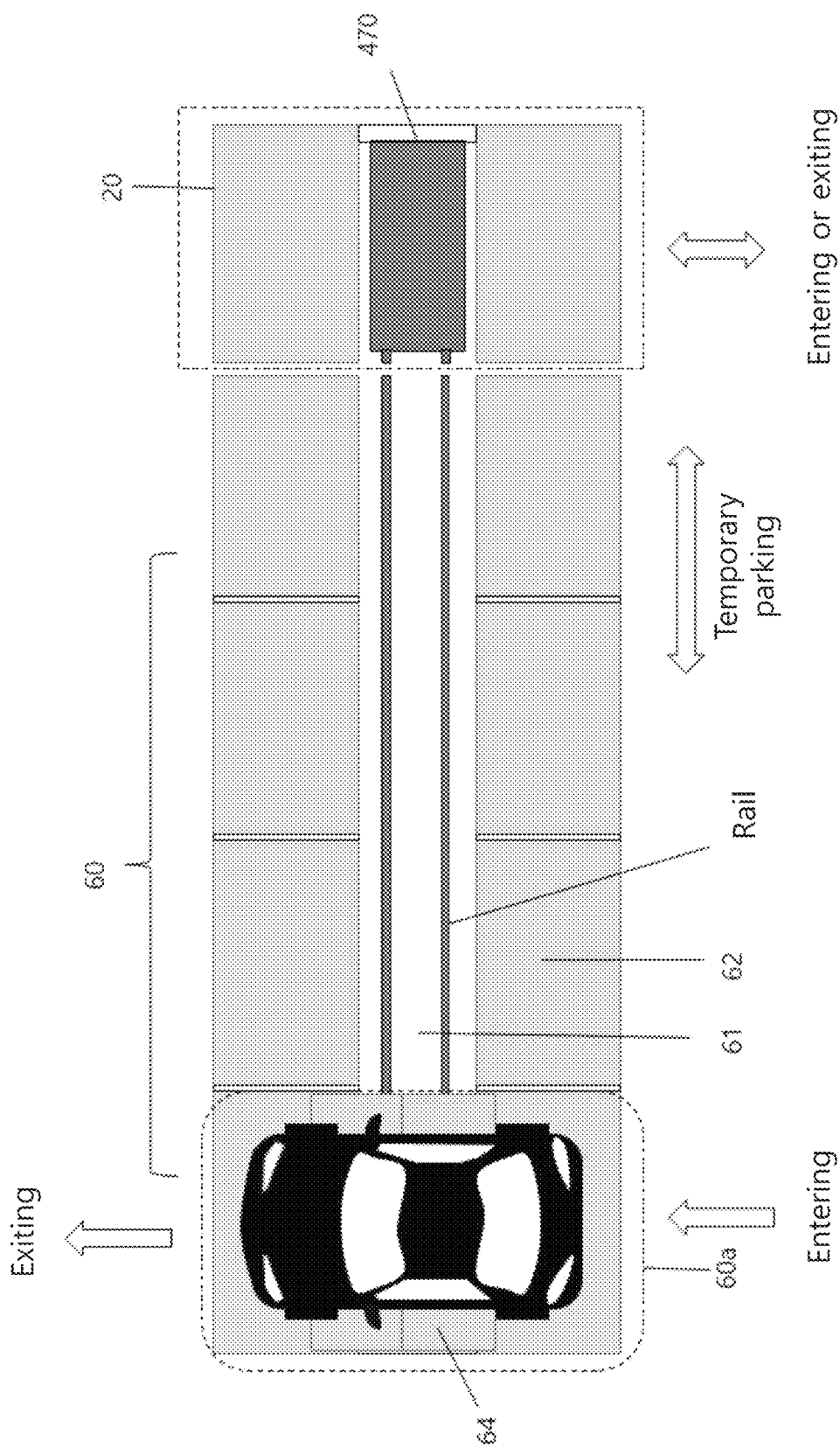
FIGS. 33 and 34 show a lift method.
Figure 34:
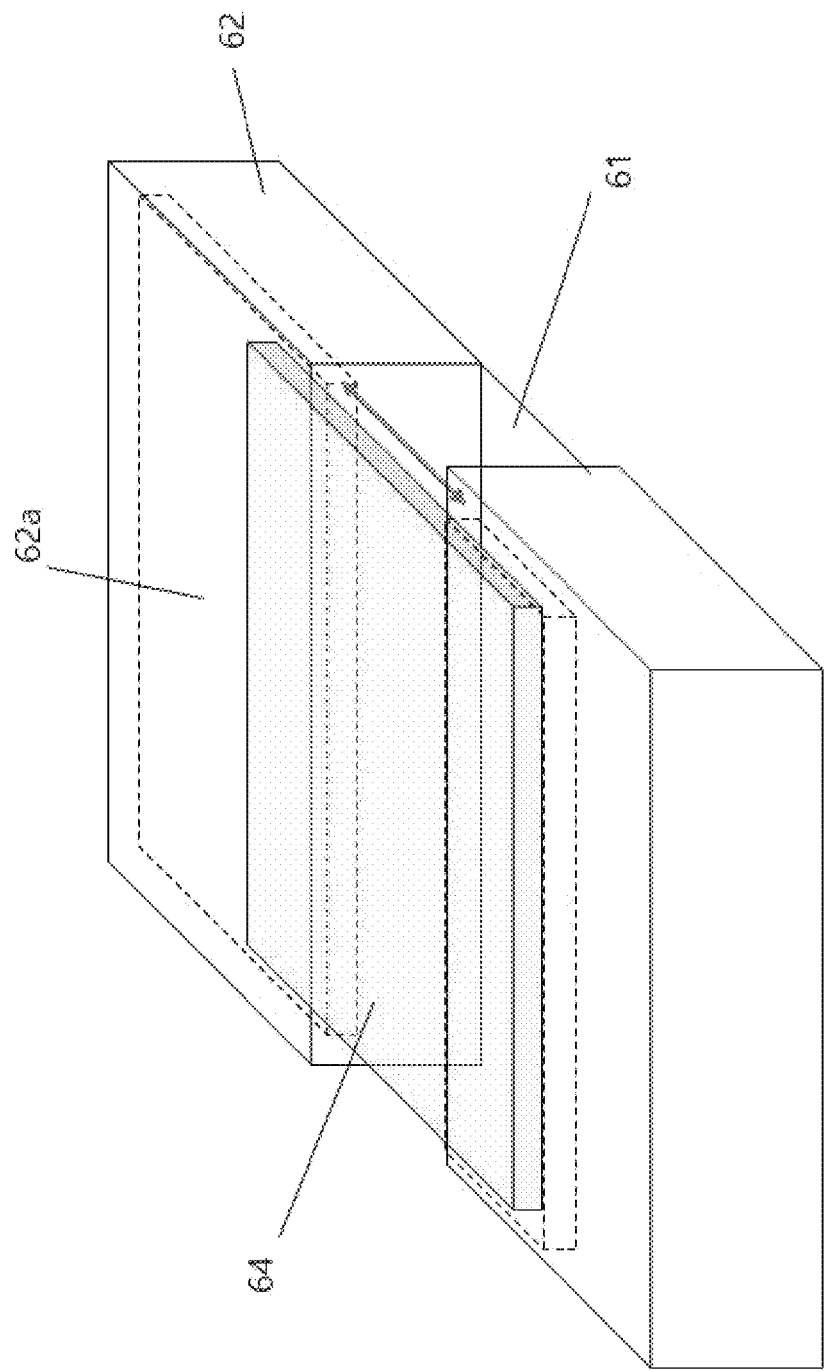
Figure 36:
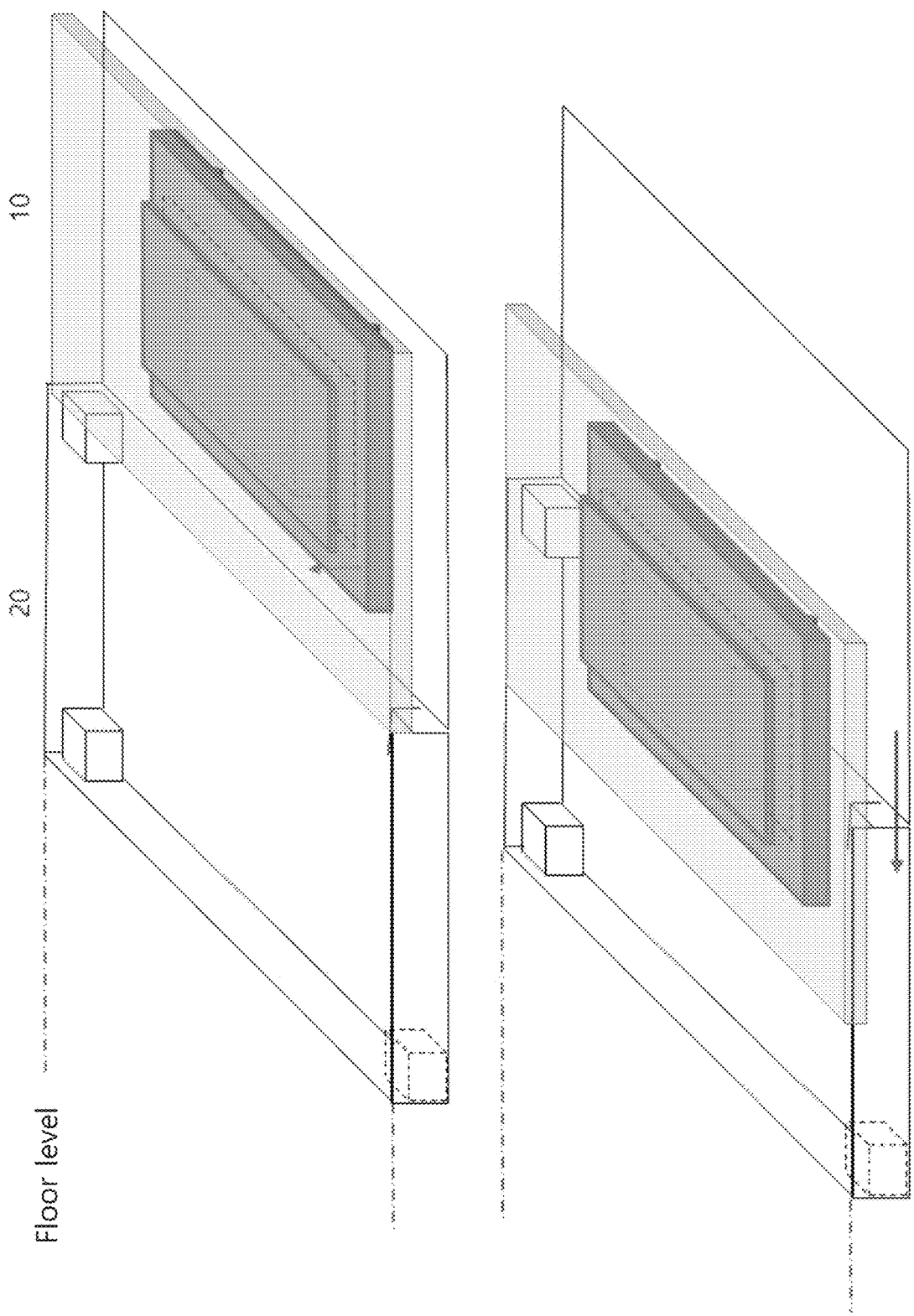
Figure 37:
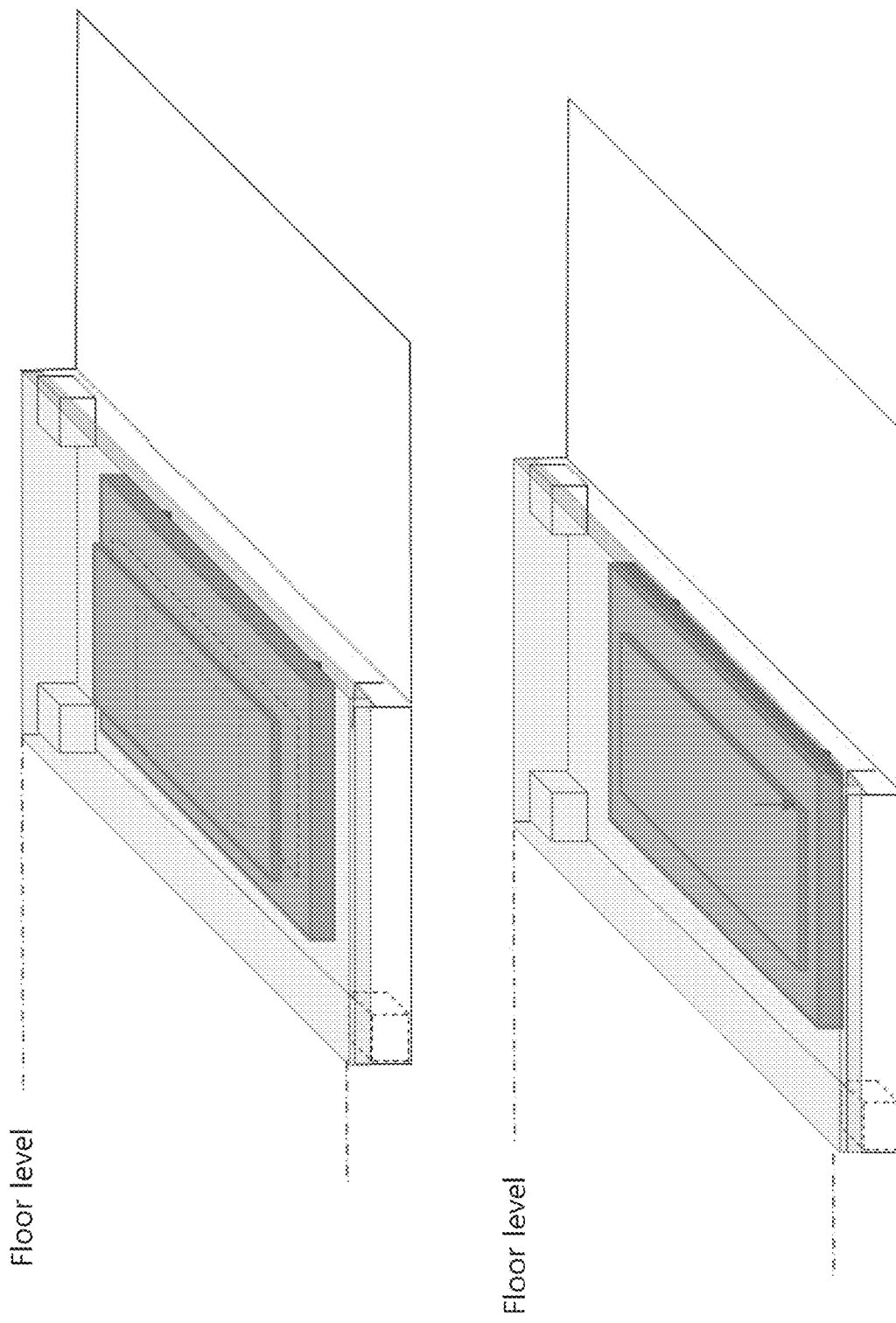
Figure 38:
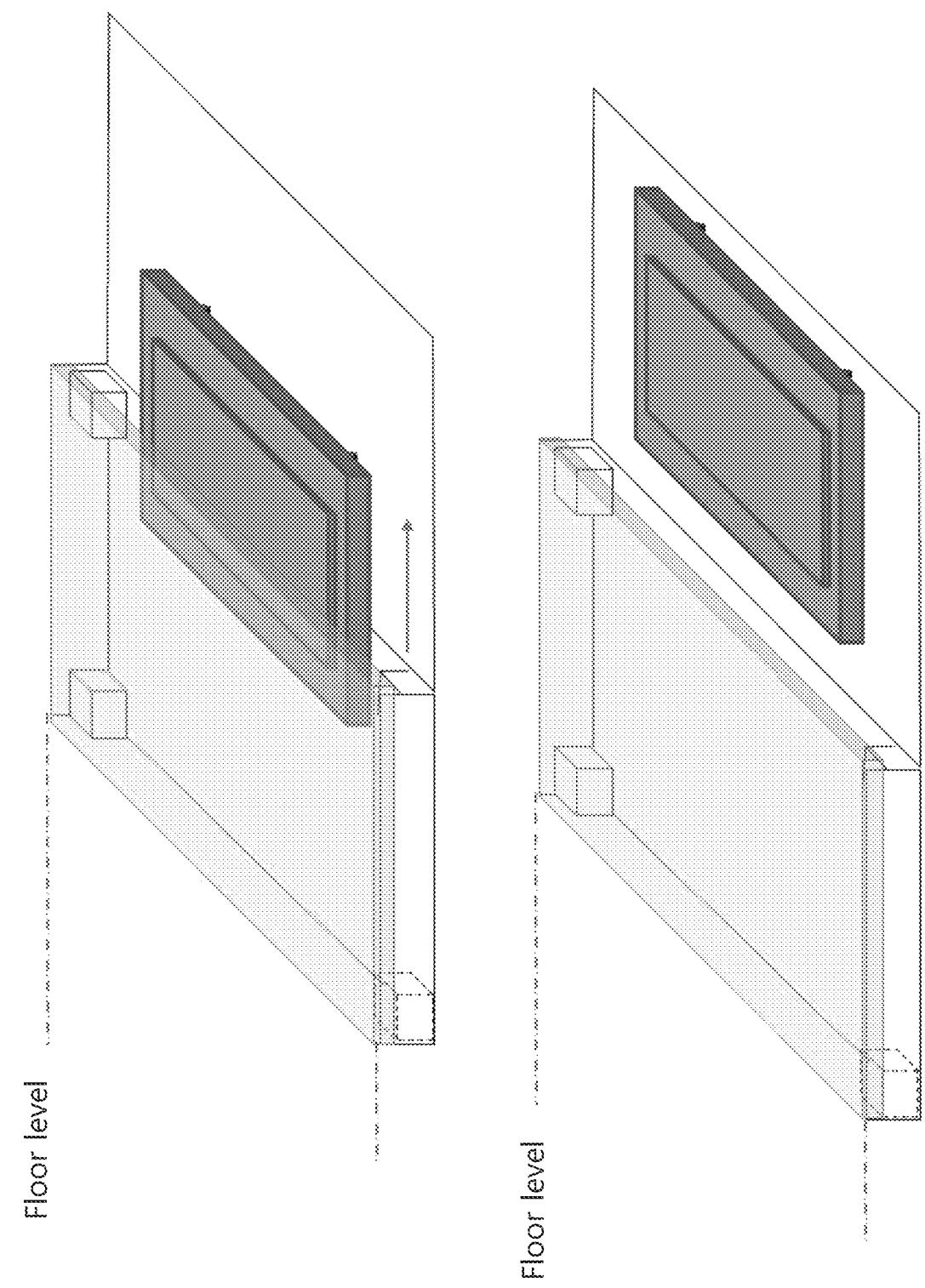
Figure 39:
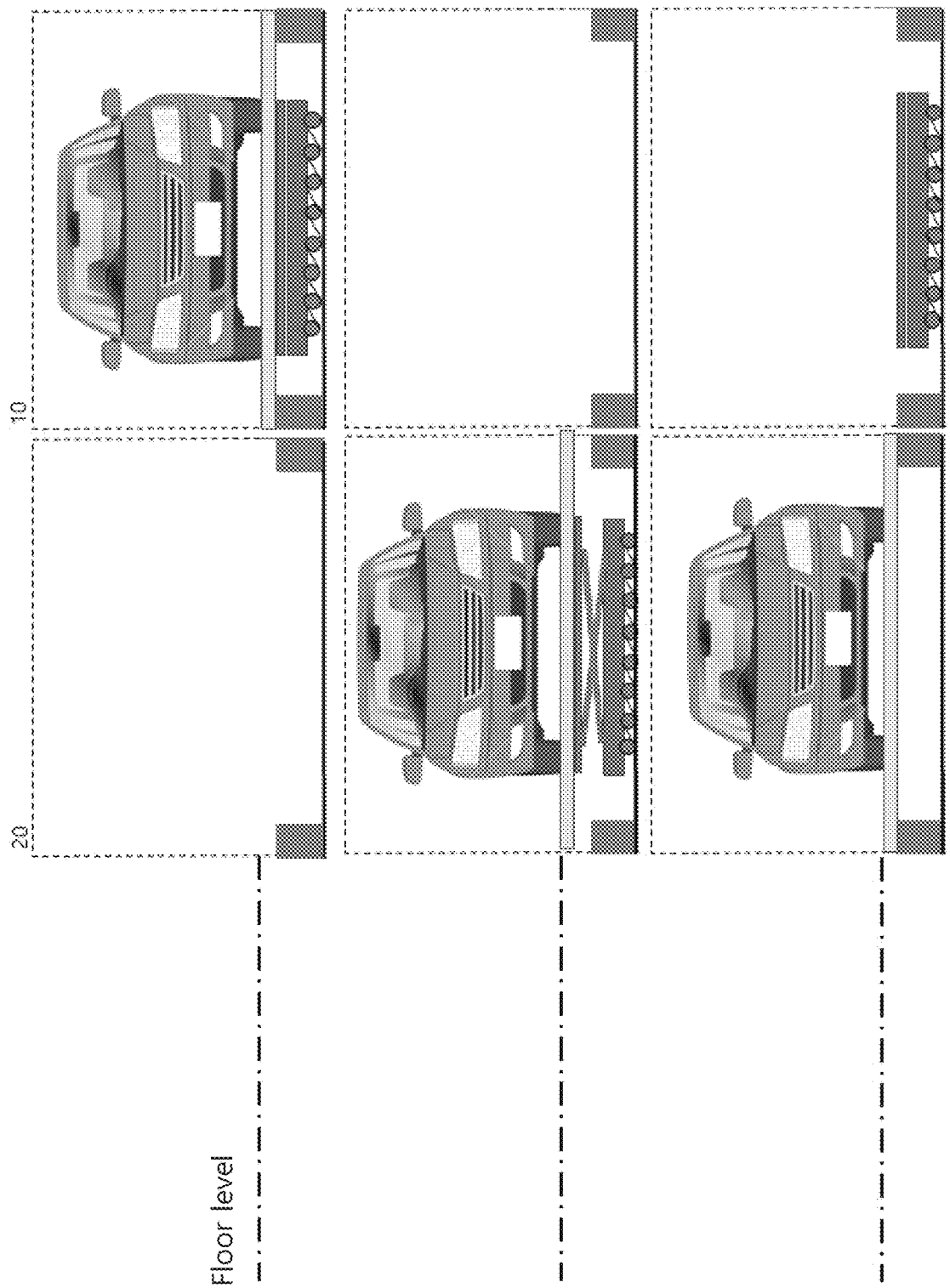

FIG. 31 shows a rail movement method in which a main plate loaded with a vehicle is transferred, FIG. 32 shows a conveyor belt movement method, and FIGS. 33 and 34 show a lift method.

The embodiments of FIGS. 32 to 34 are configurations of devices that can be temporarily parked without distinguishing between entering and exiting.

Hereinafter, the control of the temporary parking system for waiting for entry/exit will be described by taking a case implemented by the lift method according to FIG. 33 as a representative.

In the case of a lift type, the temporary parking unit 60 may include at least one parking module 60*a*.

In addition, the temporary parking unit 60 may include a temporary parking moving guide groove 61 through which the movement lifter 450 applied as the sliding movement means 40 can move therein and the bottom plate 62 in which wheels of the horizontally moved vehicle touch and are placed.

Further, when the moving lifter 450 is of a rail movement method rather than an autonomous movement method, it may further include a rail formed on the bottom or side of the temporary parking movement guide groove.

And, as shown in FIG. 34, the bottom plate of the parking module 60*a* may further include an opening/closing plate 64 for opening and closing the opening by the temporary parking moving guide groove 61 so that the vehicle can enter or exit the vehicle.

The bottom plate 62 includes an opening/closing plate insert 62*a* in which the opening/closing plate is accommodated. Accordingly, the opening/closing plate 64 is slid in the opening/closing plate insert so that the opening portion by the temporary parking movement guide groove 61 can be opened and closed.

That is, in a state in which there is no vehicle in the parking module 60*a*, the opening/closing plate 640 is controlled to maintain a closed state so that a vehicle can enter. In order for the moving lifter 450 to slide, the opening/closing plate 640 is switched to an open state. Also, when the mobile lifter parks the vehicle and returns, the opening/closing plate 640 is switched to a closed state again, so the vehicle can be exited.

The opening/closing plate 640 may be controlled in conjunction with the control unit 30 that controls the vertical movement of the vehicle elevator unit and the horizontal movement of the vehicle.

1. Temporary Parking Method for Entering

When a user calls a vehicle elevator through an elevator application of a user terminal to request parking of a vehicle in a private parking lot of a vertical household, the schedule management module 312 of the control unit determines whether the vehicle can be entered immediately or waiting for entering is required. In addition, when a waiting situation is required, the parking unit of the temporary parking lot is designated and notified, and the user waits the vehicle in front of the entrance of the parking unit of the waiting parking lot designated by the user.

Here, the schedule management module 312 allocates parking units of the temporary parking lot according to the calling order of the user. The parking unit is a unit space in which vehicles can be parked in a temporary parking lot, and if the temporary parking lot can temporarily park three vehicles, the parking unit consists of three.

And the user information management module 311 identifies the user and accordingly confirms the location of the user's private parking lot. In the case of a movement method using the main plate 410, the main plate is located in a designated temporary parking lot from the user's private parking lot.

When the vehicle can be loaded into the designated temporary parking lot, the door of the parking unit of the designated temporary parking lot is opened, and the vehicle is temporary parked into the parking unit of the designated temporary parking lot.

When parking is completed in the parking unit of the temporary parking lot, the user gets off and transmits a parking request. The user moves to the household of his or her vertical floor by using the human elevator. In addition, the vehicle parked in the parking unit of the temporary parking lot is automatically transferred to the user's private parking lot according to the loading sequence of the vehicle elevator unit.

When a plurality of parking units in the temporary parking lot are configured, the parking units may be allocated in such a way that a parking unit close to the vehicle elevator is transferred in priority.

Therefore, when the vehicle loaded in the vehicle elevator is transferred to the private parking lot, the vehicle in the parking unit close to the vehicle elevator is moved into the vehicle elevator.

Accordingly, the vehicle parked in the outermost parking unit is sequentially moved to the parking unit close to the vehicle elevator unit, loaded into the elevator unit, and transferred to each private parking lot.

2. Temporary Parking Method for Exiting

When a user calls a vehicle elevator to exit a vehicle parked in a private parking lot, the schedule management module 312 of the control unit determines whether the vehicle can be exited immediately or waiting for the vehicle to be exited. If there is a situation where waiting for exit is required, it notifies the user that waiting is required, and notifies the user of the order of exit and expected time for exit.

For example, if the exit order is number 5 and the expected exit time is 10 minutes, the user does not have to wait for the exit because he can go to the temporary parking lot 10 minutes later. Therefore, there is no need to wait or wait for a long time to exit.

The schedule management module 312 receives call information according to a user's call and designates an exit order according to the call order.

Accordingly, the schedule management module 312 loads the vehicle parked in the private parking lot into the vehicle elevator unit 20 under the control of the vehicle elevator control unit 320 when the order of exit arrives. Then, it moves vertically to the floor where the temporary parking lot is located. Then, the vehicle is moved horizontally to the designated parking unit in the temporary parking lot.

When the transfer to the designated parking unit of the temporary parking lot is completed, it notifies the user terminal that the vehicle is parked in the designated parking unit, and the user enters the parking unit and exits the vehicle from the parking unit.

When the vehicle parked in the parking unit is exited, the main plate 410 is transferred to the user's private parking lot in the case of the main plate transfer method.

Here, when a plurality of vehicles is exited at the same time, it can shorten the transfer time and schedule by transporting the main plate 410 to a nearby private parking lot that is empty due to the departure, not the user's private parking lot.

In addition, the present invention can be implemented as a temporary parking system that separates enter and exit.

Figure 40:
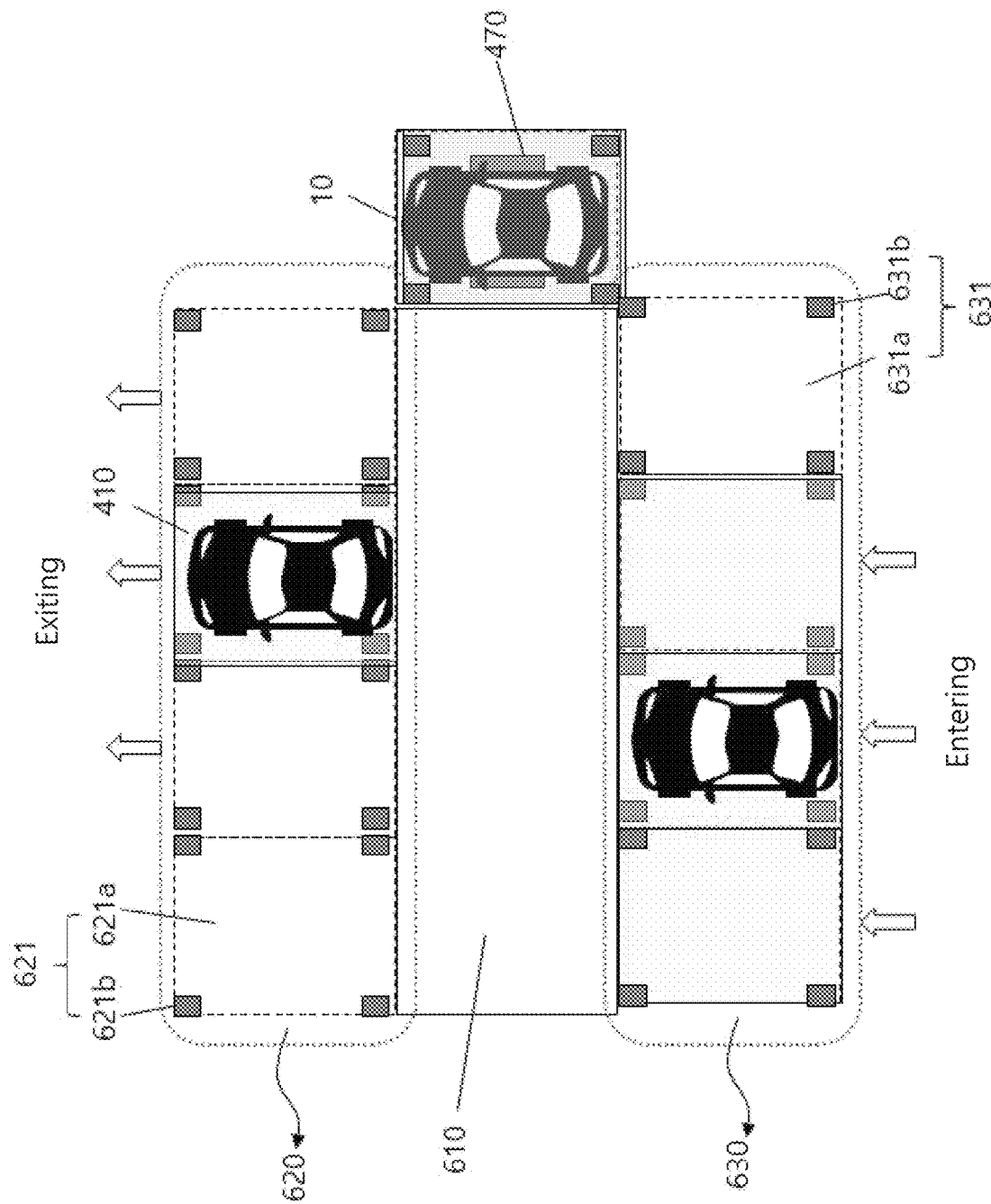
FIGS. 40 to 42 schematically show a temporary parking lot for entering and exiting a vehicle according to a preferred embodiment of the present invention, and FIG. 43 schematically illustrates a temporary parking system for entering and exiting a vehicle.
Figure 41:
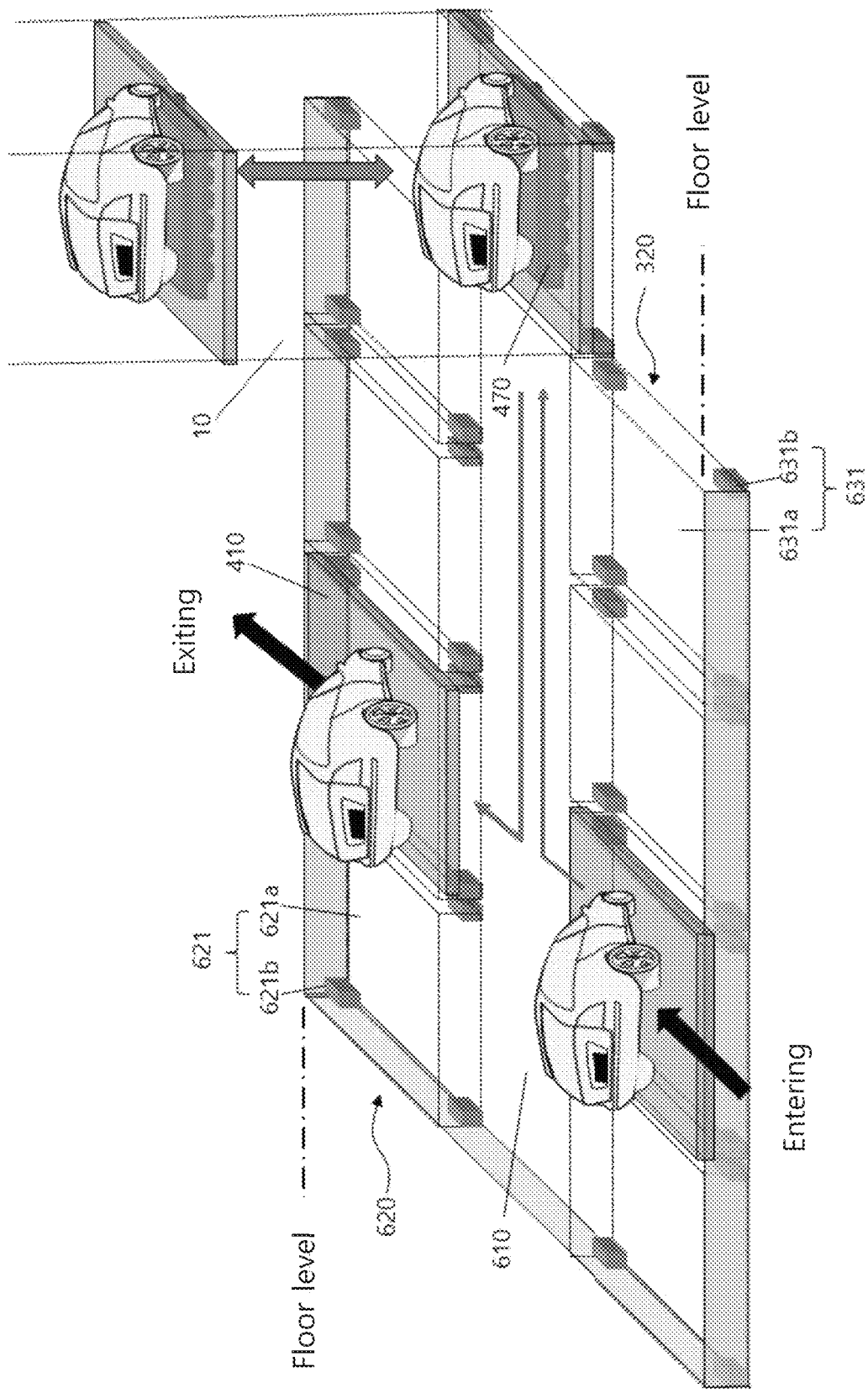
Figure 42:
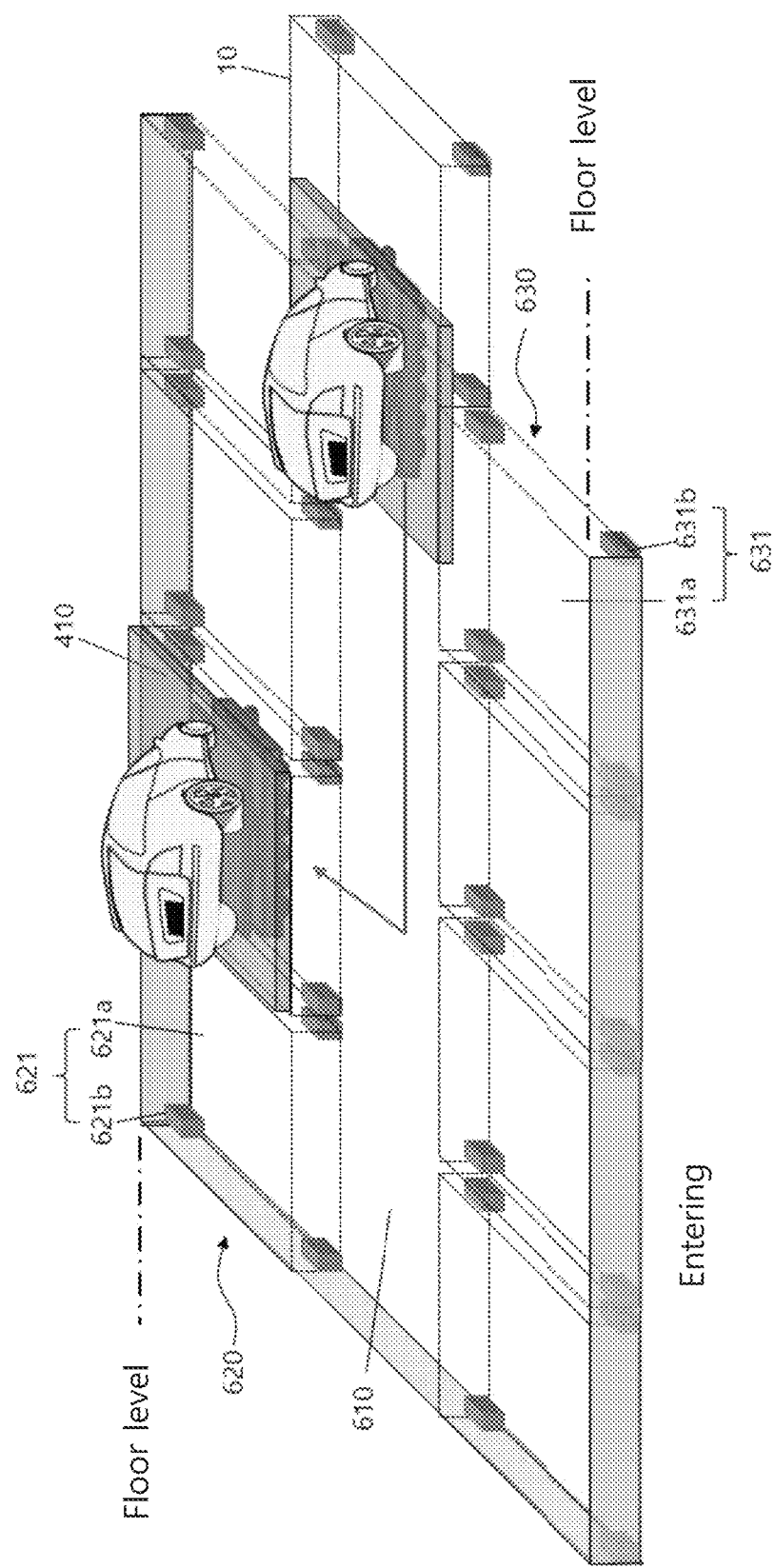
Figure 43:
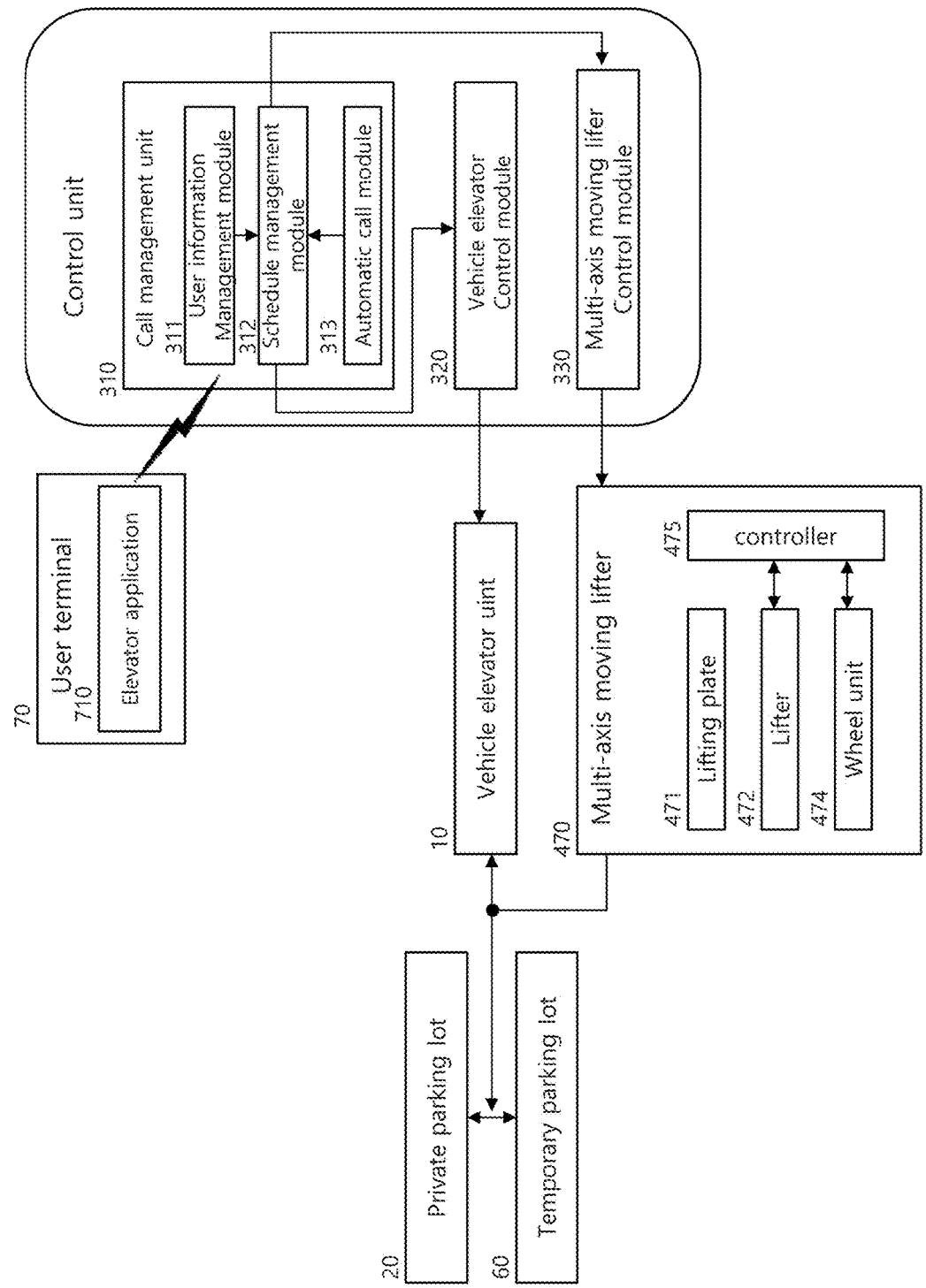

FIGS. 40 to 42 schematically show a temporary parking lot for entering and exiting a vehicle according to a preferred embodiment of the present invention, and FIG. 43 schematically illustrates a temporary parking system for entering and exiting a vehicle.

Referring to FIGS. 40 to 43, the temporary parking unit 60 for waiting for entering and exiting according to the present invention may include a moving space unit 610 adjacent to a vehicle elevator, a parking unit for exiting 620 formed in one of the front or rear directions adjacent to the moving space, and a parking unit for entering 630 formed in the other direction.

The parking unit for exiting 620 includes at least one unit-parking module for exiting 621 having a moving guide groove 621a and a plate fixing part 621b. Also, the parking unit for entering 630 may include at least one unit-parking module for entering 631 having a moving guide groove 631a and a plate fixing part 631b.

Here, a multi-axis moving lifter 470a according to the present invention is configured to be capable of autonomous driving in a wheel type. The multi-axis moving lifter 470a includes a wheel unit 474 capable of self-moving. The wheel unit 474 may include a wheel autonomously moving in a two-axis direction along a floor surface and a wheel driving unit controlling an operation of the wheel.

In addition, the wheel may be composed of a multi-axis moving wheel or an omni wheel that is coupled to a rotating shaft and is movable in two axial directions. Therefore, it can be configured to be movable in the vertical direction as well as in the lateral direction.

The moving space unit 610 provides a space for moving the multi-axis moving lifter 450a. Through this, the multi-axis moving lifter 470a can move the vehicle loaded on the main plate 410 from the vehicle elevator unit 10 to the specific unit-parking module for exiting 621. In addition, it is possible to move the vehicle loaded on the main plate 410 of the unit parking module for entering 631 to the elevator unit 10 through the multi-axis moving lifter.

This embodiment is composed of four unit-parking modules for entering and four unit-parking modules for exiting, but may include at least one unit-parking module for entering and exiting. The number of unit-parking modules may be determined in consideration of the total number of parking spaces and congestion.

And, the multi-axis moving lifter 470a may be configured in plurality.

In the case of a high congestion time, such as commuting, since there are many vehicles waiting to enter or exit, the enter or exit time may be delayed. Therefore, in order to minimize waiting time, a plurality of multi-axis moving lifters 470a may be configured and operated.

The temporary parking system for entering or exiting a vehicle according to the present embodiment may designate one unit-parking module for entering among four unit-parking modules for entering and guide the vehicle to enter when there is a request from a user to enter the vehicle.

For example, if at least two of the four unit-parking modules for entering are empty, it is possible to control the vehicle to enter the unit-parking module closest to the vehicle elevator unit. In addition, when only one unit-parking module is empty, it may be controlled to enter the corresponding unit-parking lot.

In addition, when there is a request to exit a vehicle from a private parking lot of a specific household, the multi-axis moving lifter 470a moves to the private parking lot of the specific household. Subsequently, after lifting up the main plate 410 loaded with the vehicle, it moves to the vehicle elevator unit 10. Then, in the lifted-down state, it moves down to the floor where the temporary parking lot is located.

And again, the multi-axis moving lifter 470a moves in a lateral direction through the moving space 610 in a lifted-up state. Subsequently, it moves in the longitudinal direction to the selected unit-parking module among unit-parking modules for exiting, and then lifts down the main plate 410.

As described above, when the main plate 410 is lifted down to the unit-parking module for exiting, the main plate 410 comes into contact with the plate fixing part 621b, and the vehicle is temporarily parked. The sum of the height of the plate fixing part 621b and the thickness of the main plate 410 is configured to be equal to the height of the moving guide groove 621a of the unit-parking module. Therefore, when the main plate 410 is lifted down, it becomes equal to the height of the floor of the temporary parking lot floor. Therefore, the user can exit the vehicle by driving the vehicle from the unit-parking module for exiting.

When temporary parking is completed in the unit-parking module for exiting, identification information of the corresponding unit-parking module is notified to the user, and the user can move to the unit-parking module corresponding to the identification information and drive the vehicle out.

Accordingly, waiting time for exiting can be minimized because the predicted order of exiting and the time when the exiting will be completed can be known in advance.

Figure 44:
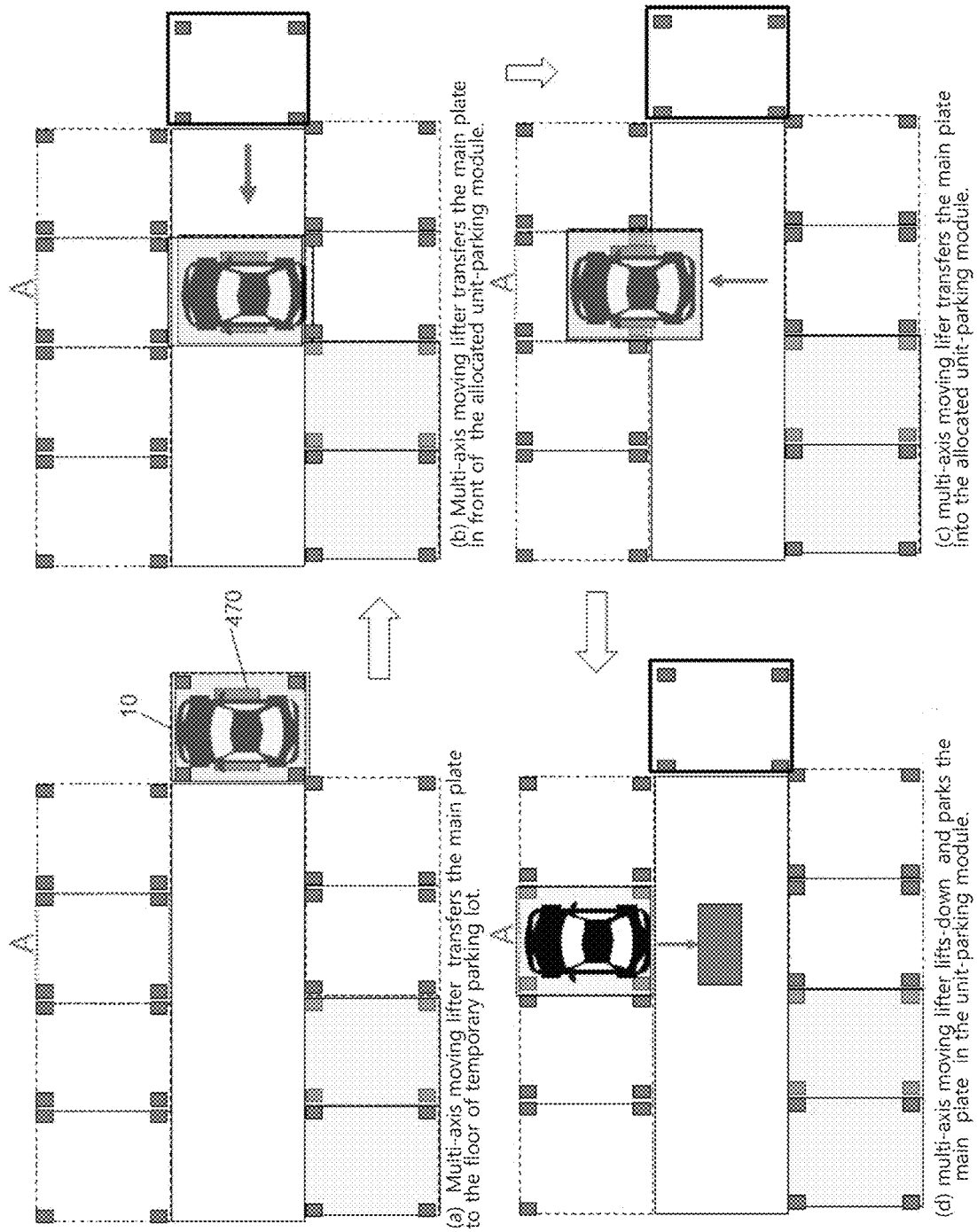
FIG. 44 schematically illustrates parking a vehicle according to a preferred embodiment of the present invention in a specific unit-parking lot (A) for exiting.

FIG. 44 schematically illustrates parking a vehicle according to a preferred embodiment of the present invention in a specific unit parking lot (B) for exiting.

Referring to FIG. 44, when there is an exit request through the elevator application 710 of the user terminal, the control unit 30 identifies the user and identifies the private parking lot and license plate number. Then, it checks the parking state of the parking unit for exiting and allocates the unit-parking module. In this embodiment, it is assumed that the "A" unit-parking module is allocated.

The multi-axis moving lifter 450a receives schedule information and movement route information through the control unit 30, and moves to the identified private parking lot according to the schedule information and movement route information.

More specifically, according to the schedule information and the movement route of the control unit 30, the multi-axis moving lifter 470a vertically moves to the floor where the identified private parking lot is located through the vehicle elevator unit 10. And it moves horizontally under the main plate 410 of the private parking lot. In this state, it lifts up the main plate. Since a vehicle is parked on the main plate, when it lifts up the main plate, the vehicle on the main plate is also lifted up.

Subsequently, in a state in which the main plate is lifted up, the multi-axis moving lifter 470 moves into the vehicle elevator unit 10. Then it moves vertically to the floor where the temporary parking lot is located.

And when arriving at the floor where the temporary parking lot is located, the multi-axis moving lifter 470 horizontally moves to the assigned unit-parking module A through the moving space unit 610. And it lifts down the main plate after moving into the unit parking module (A).

When the main plate is lifted down, the main plate is seated on the plate fixing part 621b of the unit parking module (A). As described above, the main plate loaded with the vehicle is placed on the unit parking module 621. Accordingly, the vehicle is temporarily parked for exit. The control unit transmits to the user terminal that temporary parking is completed in the unit-parking module (A), and the user can move into the unit-parking module (A) and drive the temporarily parked vehicle to exit.

Figure 45:
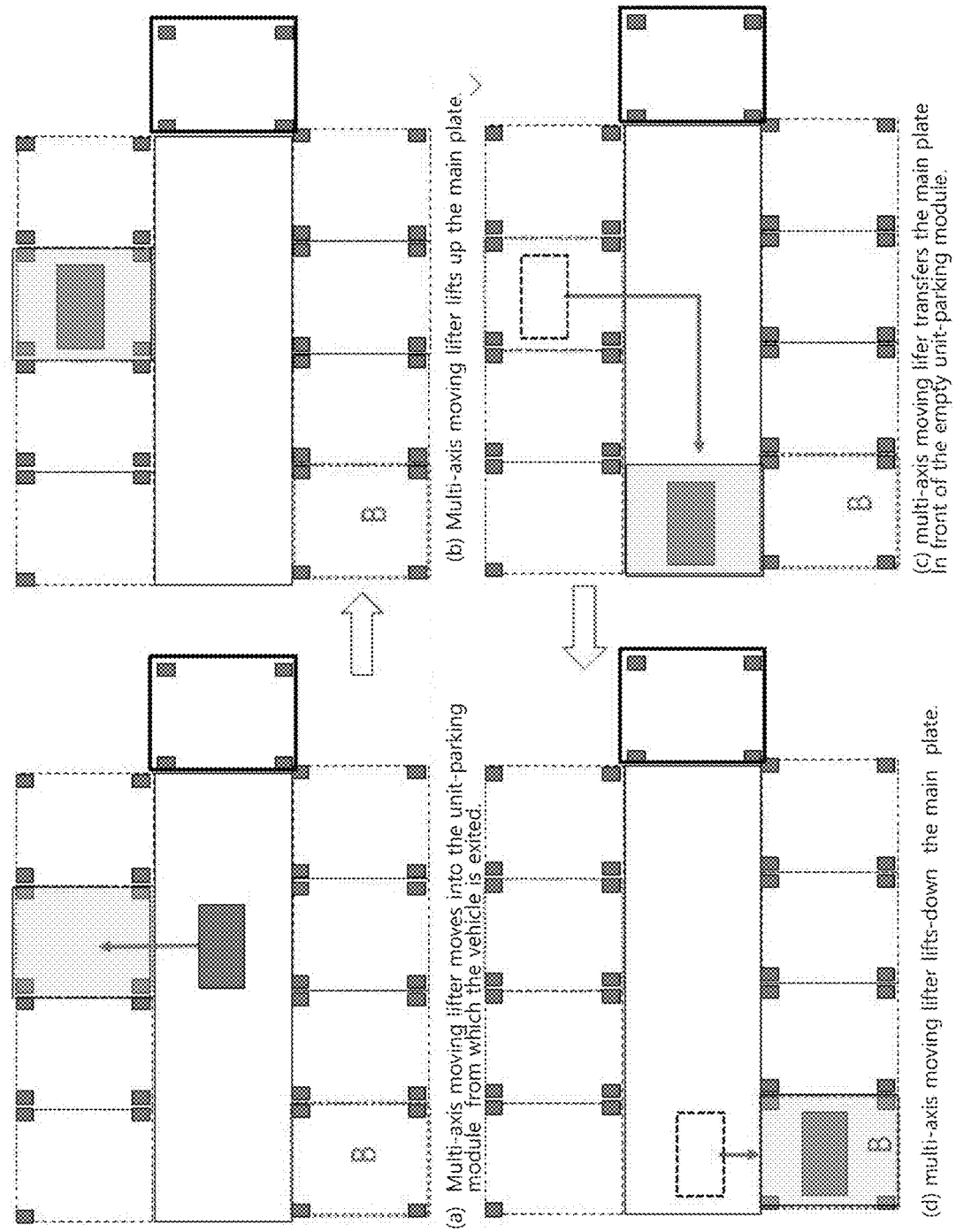
FIG. 45 shows a process of moving the main plate to the unit parking module for entering after the vehicle parked in the unit parking module for unloading is unloaded.

FIG. 45 illustrates a process of moving a vehicle entered into a unit parking module for entering to a private parking lot.

When the vehicle is moved from the unit-parking module for enter, the vehicle is moved to the private parking lot together with the main plate, so the unit-parking module for enter is in a state without the main plate.

And, when the vehicle is taken out of the unit-parking module for exiting, the main plate remains at the unit-parking module for exiting. Therefore, the main plate remaining in the unit parking module for exiting is moved to the empty unit-parking module for entering. That is, when a vehicle is taken out of the unit-parking module for exiting, the main plate is immediately moved to the empty unit-parking module for entering. Through this, the temporary parking of the unit-parking module for entering and the temporary parking of the unit-parking module for leaving can be smoothly performed without time delay.

Figure 46:
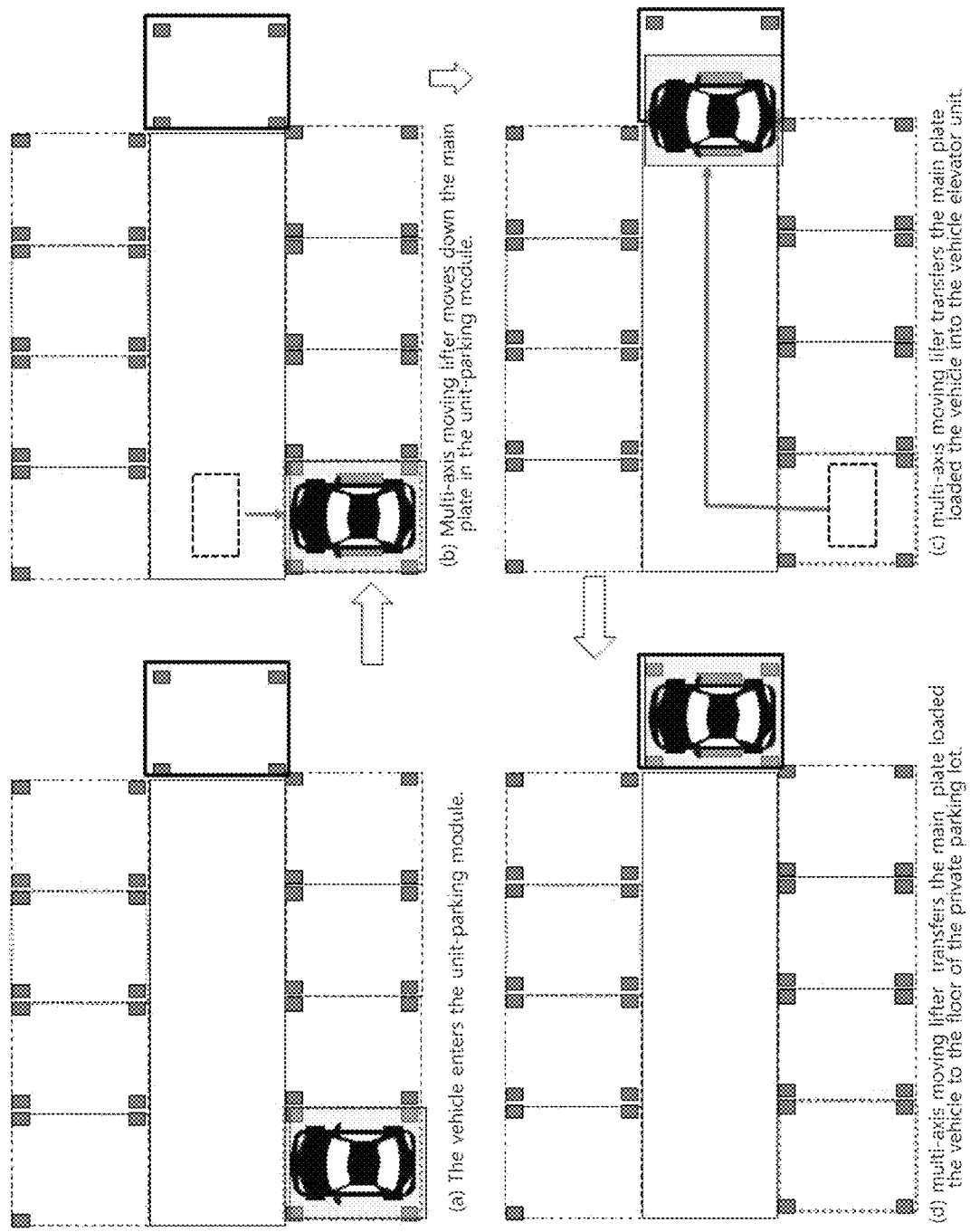
FIG. 46 illustrates a process of moving a vehicle entered into a unit parking module for entering to a private parking lot.

FIG. 46 illustrates a process of moving a vehicle entered into a unit parking module for entering to a private parking lot.

Referring to FIG. 46, when a user enters a vehicle, a request for enter is transmitted through the elevator application 710 of the user terminal, and the control unit 30 identifies the user according to the enter request, identifies license plates and private parking lots, allocates an empty unit-parking module for entering.

When the user parks the vehicle in the assigned unit parking module for entering, the control unit 30 transmits the identified vehicle's private parking lot information, schedule information, and parking route information to the multi-axis moving lifter 470a.

The multi-axis moving lifter 470a moves into a unit-parking module for entering according to schedule information and lifts up the main plate.

Then, according to the parking route information, it moves horizontally into the vehicle elevator unit 10. It moves vertically to the floor of the private parking lot and then moves horizontally to the private parking lot. Then it lifts down the main plate to park a vehicle.

When the vehicle is parked in the private parking lot, the control unit notifies the user terminal that the vehicle is parked in the private parking lot.

Hereinafter, an electric vehicle charging system using a private parking lot for vertical parking of individual households in a collective building according to the present invention will be described.

Basically, the electric vehicle charging system can charge the electric vehicle in the private parking lot 20 through wired and wireless methods.

In the case of a wired charging method, installation is simple as long as each private parking lot is equipped with a power outlet for charging an electric vehicle. Hereinafter, the wireless charging method will be described in detail.

The electric vehicle wireless charging system according to the present invention is characterized by including a vehicle elevator unit 10, a private parking lot 20, an electric vehicle charging device 50, a sliding moving means 40, and a control unit 30.

The vehicle elevator unit 10 moves up and down to move a vehicle parked in a private parking lot to a specific floor desired by a user when entering or exiting an electric vehicle. The private parking lot 20 is attached to an individual private space adjacent to at least one of the right side or the left side of the vehicle elevator unit and is partitioned so as to be parked in a transverse direction perpendicular to the moving direction of the electric vehicle. The sliding moving means 40 horizontally moves the electric vehicle between the private parking lot and the inside of the vehicle elevator. The electric vehicle charging device formed in the private parking lot and detects when the electric vehicle is parked in the private parking lot and proceeds with charging. The control unit 30 controls the operation of the vehicle elevator unit and sliding means, and controls charging of the electric vehicle parked in the private parking lot.

The electric vehicle charging device 50 may be configured by being divided into a case where the electric vehicle charging device 50 is parked on the floor of a private parking lot without a main plate and a case where it is parked in a private parking lot by being placed on the main plate.

Figure 47:
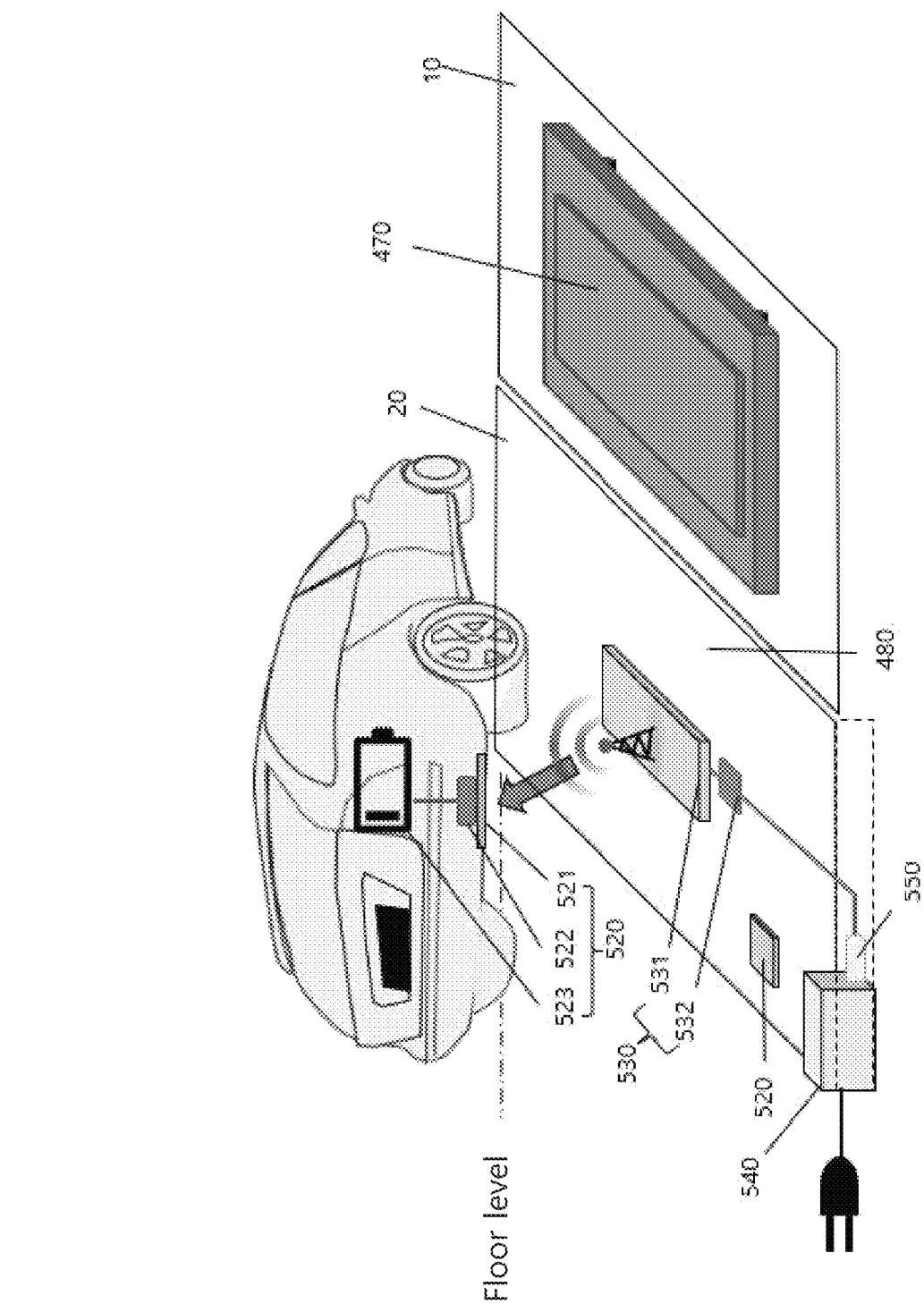
FIGS. 47 and 48 schematically show an electric vehicle charging device when parked in a private parking lot without a main plate according to a preferred embodiment of the present invention, and FIG. 47 schematically illustrates an electric vehicle charging system when an electric vehicle is parked on a main plate according to a preferred embodiment of the present invention.
Figure 48:
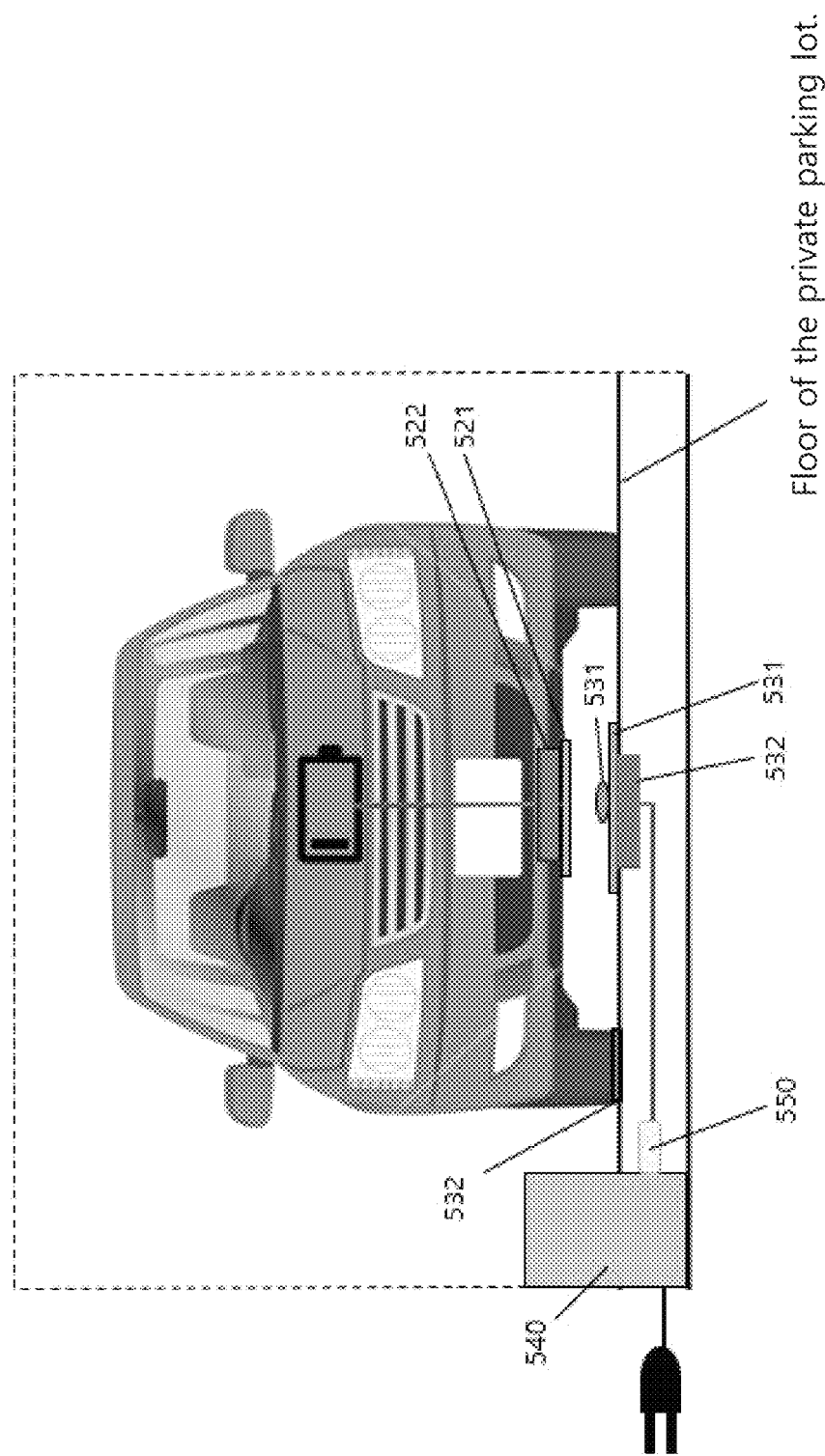

FIGS. 47 and 48 schematically show an electric vehicle charging device when parked in a private parking lot without a main plate according to a preferred embodiment of the present invention, and FIG. 47 schematically illustrates an electric vehicle charging system when an electric vehicle is parked on a main plate according to a preferred embodiment of the present invention, and FIG. 48 is a block diagram of the electric vehicle charging system.

First, when the vehicle is parked on the floor of a private parking lot without a main plate, the electric vehicle charging device 50 may be formed on the floor of the private parking lot 20 and the parked electric vehicle.

Referring to FIGS. 47 and 48, the electric vehicle charging device 50 may include a detection module 510 that detects that the electric vehicle is parked in a dedicated parking lot, a wireless power receiving module 520 formed in an electric vehicle to receive power, a wireless power transmission module 530 formed on the main plate to transmit power, a charging controller 540 installed in a dedicated parking lot and supplying power transmitted through the wireless power receiving module for the identified electric vehicle; and a switch 550 electrically connected when the electric vehicle is parked in a dedicated parking lot.

The detection module 510 may be composed of an electric sensor formed in the wireless power transmission module or a pressure sensor formed in a part where the floor of a private parking lot and the wheels of an electric vehicle come into contact.

When the sensing module 510 is configured as an electric sensor, it may be formed on a transmission pad of the wireless power transmission module. When an electric vehicle is parked in the private parking lot, it is possible to detect that the electric vehicle is parked by an electrical signal between the transmission pad and the receiving pad of the wireless power receiving module of the electric vehicle.

And, if it is composed of a pressure sensor, it can be installed on the floor where the wheels of the electric vehicle come into contact, and when the electric vehicle is parked and a pressure higher than the set pressure is applied, it can detect that the electric vehicle is parked.

The wireless power receiving module 520 may include a receiving pad 521 formed in an electric vehicle and receiving power wirelessly transmitted from the wireless power transmitting module, a power converter 522 that converts the received power into a form that can be charged; and a battery 523 formed in an electric vehicle to store the converted power.

In addition, the wireless power transmission module 530 may include a transmission pad 531 formed on the floor or lower surface of a private parking lot and wirelessly transmitting power to the wireless power receiving module 520, a power converter 532 that converts the power to be transmitted through the transmission pad into a form capable of transmission.

When the detection module 530 detects that the electric vehicle is parked, the charging controller 540 identifies the electric vehicle and checks whether charging is required or not. And it controls the charging according to the charging command of the controller 30.

The charging controller 540 includes an information transmission module 541 that transmits user identification information previously stored to the control unit 30 when the detection module 530 detects that the electric vehicle is parked, a charging state management module 542 that checks the state of charge of the parked electric vehicle and a charging management module 543 that receives a charging command from the control unit 30, controls charging of the electric vehicle, and transmits charging information to the control unit 30

The information transmission module 541 stores and manages identification information of a private parking lot. And when the detection module detects that the electric vehicle is parked, it transmits the identification information of the private parking lot and the state of charge information confirmed through the charging state management module 542 to the control unit.

When the detection module 530 detects that a vehicle is parked in a dedicated parking lot, the switch 550 electrically turns on/off the connection according to the control of the charging controller 540.

Figure 49:
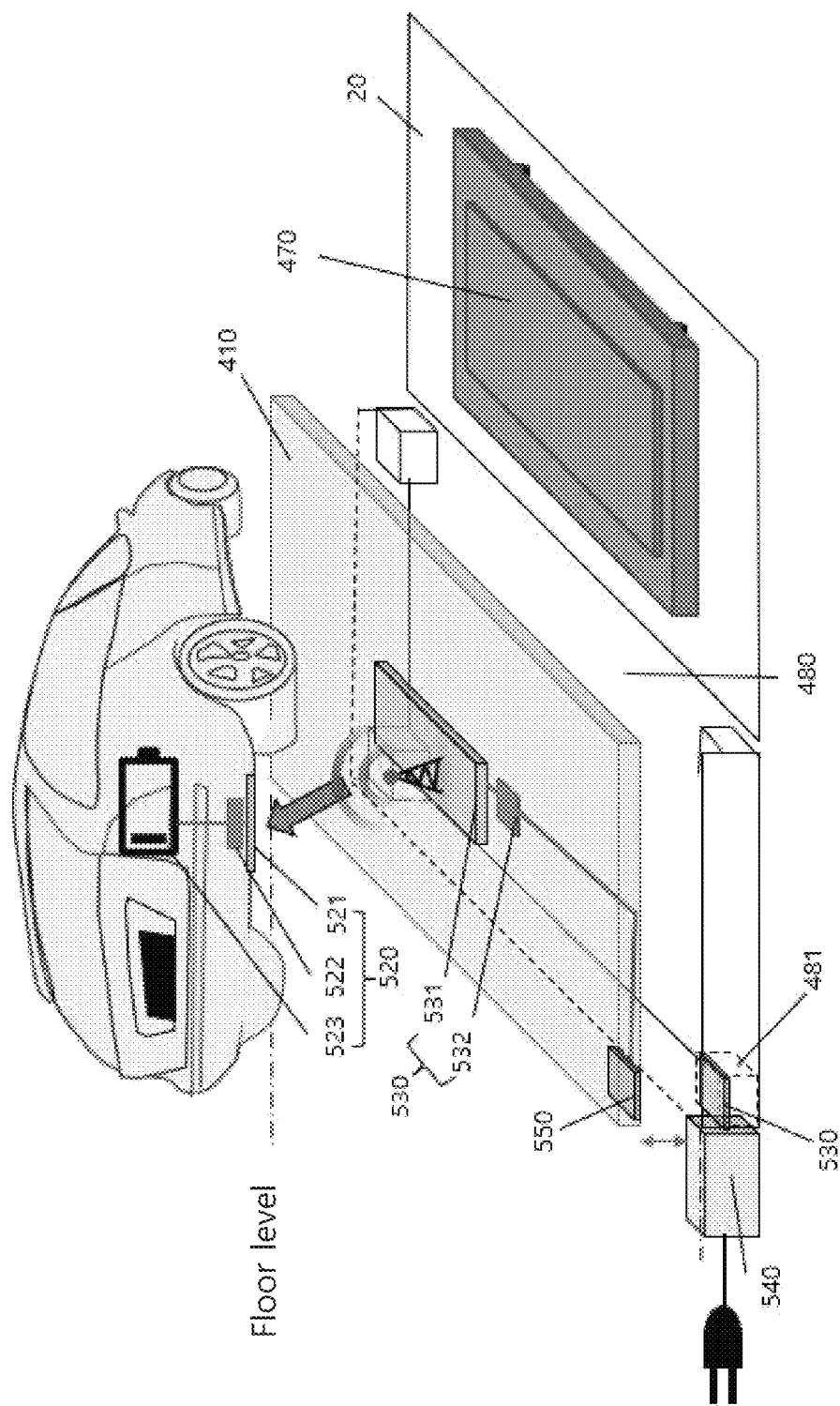
FIGS. 49 and 50 schematically show an electric vehicle charging system when an electric vehicle is parked on a main plate.
Figure 50:
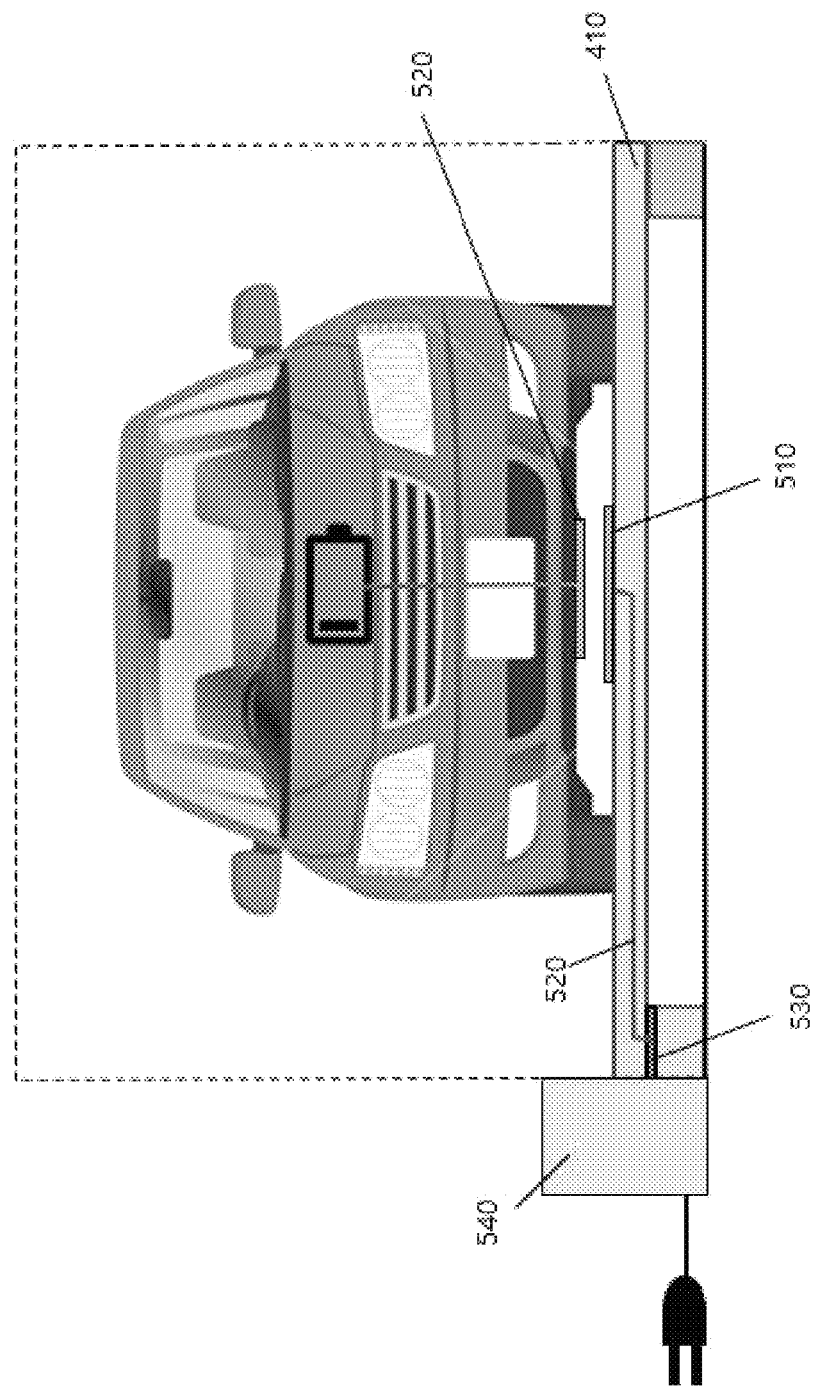

Next, with reference to FIGS. 49 and 50, an electric vehicle charging system in which an electric vehicle is parked on a main plate will be described.

The electric vehicle charging device 50 may be formed in the private parking lot 20, the parked electric vehicle, and the main plate 410 loaded with the electric vehicle.

More specifically, the electric vehicle charging device 50 may include a detection module 510 that detects that the main plate loaded with electric vehicles is parked in a private parking lot, a wireless power receiving module 520 formed in an electric vehicle to receive power, a wireless power transmission module 530 formed on the main plate to transmit power, a charging controller 540 installed in the private parking lot and supplying power transmitted through the wireless power receiving module for the identified electric vehicle; and a switch 550 electrically connected when the main plate is parked in a dedicated parking lot.

Here, the wireless charging method through the wireless power receiving module 520 and the wireless power transmission module 530 may be configured as one method selected from self-induction, self-resonant, and antenna methods.

The detection module 510 detects that the main plate loaded with electric vehicles is parked in a private parking lot. It can be composed of an electric sensor that detects an electrical connection when it comes into contact with a switch, a pressure sensor that detects a weight above a set pressure, and a camera sensor that recognizes the number of an electric vehicle.

When the detection module 510 is configured as an electric sensor, the detection module 510 may be configured to be electrically connected to the charge controller 540 through an electrical contact.

Therefore, when the main plate 410 loaded with the electric vehicle is parked on the plate fixing part 481 through the moving lifter 470, the switch 550 contacts the detection module 510 of the plate fixing part. Accordingly, the main plate is electrically connected to the wireless power transmission module 530 of the main plate 410. In this state, when the electric vehicle is loaded on the main plate 410, it is possible to sense that the electric vehicle is parked by detecting the wireless power receiving module 520 of the electric vehicle.

In addition, when the detection module 520 is configured as a pressure sensor, it can sense that the electric vehicle is loaded and parked on the main plate 410 when a certain pressure corresponding to the weight of the electric vehicle is detected. Therefore, it can detect the main plate 410 without an electric vehicle and the main plate 410 with an electric vehicle.

The wireless power receiving module 520 is responsible for converting and charging the power received from the wireless power transmitting module 530.

More specifically, the wireless power receiving module 520 may include a receiving pad 521 formed in an electric vehicle and receiving power wirelessly transmitted from the wireless power transmission module, a power converter 522 that converts the received power into a form that can be charged; and a battery 523 formed in the electric vehicle to store the converted power The wireless power transmission module 530 may include a transmission pad 531 formed on the main plate 410 and wirelessly transmitting power to the wireless power receiving module 520, a power converter 532 that converts the power to be transmitted through the transmission pad into a form that can be transmitted.

In order to control the charging of the charging controller 540, the controller 30 may further include a charging management unit 330.

Figure 51:
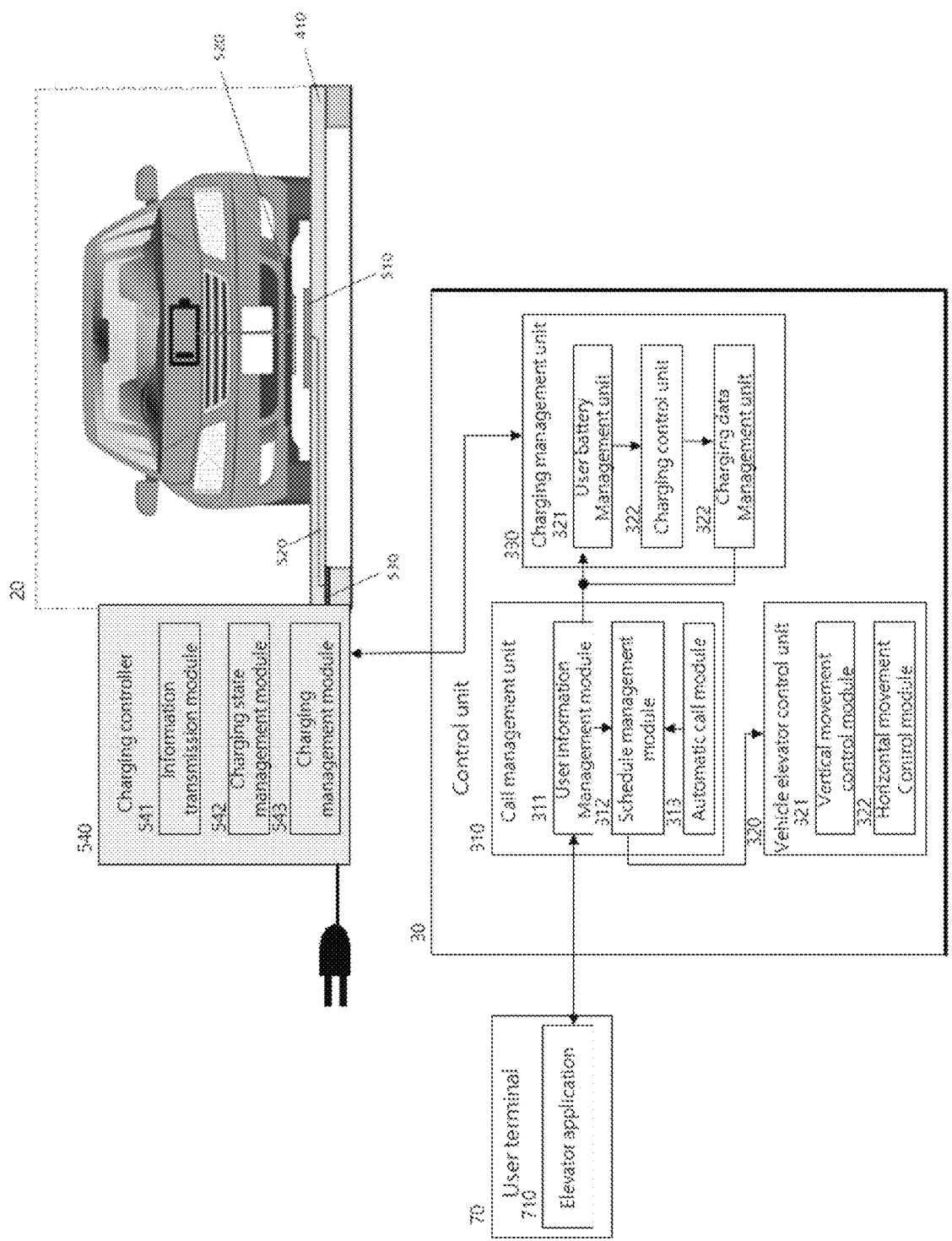
FIG. 51 is a block diagram of an electric vehicle charging system according to a preferred embodiment of the present invention.

FIG. 51 is a block diagram of an electric vehicle charging system according to a preferred embodiment of the present invention.

Referring to FIG. 51, the charging management unit 330 of the control unit may be configured to include a battery management module 321 detects that an electric vehicle is parked in a private parking lot, receives a user identification request and a battery state through the charging controller, identifies a user, and manages the battery state, a charging control module 322 that provides battery status information to the identified user and transmits a charging command to the charging controller when there is a charging request from the user; and a charging data management module 323 that receives and manages charging data from the charging controller when charging is completed and transmits charging information to the user.

When the user battery management module 321 receives the identification information of the private parking lot and the charging state information from the charging controller, it extracts identification information identical to the identification information of the private parking lot pre-stored in the database. And it identifies the user and the vehicle registered by the user from the user information mapped to the identification information.

The user battery management module 321 maps, registers, and manages identification information of the private parking lot and user information (user identification information (name, phone number), number of the room, vehicle number, etc.). Therefore, when the identification information of the private parking lot is received, the stored identification information that matches this is extracted, and the location of the user, the vehicle, and the private parking lot (number of corresponding room) can be specified from the user information mapped to the extracted identification information.

When the user is specified, the charging control module 232 transmits information on the state of charge of the identified electric vehicle through the elevator application of the user's portable terminal. When a charging request is received from the user, it transmits a charging command to the charging controller of the identified private parking lot.

When charging is completed, the charging data management module 323 transmits charging information including charging amount and billing information to the user, maps the charging information to the user information, and registers and manages the charging information.

In the detailed description of the present invention described above, it has been described with reference to preferred embodiments of the present invention. However, the protection scope of the present invention is not limited to the above embodiments, and those skilled in the art can variously modify and change the present invention within the scope not departing from the spirit and technical scope of the present invention.

INDUSTRIAL APPLICABILITY

The vehicle elevator device for vertical parking for individual households in a collective building according to the present invention includes a parking space and a vehicle elevator as a common space next to an individual dedicated space of the collective building. In addition, the parking space and the vehicle elevator are disposed adjacent to each other, and the vehicle is vertically moved through the vehicle elevator, and the vehicle is moved to be parked in the parking space. Therefore, it is a very useful invention for the construction industry because it can be parked in a personalized parking lot rather than a common parking lot.

The invention claimed is:

1. A temporary parking system using vehicle elevator device for vertical parking of individual households in collective building comprising:
   a temporary parking unit formed at an entrance and exit of a vehicle elevator unit; a private parking lot attached to an individual exclusive space;
   the vehicle elevator unit for vertically transferring vehicles between the temporary parking unit and the private parking lot;
   a sliding moving means for horizontally transferring vehicles between the private parking lot and the inside of the vehicle elevator unit;
   a control unit that specifies vehicles waiting to enter and exit by managing the reservation of enter and exit, controls an operation of the vehicle elevator unit and sliding moving means,
   wherein the temporary parking unit is composed of a parking module capable of parking at least one vehicle, and be composed of spaces capable of parking a plurality of vehicles according to a number of vertical floors and a number of vehicles, and in the case where the parking module is used for both entering and exiting the at least one vehicle, the parking module is configured for exclusive use of entering and exiting the at least one vehicle, a call management unit includes information management module that receives and registers user information about a user of a private parking lot, identifies the user from registered user information when there is a call to the vehicle elevator unit, and identifies a location of user's private parking lot from the registered user information, and a schedule management module that determines and assigns a moving order to the vehicle elevator unit for entering or exiting of user's vehicle in consideration of information associated with the call when user identification is completed and waiting on entering or exiting of the user's vehicle is required, the vehicle elevator control unit that includes a vertical movement control module for controlling vertical movement of the vehicle elevator unit, and a horizontal movement control module for controlling sliding moving means to horizontally transfer vehicles between the vehicle elevator unit in the private parking lot or between the vehicle elevator unit and the temporary parking unit, when a user calls the vehicle elevator unit through an elevator application of a user terminal to park a vehicle in a private parking lot of a vertical household, the schedule management module determines whether it is possible to enter the vehicle immediately or a situation in which waiting is required, in the case of a waiting situation, designates a parking unit of the temporary parking unit, and notifies the user to designate the parking unit of the temporary parking unit to temporarily park the vehicle in front of an entrance of the parking unit of the temporary parking unit, controls the vehicle to enter the parking unit of the temporary parking unit when the vehicle can be loaded into the temporary parking unit, and when parking of the vehicle is completed in the parking unit of the temporary parking unit, the schedule management module controls the vehicle parked in the parking unit of the temporary parking unit to be automatically transferred to the user's private parking lot according to a moving order.

2. The temporary parking system using vehicle elevator device for vertical parking of individual households in collective building according claim 1, wherein:

the control unit includes the call management unit that manages a call of a user's vehicle elevator unit and;

a vehicle elevator control unit that controls a transport of a vehicle between a dedicated parking lot and the temporary parking unit by controlling the vertical movement of the vehicle elevator unit and a horizontal movement of the vehicle according to the call of the vehicle elevator unit.

\* \* \* \* \*